(12) United States Patent
Yahata et al.

(10) Patent No.: US 8,010,908 B2
(45) Date of Patent: Aug. 30, 2011

(54) RECORDING MEDIUM, REPRODUCTION APPARATUS, RECORDING METHOD, PROGRAM, AND REPRODUCTION METHOD

(75) Inventors: Hiroshi Yahata, Kadoma (JP); Joseph McCrossan, Simi Valley, CA (US); Tomoyuki Okada, Nara (JP); Wataru Ikeda, Osaka (JP)

(73) Assignee: Panasonic Corporation, Osaka (JP)

( * ) Notice: Subject to any disclaimer, the term of this patent is extended or adjusted under 35 U.S.C. 154(b) by 391 days.

(21) Appl. No.: 11/508,132

(22) Filed: Aug. 22, 2006

(65) Prior Publication Data

US 2006/0288290 A1  Dec. 21, 2006

Related U.S. Application Data

(62) Division of application No. 10/561,314, filed on Dec. 19, 2005, now Pat. No. 7,716,584.

(51) Int. Cl.
*G06F 3/00* (2006.01)
(52) U.S. Cl. ........ 715/840; 715/749; 715/810; 715/716; 715/797
(58) Field of Classification Search .................. 715/840, 715/749, 810, 716, 797
See application file for complete search history.

(56) References Cited

U.S. PATENT DOCUMENTS

| | | | |
|---|---|---|---|
| 4,302,775 A | 11/1981 | Widergren et al. | |
| 5,832,037 A * | 11/1998 | Park | 375/240 |
| 5,838,316 A | 11/1998 | Arruza | |
| 5,854,873 A | 12/1998 | Mori et al. | |
| 5,880,729 A | 3/1999 | Johnston, Jr. et al. | |
| 5,892,767 A | 4/1999 | Bell et al. | |
| 5,907,658 A * | 5/1999 | Murase et al. | 386/95 |
| 5,929,857 A | 7/1999 | Dinallo et al. | |
| 5,990,972 A | 11/1999 | Bond-Harris et al. | |
| 6,141,004 A | 10/2000 | Jeong | |

(Continued)

FOREIGN PATENT DOCUMENTS

CN   1249623   4/2000

(Continued)

OTHER PUBLICATIONS

"Digital Video Broadcasting (DVB); Subtitling systems European Broadcasting Union Union Europeenne de Radio-Television EBU-UER; ETSI EN 300 743" ETSI Standards, LIS, Sophia Antipolis Cedex, France, vol. BC, No. V1.2. 1, Oct. 1, 2002.

(Continued)

*Primary Examiner* — Michael Roswell
(74) *Attorney, Agent, or Firm* — Panasonic Patent Center; Dhiren Odedra; Kerry Culpepper

(57) ABSTRACT

A BD-ROM has recorded therein an AV Clip generated by multiplexing a video stream and a graphics stream. The graphics stream represents an interactive display to be overlayed with the video stream, and includes a sequence of three Button State groups. The interactive display includes a plurality of buttons, each of which changes from a normal state to a selected state, and from the selected state to an active state, according to a user operation. In the three Button State groups in the graphics stream, the first-order group (N-ODSs) is made of a plurality of pieces of graphics data, which represent normal states of the buttons, the second-order group (S-ODSs) is made of a plurality of pieces of graphics data, which represent selected states of the buttons, and the third-order group (A-ODSs) is made of a plurality of pieces of graphics data, which represent active states of the buttons.

14 Claims, 54 Drawing Sheets

U.S. PATENT DOCUMENTS

| | | | |
|---|---|---|---|
| 6,166,735 A | 12/2000 | Dom et al. | |
| 6,181,872 B1 | 1/2001 | Yamane et al. | |
| 6,215,952 B1 | 4/2001 | Yoshio et al. | |
| 6,298,022 B1 | 10/2001 | Aramaki et al. | |
| 6,356,707 B1 | 3/2002 | Murase et al. | |
| 6,381,398 B1 | 4/2002 | Yamauchi et al. | |
| 6,469,718 B1 * | 10/2002 | Setogawa et al. | 715/810 |
| 6,580,756 B1 | 6/2003 | Matsui et al. | |
| 6,643,453 B1 | 11/2003 | Arai et al. | |
| 6,701,064 B1 | 3/2004 | De Haan et al. | |
| 6,924,846 B2 | 8/2005 | Ohba et al. | |
| 7,043,700 B1 * | 5/2006 | Bertram et al. | 715/811 |
| 7,054,423 B2 | 5/2006 | Nebiker et al. | |
| 7,088,344 B2 | 8/2006 | Maezawa et al. | |
| 7,177,412 B2 | 2/2007 | Berlyoung et al. | |
| 7,187,852 B1 | 3/2007 | Bauer-Schwan et al. | |
| 7,206,344 B1 | 4/2007 | Desai | |
| 2001/0004760 A1 | 6/2001 | Im | |
| 2002/0059648 A1 | 5/2002 | Ohba et al. | |
| 2002/0067347 A1 | 6/2002 | Maezawa et al. | |
| 2002/0106183 A1 | 8/2002 | Maertens | |
| 2003/0174774 A1 * | 9/2003 | Mock et al. | 375/240.11 |
| 2004/0067048 A1 | 4/2004 | Seo et al. | |
| 2005/0105888 A1 | 5/2005 | Hamada et al. | |
| 2005/0149214 A1 | 7/2005 | Yoo et al. | |
| 2006/0064716 A1 | 3/2006 | Sull et al. | |
| 2006/0140079 A1 | 6/2006 | Hamada et al. | |
| 2006/0188223 A1 | 8/2006 | Ikeda et al. | |
| 2006/0204228 A1 | 9/2006 | Kang et al. | |
| 2006/0233530 A1 | 10/2006 | Kang et al. | |
| 2007/0005795 A1 | 1/2007 | Gonzalez | |
| 2008/0137729 A1 | 6/2008 | Jung | |
| 2008/0163294 A1 | 7/2008 | Jung et al. | |
| 2008/0298768 A1 | 12/2008 | Isobe et al. | |
| 2009/0003805 A1 | 1/2009 | Okada et al. | |
| 2009/0052875 A1 | 2/2009 | Morimoto et al. | |
| 2009/0238539 A1 | 9/2009 | Isobe et al. | |
| 2010/0014837 A1 | 1/2010 | Ando et al. | |
| 2010/0046608 A1 | 2/2010 | McCrossan et al. | |
| 2010/0046932 A1 | 2/2010 | McCrossan et al. | |
| 2010/0050126 A1 | 2/2010 | McCrossan et al. | |

FOREIGN PATENT DOCUMENTS

| | | |
|---|---|---|
| EP | 0 898 279 | 2/1999 |
| EP | 1 043 724 B1 | 9/2001 |
| EP | 1 463 052 | 9/2004 |
| EP | 2 088 779 | 8/2009 |
| JP | 09-081118 | 3/1997 |
| JP | 3128220 | 11/2000 |
| JP | 2001-332006 | 11/2001 |
| JP | 2002-44590 | 2/2002 |
| JP | 2002-101386 | 4/2002 |
| JP | 2002-533000 | 10/2002 |
| JP | 2003-513538 | 4/2003 |
| TW | 525081 | 3/2003 |
| TW | 526429 | 4/2003 |
| TW | 526472 | 4/2003 |
| TW | 529303 | 4/2003 |
| TW | 530267 | 5/2003 |
| WO | 00/36600 | 6/2000 |
| WO | 01/31497 A1 | 5/2001 |
| WO | 2004/098193 | 11/2004 |

OTHER PUBLICATIONS

Supplementary European Search Report, dated Nov. 13, 2009, for EP Application No. 04746986.1.

Microsoft Press, Microsoft Computer Dictionary, Fifth Edition, May 1, 2002, Microsoft Press, 5th edition, p. 133.

* cited by examiner

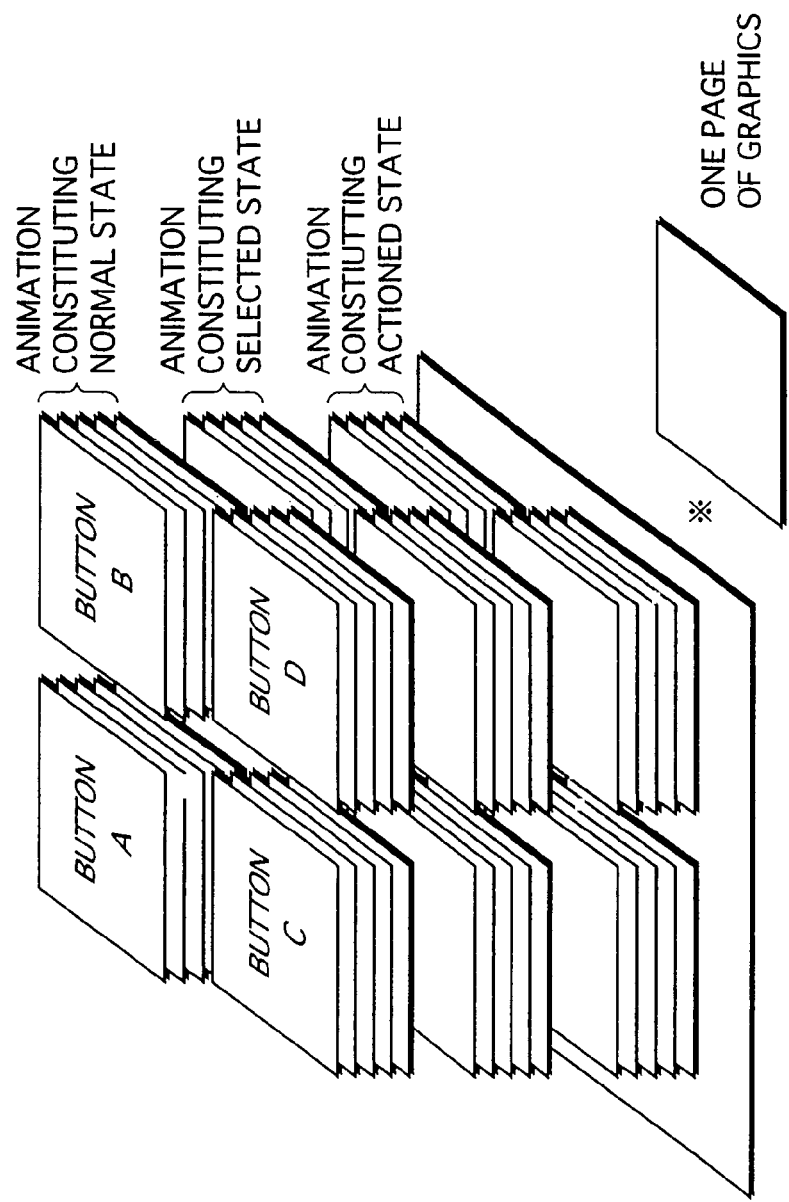

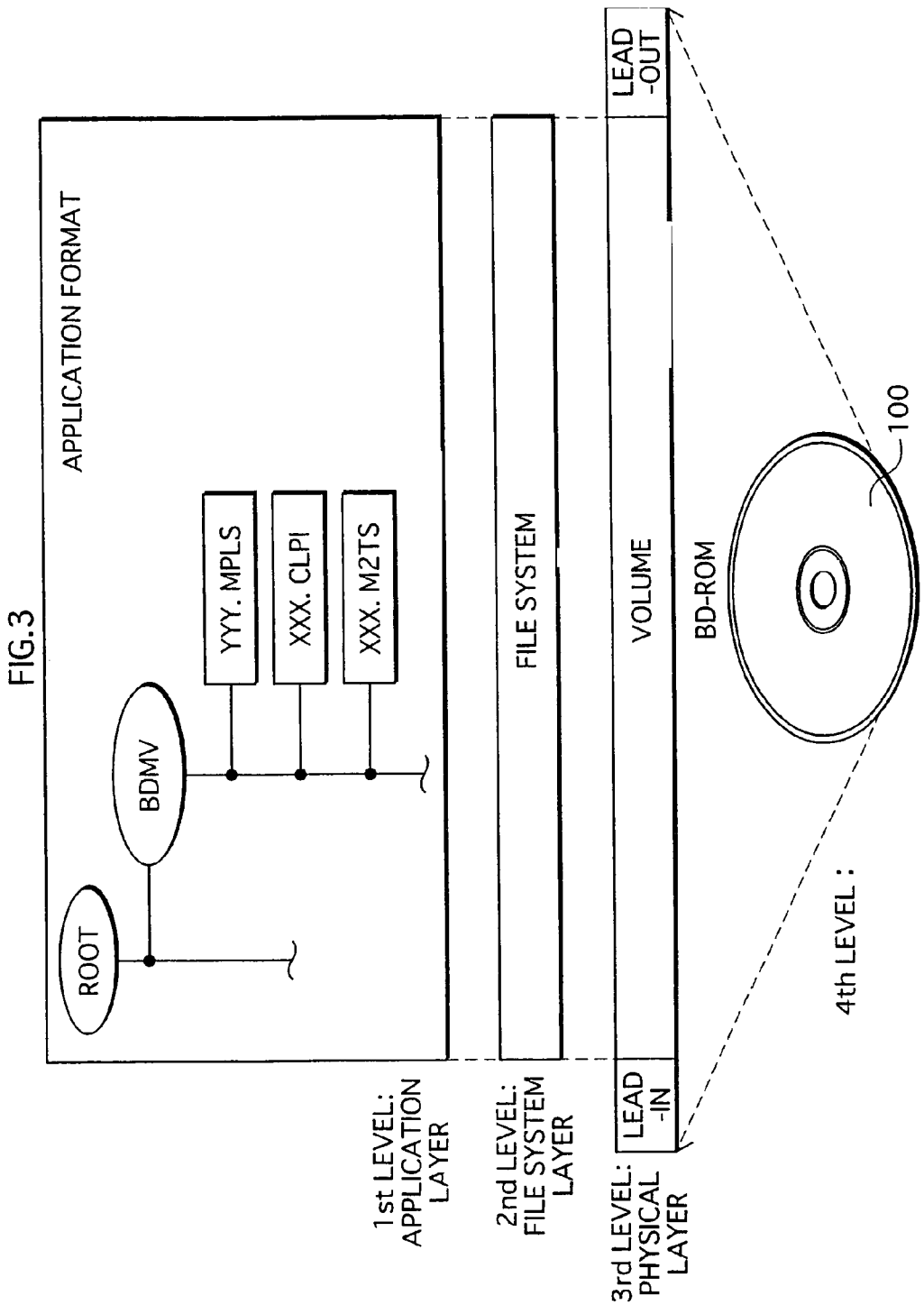

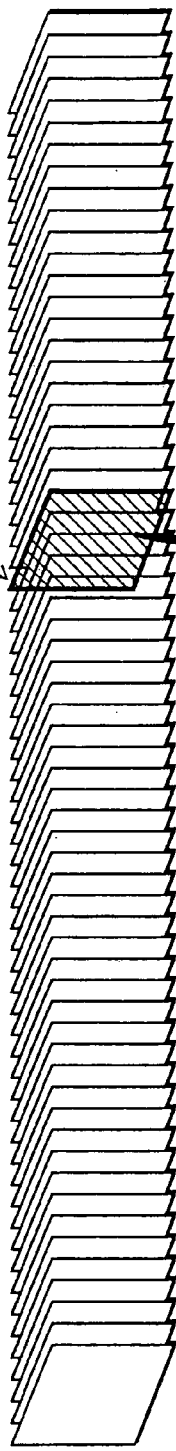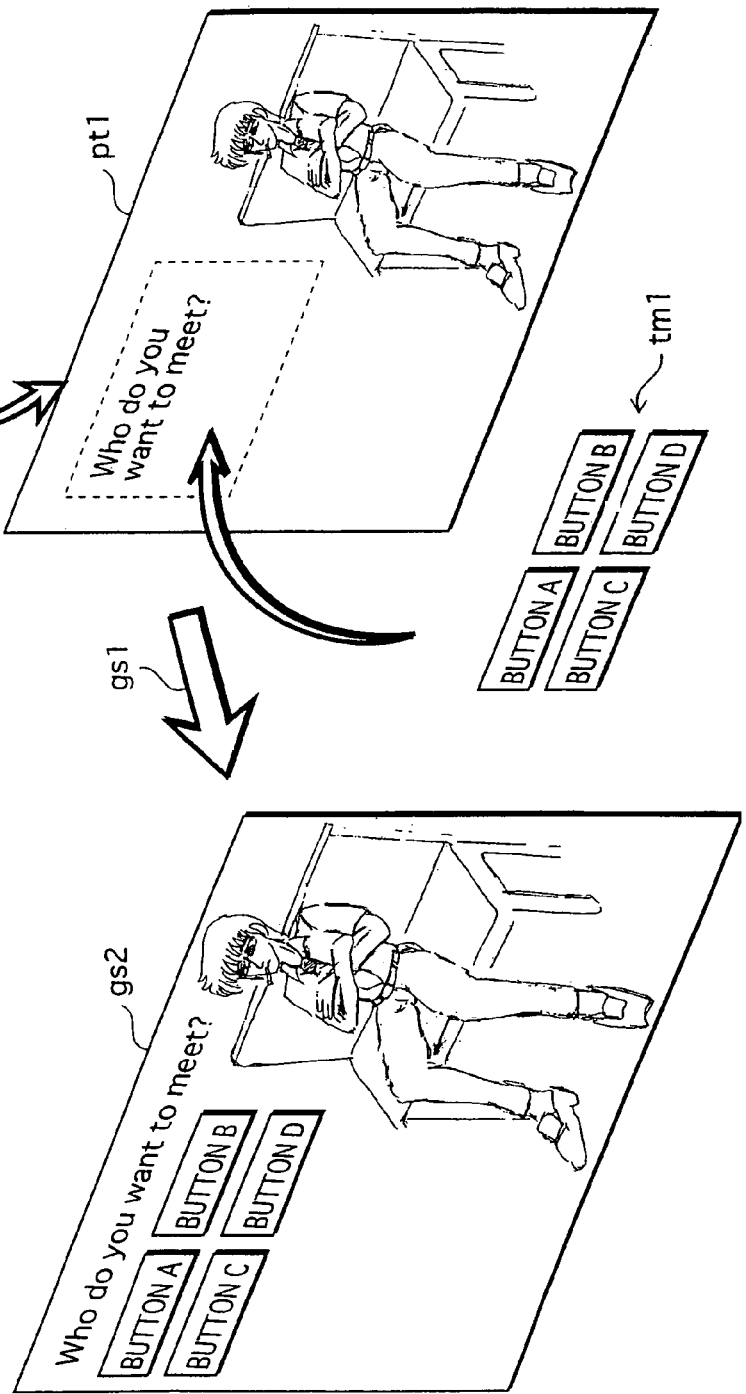
FIG. 13

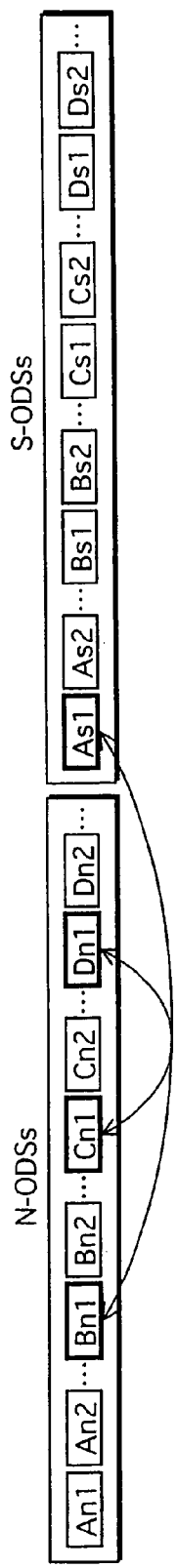
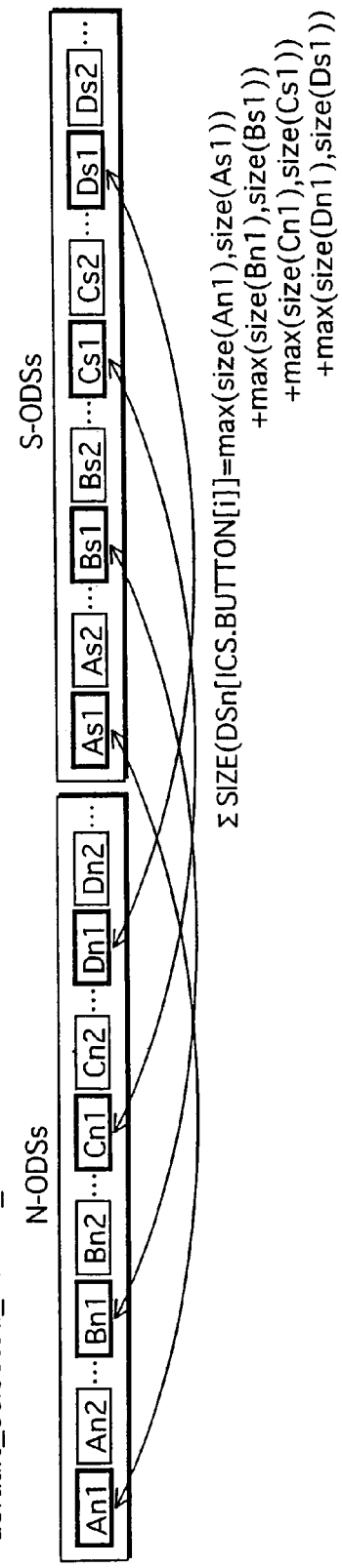
FIG.23A
FIG.23B

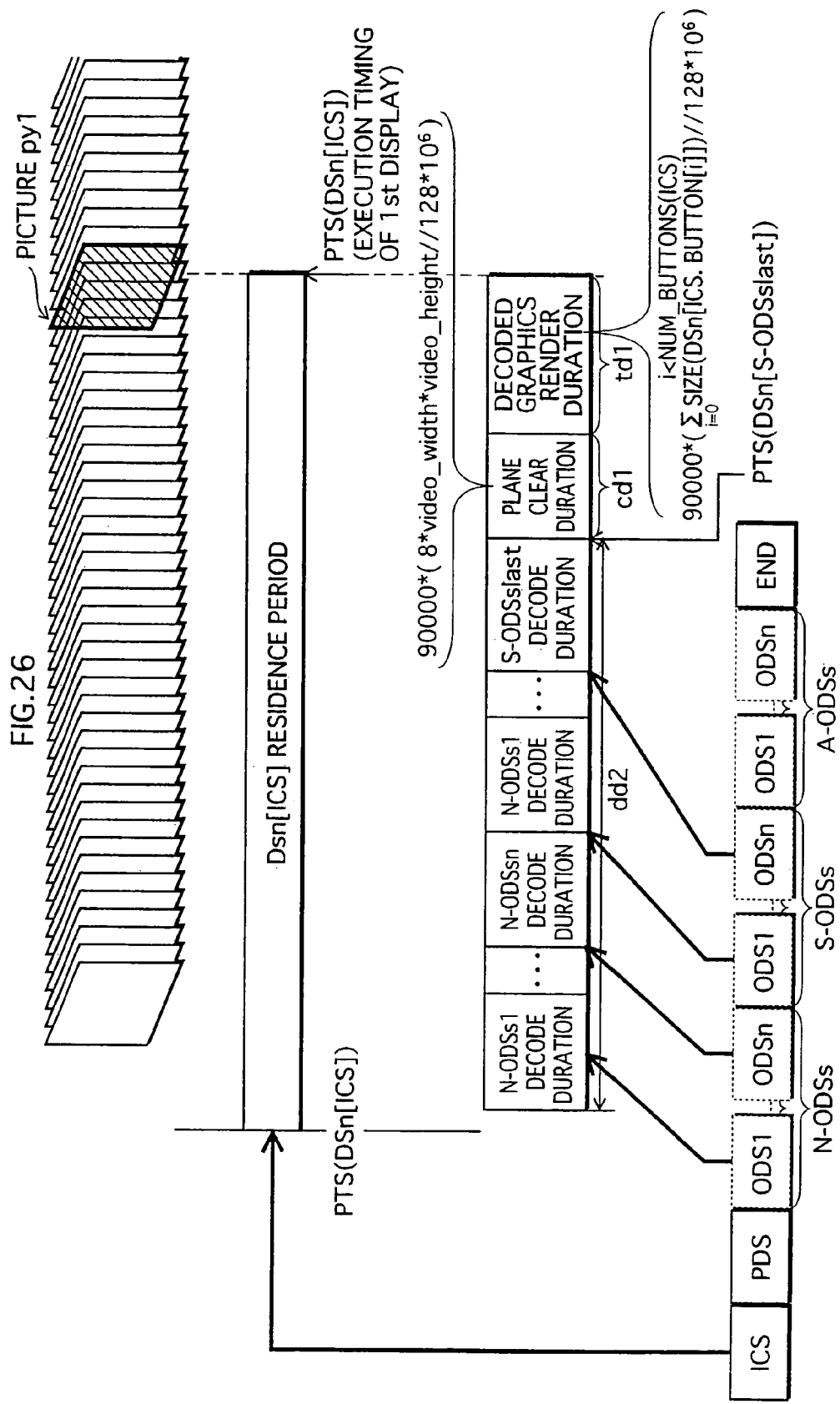

DEFAULT SELECTED BUTTON NOT SPECIFIED

RECORDING MEDIUM, REPRODUCTION APPARATUS, RECORDING METHOD, PROGRAM, AND REPRODUCTION METHOD

CROSS-REFERENCE TO RELATED APPLICATIONS

This is a divisional application of U.S. Ser. No. 10/561,314, filed on Dec. 19, 2005 now U.S. Pat. No. 7,716,584.

TECHNICAL FIELD

The present invention relates to a recording medium such as a BD-ROM, and to a reproduction apparatus. The present invention particularly relates to an interactive control technology for combining, with a motion picture made of a plurality of pictures, an interactive display made of a plurality of buttons, and for realizing reproduction control in accordance with a user operation directed to the buttons.

BACKGROUND ART

The interactive control described above is an indispensable function for reproduction apparatuses in receiving a user operation on selection of title and chapter to be reproduced, a reply to a quiz question, and the like, and is widely known to be realized on DVD reproduction apparatuses. The interactive control by a DVD reproduction apparatus is an application of OSD (on screen display) technology by which a button being a character string attached to a graphics is displayed on a screen, and the color of a frame of the button is changed according to a user operation. Such color change enables a user to intuitionally understand which button on the interactive display is in a selected state.

A disadvantage of the interactive control on a DVD is that there is hardly any factor for amusement. Specifically, users hardly find it amusing during operation of the DVD interactive control. In view of such criticism, animation display of buttons is attempted on the interactive display of a BD-ROM (Blu-ray disk prerecorded format) whose standardization is underway. To be more specific, in the interactive display presented by a BD-ROM, each button is presented in a form of original animation, and is overlayed with a scene of a movie, which is the main video image. In addition, the content of this animation display changes according to a user operation. When such an animation display is used to represent a character appearing on a movie work, a user can change the expression and action of the character by his operation directed to the interactive display. Such a kind of animation enables creation of interactive display by which even a child is amused.

However, the animation display for buttons incurs a large amount of decoding load, and so there is a problem that a waiting time, until an initial display of the interactive display is realized, becomes long. For example, assume that an interactive display such as shown in FIG. 1 is overlayed with a scene of a movie work. This interactive display has four buttons, each of which has three states: normal state; selected state; and active state. Also assume a case in which each state of button is presented in 2-3 seconds of animation display. Even if one page of graphics data is displayed at intervals of 5 frames in an image signal, about 30 pages of graphics data are required to realize 2-3 seconds of animation. Not only that, since there are three states for a button (normal state, selected state, and active state), there will be total of 90 pages (3*30) of graphics data. So as to dispose four buttons on an interactive display, it requires decoding of 360 pages (4*90), which is an enormous amount of graphics data. Decoding load for one page of graphics data is light. However, it takes about dozens of seconds so as to decode several hundreds of pages of graphics data. Even for a purpose of making amusing interactive displays, it is too much to keep users waiting dozens of seconds to display each interactive display, which deserves users' criticism.

DISCLOSURE OF THE INVENTION

The object of the present invention is to provide a recording medium that realizes interactive display with animation, without delay.

So as to achieve the above-described object, the present invention provides a recording medium having: a graphics stream; where: said graphics stream represents an interactive display to be overlayed with a motion picture made of a plurality of pictures, the interactive display including at least one graphical button material; said graphics stream includes a plurality of pieces of graphics data that are grouped under state sets; and the state sets respectively correspond to different states of the at least one button material and are disposed in a sequential order.

Under the above construction, suppose there are 360 pages of graphics data for rendering animation, and there are three states for each button material. Then, the graphics data will be grouped under three state sets (e.g. 120+120+120 pages). Then each of the state sets is placed so that the set that appears earlier in the animation will be placed nearer to the top, and the set that appears later will be placed farther to the top. Accordingly, in reproduction, the earlier appearing button-state set will be loaded to the reproduction apparatus early, postponing loading of later appearing button-state sets. By doing so, when once reading/decoding of about ⅓-⅔ of the entire graphics data are complete, the preparation for an initial display is ready, even though not all of the 360 pages of graphics data have not been finished being decoded.

This further means that in a case where there is an enormous amount of graphics data to be read/decoded, execution of initial display will not be delayed. According to this, the interactive display with animation can be performed without delay.

BRIEF DESCRIPTION OF THE DRAWINGS

FIG. 1 illustrates an interactive display composed of animation.

FIG. 3 is a diagram showing a structure of a BD-ROM.

FIG. 13 is a diagram illustrating a screen composition at a display timing of arbitrary picture data pt1.

FIG. 23A and FIG. 23B are diagrams for showing the concrete value for ΣSIZE(DSn[ICS.BUTTON[i]]), in a case when N-ODSs include a plurality of ODSs constituting the buttons A-D, and S-ODSs include a plurality of ODSs constituting the buttons A-D.

FIG. 26 is a diagram showing how to set DTS and PTS, in a case when a plurality of ODSs compose an initial display of an interactive display, and the default selected button is invalid.

BEST MODE FOR CARRYING OUT THE INVENTION

First Embodiment

Figure 2A:
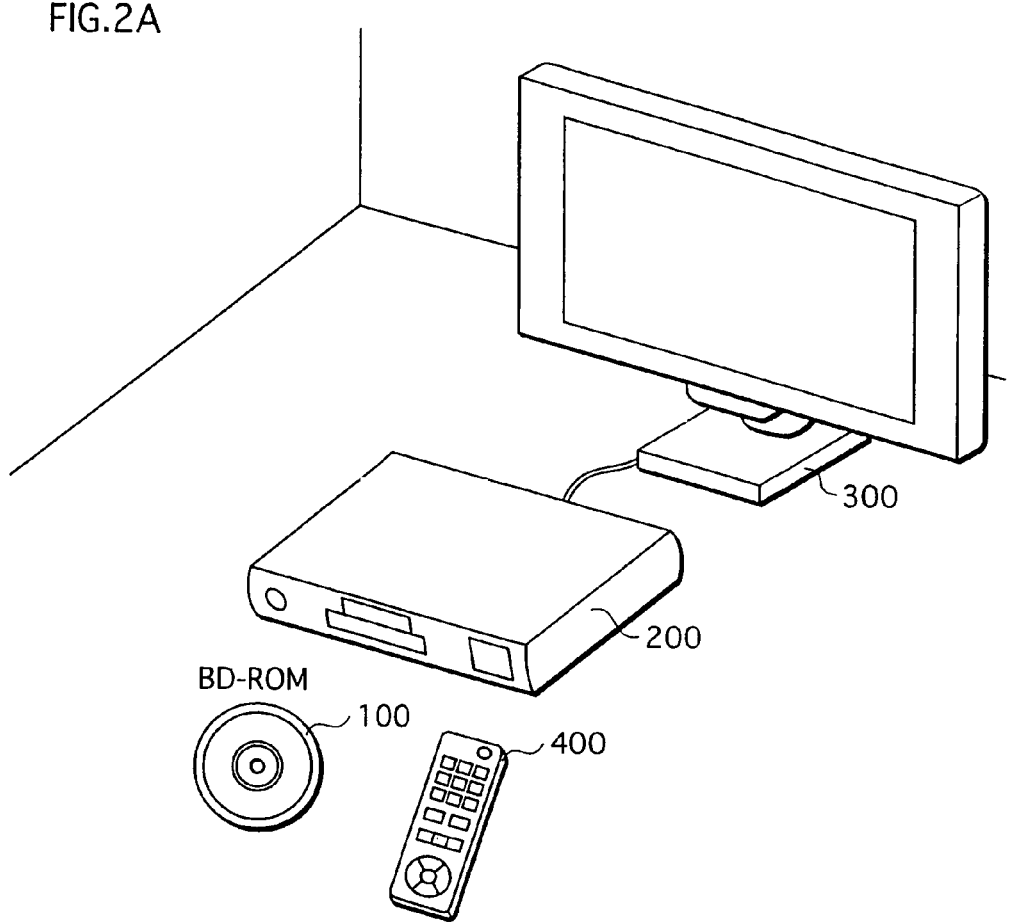
FIG. 2A illustrates an example of use of a recording medium according to the present invention.
Figure 2B:
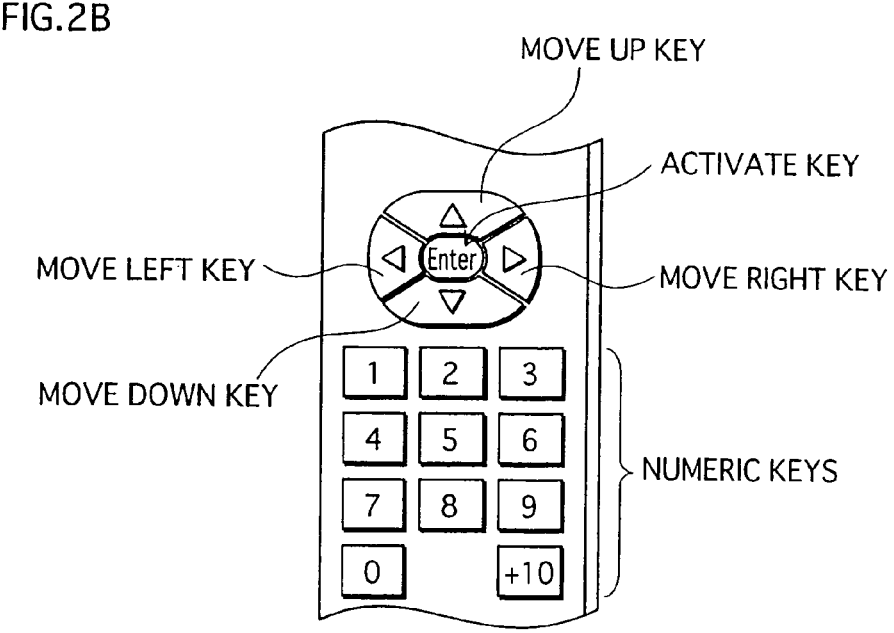
FIG. 2B illustrates a key disposition on a remote controller 400, through which a user operation directed to the interactive display is received.

The following describes an embodiment of a recording medium, relating to the present invention. Firstly, among the embodiments of a recording medium according to the present invention, an example of how the recording medium is used is explained as follows. FIG. 2A is a diagram illustrating a use of the recording medium according to the present invention. In FIG. 2A, the recording medium of the present invention is a BD-ROM 100. This BD-ROM 100 is used to supply a movie work to a Home Theatre System structured by a reproduction apparatus 200, a television 300, and a remote controller 400. Among them, the remote controller 400 is used to receive an operation to change the state of the interactive display, from a user, and is closely related to the recording medium of the present invention. FIG. 2B illustrates keys of the remote controller 400, through which a user operation directed to the interactive display is received. As shown in this drawing, the remote controller 400 is provided with a MoveUp key, a MoveDown key, a MoveRight key, and a MoveLeft key. Here, the buttons on the interactive display have three states: normal state; selected state; and active state. The MoveUp key, the MoveDown key, the MoveRight key, and the MoveLeft key are used to receive a user operation to change the state of the buttons into normal state→selected state→active state. The normal state is a state in which mere display is provided, whereas the selected state is a state in which a focus is given according to a user operation, but confirmation has not been received. The active state is a state in which confirmation is received. The MoveUp key is for, when a button in the interactive display is in a selected state, setting a button above this selected button, to be in a selected state. The MoveDown key is for setting a button below this selected button to be in a selected state. The MoveRight key is for setting a key on the right of the selected key to be in a selected state, and the MoveLeft key is for setting a key on the left of the selected key to be in a selected state.

The Activated key is for setting the selected button to be in an active state (i.e. to activate). Numerical keys "0"-"9" are for setting a button to which a corresponding number is assigned, to be in a selected state. "+10" key is for receiving an operation to add 10 to the already inputted numerical values. It should be noted here that "0" key and "+10" key are both for receiving input of numerical value of no smaller than 10 digits. Therefore any one of them is enough for the remote controller 400.

So far, the description is about how the recording medium of the present invention is used.

As follows, among the embodiments of the recording medium of the present invention, a production example is explained. The recording medium of the present invention is produced by improving the application layer of a BD-ROM. FIG. 3 is a diagram showing a structure of a BD-ROM.

In the drawing, the BD-ROM is shown at a fourth row of the drawing, and a track on the BD-ROM is shown in the third row. The track is actually in a spiral shape on the disk, but shown as a line extending in the length wise direction of the drawing. The track includes a lead-in area, a volume area, and a lead-out area. The volume area in this drawing has a physical layer, a file system layer, and an application layer. In the first row of the drawing, an application format of the BD-ROM is illustrated using a directory structure. As illustrated in the drawing, the BD-ROM has a directory BDMV under the root directory, and the BDMV directory contains such files as XXX.M2TS, XXX.CLPI, and YYY.MPLS. By forming the above application format, it is possible to produce the recording medium according to the present invention. In a case in which there is more than one file for each kind, it is preferable to provide three directories named STREAM, CLIPINF, and PLAYLIST under the BDMV to store the files with the same extension in one directory. Specifically, it is desirable to store the files with the extension M2TS in the STREAM, the files with the extension CLPI in the CLIPINF, and the files with the extension MPLS in the PLAYLIST.

As follows, each file in the application format is explained. Firstly, an explanation about the AV. Clip (XXX.M2TS) is given.

Figure 4:
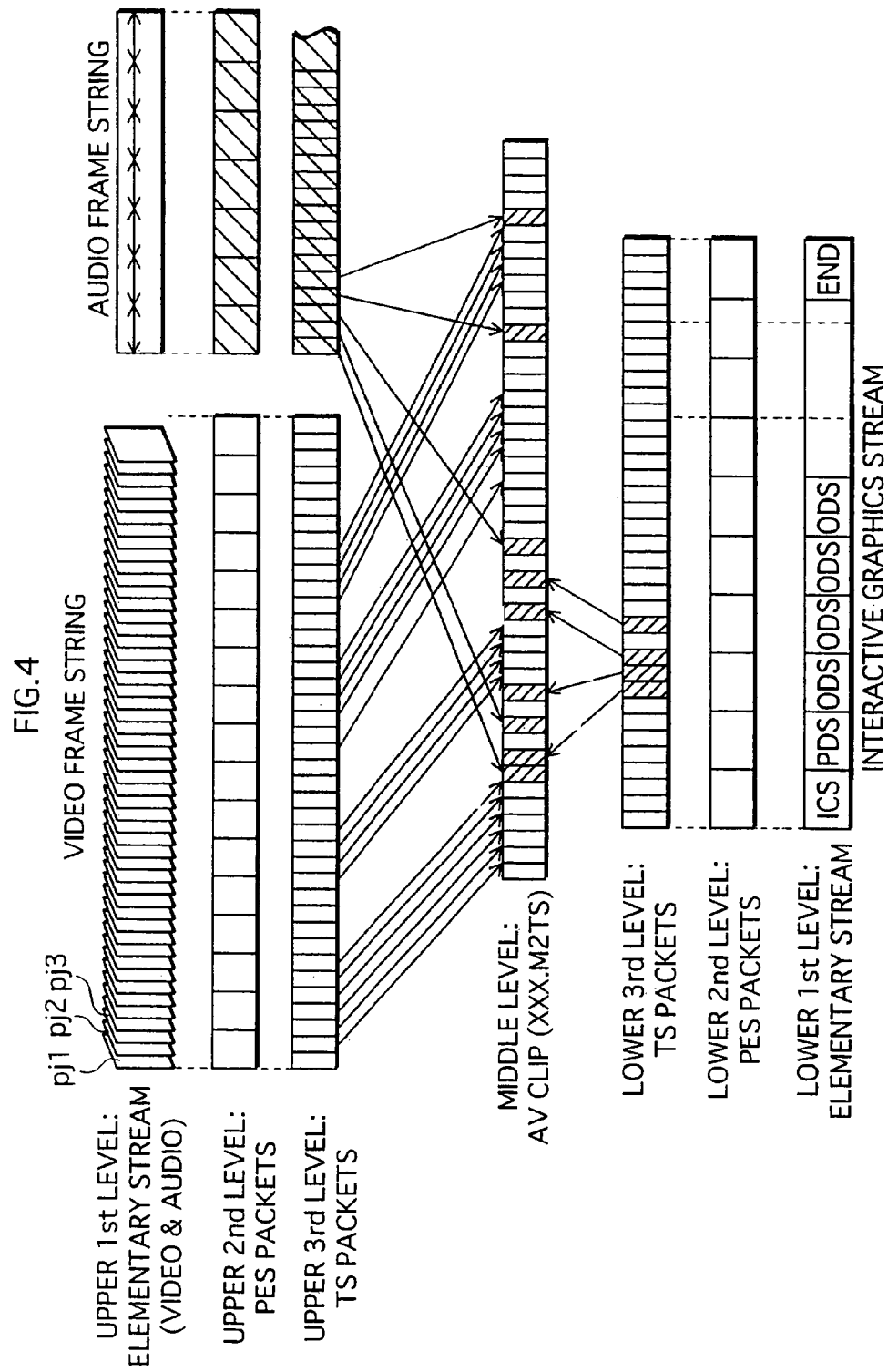
FIG. 4 is a diagram schematically illustrating a structure of an AV Clip.

The AV Clip (XXX.M2TS) is a digital stream in MPEG-TS format (TS is Transport Stream) obtained by multiplexing a video stream, at least one audio stream, a presentation graphics stream, and an interactive graphics stream. The video stream represents motion pictures of the movie, the audio stream represents sound of the movie, the presentation graphics stream represents subtitles of the movie, and the interactive graphics stream represents dynamic reproduction control procedure directed to menus. FIG. 4 is a diagram schematically illustrating a structure of the AV Clip.

The AV Clip (middle row) is structured in a following manner. A video stream made of plural vide frames (pictures pj1, pj2, and pj3), and an audio stream made of plural audio frames (top row of the drawing) are respectively converted into a PES packet sequence (second to top row of the drawing), and then into a TS packet sequence (third to top row of the drawing). Then a presentation graphics stream and an interactive graphics stream (bottom row of the drawing) are converted into a PES packet sequence (second to bottom row of the drawing), and then into a TS packet sequence (third to bottom row of the drawing). The TS packet sequences are multiplexed, to obtain the AV Clip.

The AV Clip constituted in the above manner is divided into more than one extent, like ordinary computer files, and stored in areas in the BD-ROM. The AV Clip is made of one or more ACCESS UNITs. Each ACCESS UNIT functions as a unit of random access, as well as a decoding unit starting with an Intra (I) picture.

Figure 5:
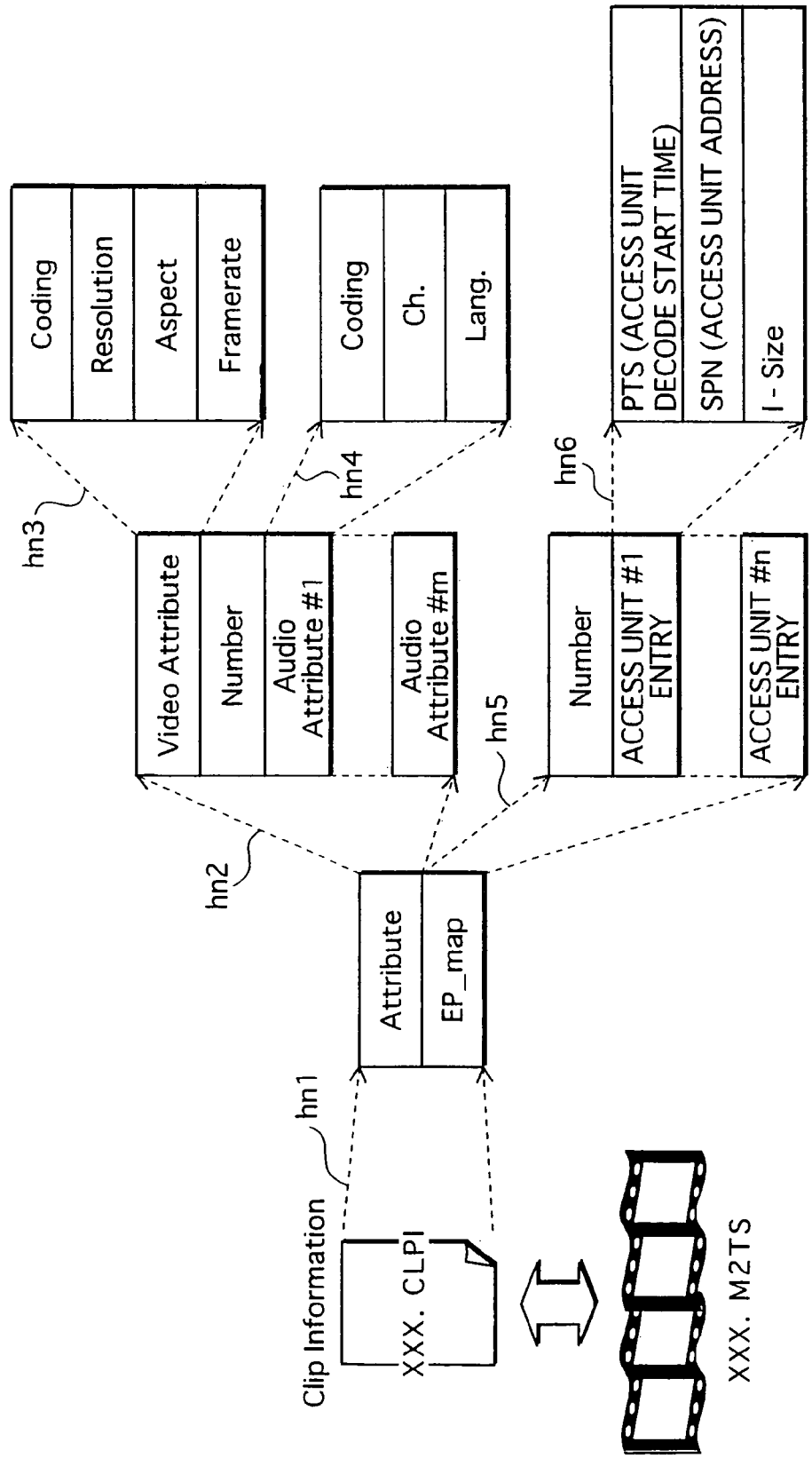
FIG. 5 is a diagram illustrating an internal structure of Clip information.

Clip information (XXX.CLPI) is management information for an AV Clip. FIG. 5 is a diagram illustrating an internal structure of the Clip information. Since an AV Clip is obtained by multiplexing a video stream and an audio stream, and has ACCESS UNITS that each functions as a unit of random access, specific items managed by the Clip information are: attributes of each of the video stream and the audio stream; and at which position in the AV Clip a random access point exists.

In the drawing, the broken leader lines help clarify a structure of the Clip information. As the leader line hn1 shows, the Clip information (XXX.CLPI) is comprised of: "attribute information" about the video stream and the audio stream; and "EP-map" being a reference table used in making a random access to the ACCESS UNITs.

As the leader line hn2 shows, the attribute information ("Attribute") is comprised of: "Video attribute information" that is attribute information on a video stream; "Number" indicating the number of sets of attribute information; and "Audio attribute information #1-#m" that each representing attribute information for a corresponding one of a plurality of audio streams to be multiplexed onto the AV Clip. As the leader line hn3 shows, the Video attribute information indicates what kind of compression method was employed to compress the video stream (Coding), and a resolution (Resolution), an aspect ratio (Aspect), and a frame rate (Framerate) for each set of picture data constituting the video stream.

As the leader line hn4 shows, audio attribute information#1-#m (attribute information on the audio stream) indicates what kind of compression method was employed to compress the audio stream (Coding), a channel of the audio stream (Ch.), which language the audio stream corresponds to (Lang), and a sampling frequency of the audio stream.

EP_map is a reference table used for performing indirect reference to the addresses of a plurality of random access points, using time information. As the leader line hn5 shows, the EP_map is comprised of: a plurality of sets of entry information (ACCESS UNIT#1 entry, ACCESS UNIT#2 entry, ACCESS UNIT#3 entry . . . ), and entry number (Number). As the leader line hn6 shows, each entry indicates a reproduction start time of a corresponding ACCESS UNIT and the address of the ACCESS UNIT, in association (Note that it is possible to enter the size of the first I picture in the ACCESS UNIT (I-size)). A reproduction start time of an ACCESS UNIT is expressed by a time stamp of picture data positioned at the beginning of the ACCESS UNIT (presentation time stamp). In addition, an address of an ACCESS UNIT is expressed by a serial number of a corresponding TS packet (SPN(Source Packet Number)). In coding, the variable length coding compression method is adopted. Therefore, even if there are varieties in size and reproduction time between each ACCESS UNIT including GOP, it becomes possible to perform random access, from any reproduction time, to the picture data of the ACCESS UNIT corresponding to a destination reproduction time, by referring to the entry of this ACCESS UNIT.

Note that the file name XXX in XXX.CLPI is identical to the name of an AV Clip whose Clip information matches. For example, the file name of the AV Clip in this drawing is XXX, and so it corresponds to the AV Clip (XXX.M2TS). Next, playlist information (PL information) is explained.

Figure 6:
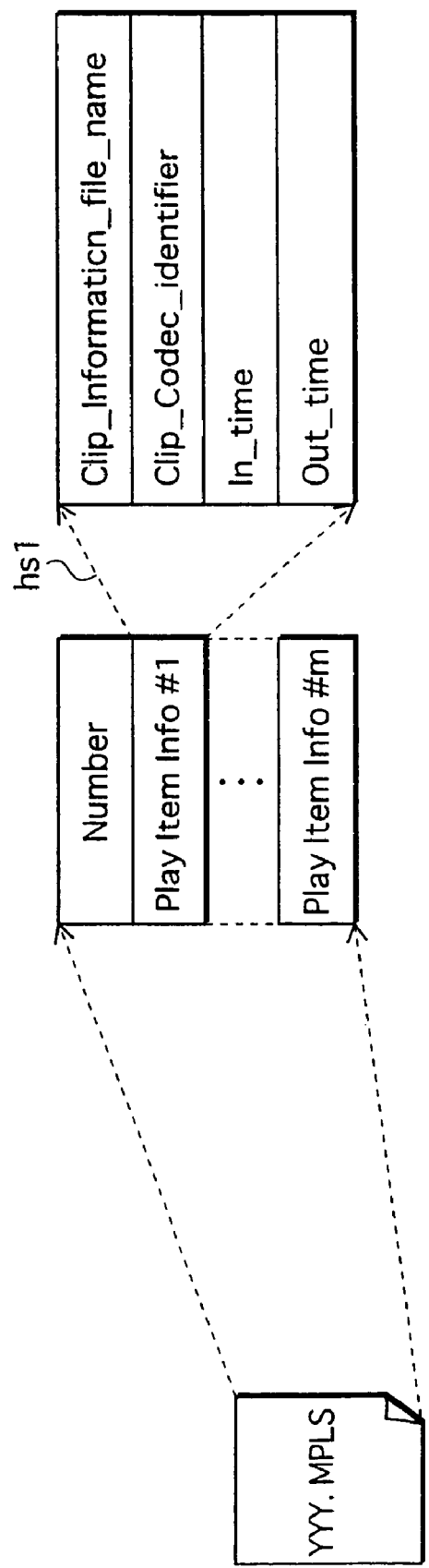
FIG. 6 is a diagram illustrating an internal structure of playlist information (PL information).

YYY.MPLS (playlist information) is a table constituting a playlist being reproduction path information, and is comprised of a plurality of pieces of PlayItem information (PlayItem information #1, #2,E3 ... #n), and PlayItem information number (Number). FIG. 6 is a diagram illustrating an internal structure of playlist information. One piece of PlayItem information defines one or more logical reproduction sections that constitute a playlist. The leader line hs1 in the drawing helps clarify a structure of one piece of PlayItem information. As this leader line shows, the piece of PlayItem information is comprised of: "Clip_Information_file_name" representing a file name of reproduction section information of an AV Clip to which the In-point and Out-point of the reproduction section belongs; "Clip_codec_identifier" representing a coding method used to encode the AV Clip; "IN_time" being time information indicating a start point of the reproduction section; and "OUT_point" being time information indicating an ending point of the reproduction section.

Figure 7:
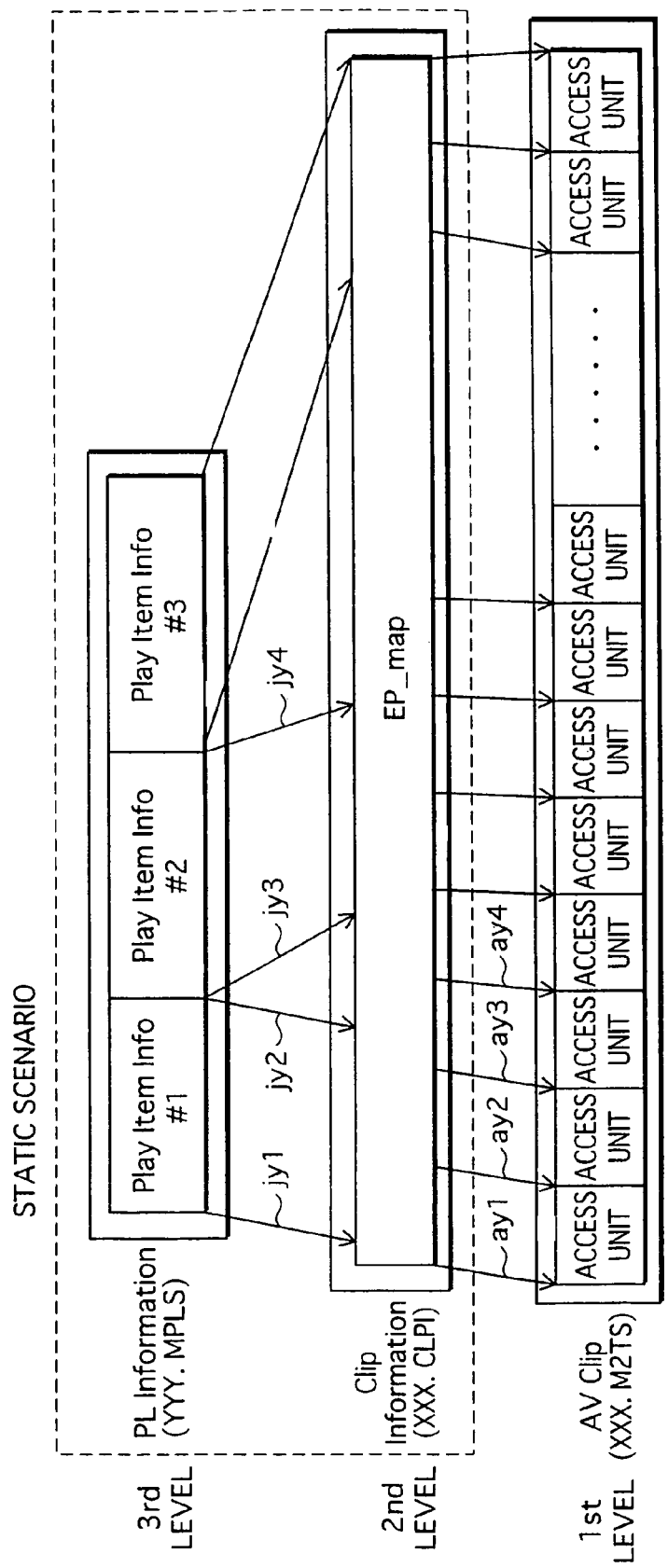
FIG. 7 is a diagram schematically showing an indirect reference by means of PL information.

The PlayItem information is characterized by its notation method. Specifically, in the PlayItem information, reproduction sections are defined in an indirect way by means of time, using the EP_map as a reference table. FIG. 7 is a diagram schematically illustrating this indirect reference. In this drawing, an AV Clip is comprised of a plurality of ACCESS UNITS. The EP_map of the Clip information specifies the addresses of the ACCESS UNITs as shown by the arrows ay1, 2, 3, and 4. The arrows jy1, 2, 3, and 4 schematically show how the pieces of PlayItem information are used to make a reference to the ACCESS UNITS. In other words, reference made by means of the pieces of PlayItem information (i.e. the arrows jy 1, 2, 3, and 4) is able to specify the addresses of ACCESS UNITs within the AV Clip, via the EP_map, and so can be regarded as an indirect reference using time concept by means of EP_map.

A reproduction section on a BD-ROM, comprised of a combination of PlayItem information, Clip information, and AV Clip is called "PlayItem". A logical reproduction unit on a BD-ROM, comprised of a combination of PL information, Clip information, and AV Clip is called "playlist" (abbreviated as PL). A movie work recorded in a BD-ROM is structured by such logical reproduction units (i.e. PL). Therefore, it is easy to produce another movie work made of all the scenes with a character, by defining PLs specifying scenes with the character.

Because movie works recorded in BD-ROMs have the aforementioned logical structure, quoting of an AV Clip constituting a scene of a movie work in another movie work can be efficiently performed.

Next, the interactive graphics stream is described.

Figure 8:
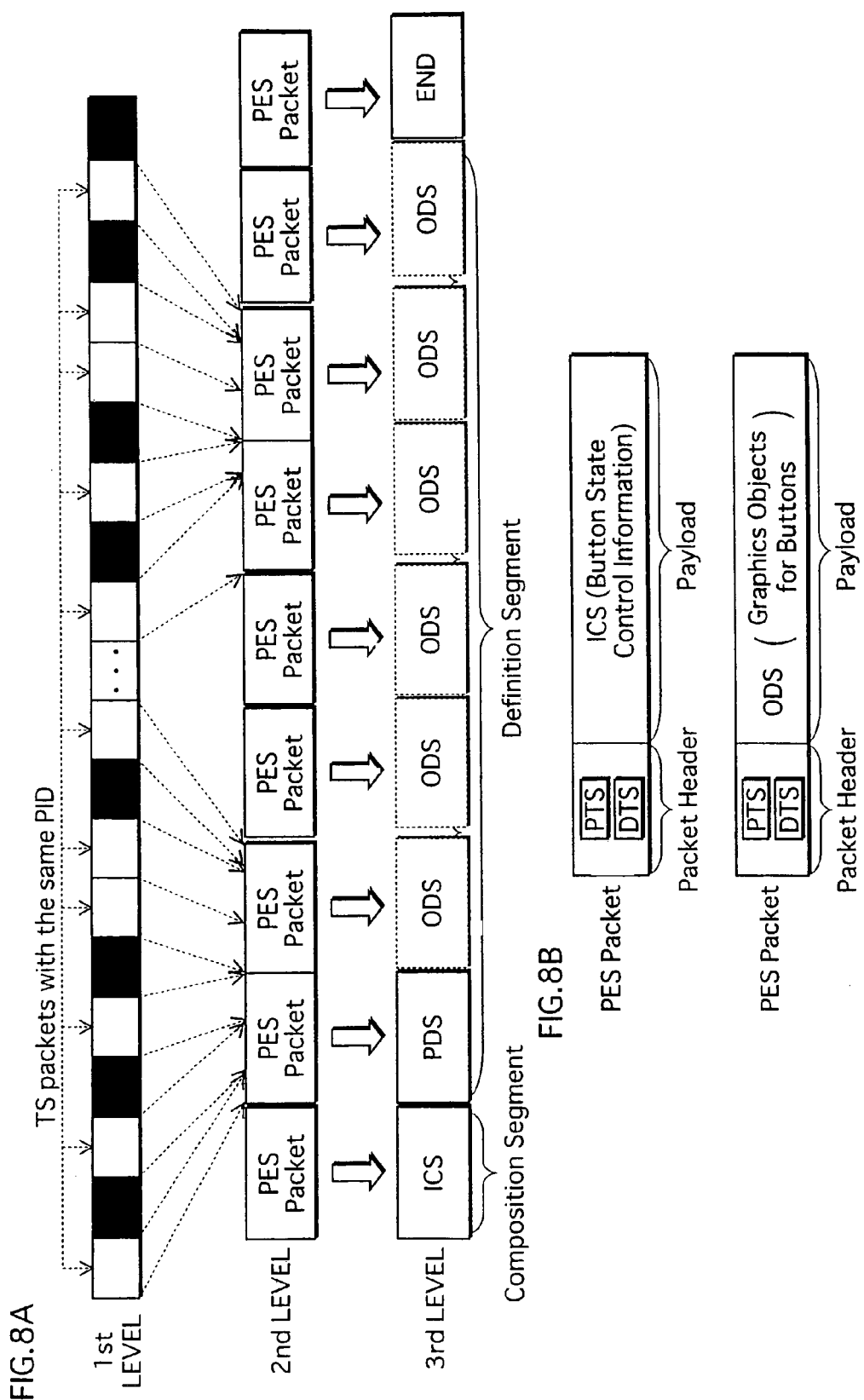
FIG. 8A is a diagram illustrating a structure of the interactive graphics stream.
FIG. 8B is a diagram illustrating an internal structure of each of an ICS and an ODS.

FIG. 8A is a diagram illustrating a structure of the interactive graphics stream. The first row represents a TS packet sequence constituting the AV Clip. The second row represents a PES packet sequence constituting the graphics stream. The PES packet sequence in the second row is structured by extracting payloads from TS packets of the first row that include a predetermined PID, and then linking the extracted payloads together. Note that the presentation graphics stream is not a main focus of the present invention, and so is not explained here.

The third row represents the structure of the graphics stream. The graphics stream is made of functional segments of: ICS(Interactive Composition Segment); PDS (Palette Definition Segment); ODS (Object_Definition_Segment), and END (END of Display Set Segment). Among these functional segments, ICS is called a display composition segment, and PDS, ODS, and END are respectively called a definition segment. The PES packet and each of the functional segments correspond one to one, or one to plurality. In other words, one functional segment is either recorded in the BD-ROM after converted into one PES packet, or after divided into fragments and converted into more than one PES packet.

FIG. 8B is a diagram illustrating PES packets obtained by converting the functional segments. As FIG. 8B shows, a PES packet is made of a packet header and a payload, where the payload is the substance of a functional segment. In addition, the packet header includes a DTS and a PTS corresponding to this functional segment. Hereinafter, DTS and PTS included in a packet header are referred to as DTS and PTS of a functional segment.

Figure 9:
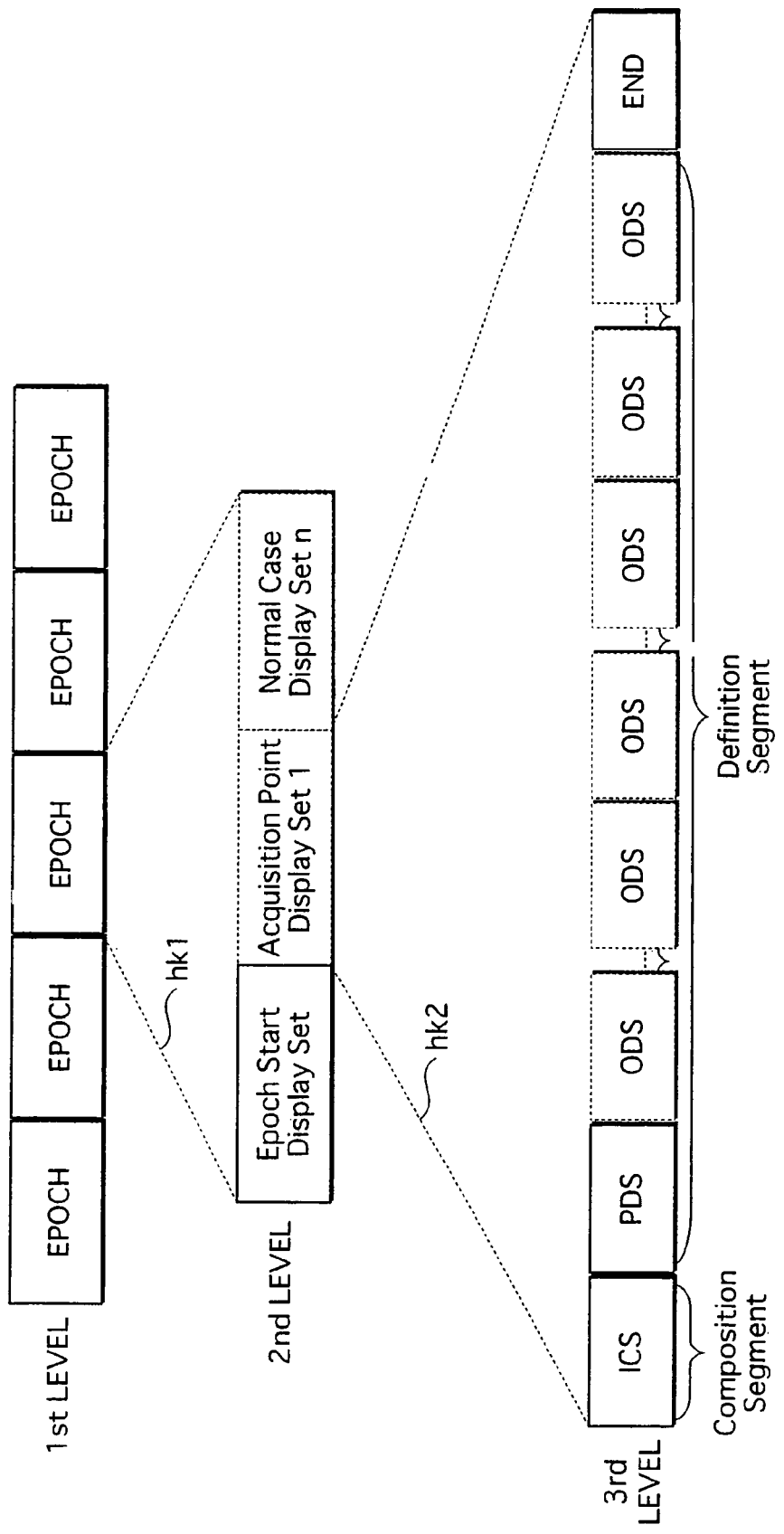
FIG. 9 is a diagram illustrating a logical structure constituted by a various kind of functional segments.

These various kinds of functional segments constitute a logical structure as shown in FIG. 9. In this drawing, the third row represents functional segments, the second row represents Display Sets, and the first row represents Epochs.

The second row is a collection of Display Sets (abbreviated as "DS"), each of which corresponds to graphics that make up one screen of graphics. The broken line in the drawing indicates to which DS the functional segments of the third row belong. As can be understand from the above, a series of functional segments of "ICS-PDS-ODS-END" constitutes one DS. A reproduction apparatus can constitute one screen of graphics by reading a series of functional segments constituting one DS, from the BD-ROM.

Each Epoch in the first row represents a period having memory management continuity on a reproduction time axis for an AV Clip, and also corresponds to a data set assigned to this period. Here the assumed memory is a graphics plane that is for storing one screen of graphics, or an object buffer for storing graphics data in decompressed state. By stating a graphics plane or an object buffer has memory management continuity, it is meant that a flash does not occur in the graphics plane or in the object buffer in a period represented by the Epoch, and deletion/re-drawing for graphics is performed only within a predetermined rectangular area within the graphics plane (Here, the flash means clearing all the contents stored in the plane or in the buffer). The size (length/width) and position of this rectangular area are fixed throughout an Epoch. As long as deletion/re-drawing of graphics is performed within this fixed area of the graphics plane, seamless reproduction is guaranteed. That is, an Epoch can also be considered as one unit on a reproduction time axis, at which seamless reproduction is guaranteed. If a user wants to change the area, he has to define a change time on the reproduction time axis, and create a new Epoch that corresponds to the time after this change time. In this case, seamless reproduction will not be guaranteed between these two Epochs.

Note that what is meant by "seamless reproduction" is that deletion/re-drawing of graphics will complete within a predetermined video frame number. For an interactive graphics stream, this video frame number is 4 to 5 frames. This number of video frames is determined by a ratio of a fixed area to an entire graphics plane, and a transfer rate between the object buffer and the graphics plane.

In the drawing, the broken lines hk1, 2 represent to which Epoch the functional segments in the third row belong. As can be understood from this drawing, a series of DS (namely, Epoch Start, Acquisition Point, and Normal Case) constitutes an Epoch of the first row. "Epoch Start", "Acquisition Point", and "Normal Case" are respectively a type of DS. Note that the order of "Acquisition Point" and "Normal Case" is merely one example, and can be reversed.

"Epoch Start" is a DS that produces a display effect of "new display", and indicates a start of a new Epoch. Therefore an Epoch Start has to include all the functional segments required to compose a next screen, and is disposed at a position in an AV Clip, which is destined for a random access target (e.g. chapter of a movie work).

"Acquisition Point" is a Display Set that produces a display effect of "display refresh", and relates to a preceding "Epoch Start". The Acquisition Point is classified into two types: Duplicate and Inherit. A Duplicate is a Display Set totally identical to a preceding Epoch Start, whereas an Inherit is a Display Set inheriting the functional segments from a preceding Epoch Start but has different button commands from the preceding Epoch Start. Although not representing a start time of an Epoch, an Acquisition-Point DS includes all the functional segments required to compose a next screen. Therefore if a random access is performed to an Acquisition-Point DS, graphics display is guaranteed. In other words, an Acquisition-Point DS enables a screen composition during an Epoch in progress.

An Acquisition-Point Display Set is incorporated into a position that is a random access target. Such a position can be specified by time search. Time search is an operation in which input of time (minute and second) is received from a user, and random access is made to a reproduction time corresponding to the inputted time. Such time input is performed in a rough unit such as 10 minutes or 10 seconds, and so time search can specify reproduction points in 10 minutes interval or 10 seconds interval. By providing Acquisition Points at positions that can be specified by the time search, graphics stream reproduction will be facilitated at the time search.

"Normal Case" is a DS that produces a display effect of "display update", and only includes a difference with the prior display composition. For example, suppose that a button for a DSv has a same image design as a preceding DSu, but is under different state control from the DSu. In this case, the DSv is arranged either to only include ICS, or to only include ICS and PDS, and set the DSv as a Normal-Case DS. By doing so, it is not necessary to provide overlapping ODSS, and so helps reduce the occupied areas in a BD-ROM. Note that a Normal-Case DS cannot compose a screen by itself, because it represents only the difference.

An interactive display defined by these DS is created by disposing GUI parts on a screen. By stating that a DS has interactivity, it means that the state of the GUI parts is changeable in accordance with a user operation. In the present embodiment, such GUI parts, which are a user operation target, are called "button". The states of a button include "normal state", "selected state", and "active state", each of which is composed by a plurality of graphics in decompressed state. Each decompressed graphics representing a state of a button is called "graphics object". The reason why one state of each button is represented by a plurality of decompressed graphics is for the purpose of animation display.

Next, the Definition Segments (ODS, PDS) are explained.

"Object_Definition_Segment" is information defining a graphics object. The following explains this graphics object. An AV Clip, recorded in a BD-ROM, features high-quality images that can be compared to those of a high-definition television. Accordingly, the resolution of the graphics object is high, which is 1920*1080 pixels, so as to produce a high definition. As for the color of a pixel, an index value for one pixel is set as 8 bit length. Here, the index value includes red color-difference component (Cr_value), blue color-difference component (Cb_value), brightness component (Y_value), and transparency level (T_value). By this setting, arbitrary 256 colors can be selected from 16,777,216 colors (full color), thereby enabling setting of the 256 colors as colors for the pixel.

Figure 10A:
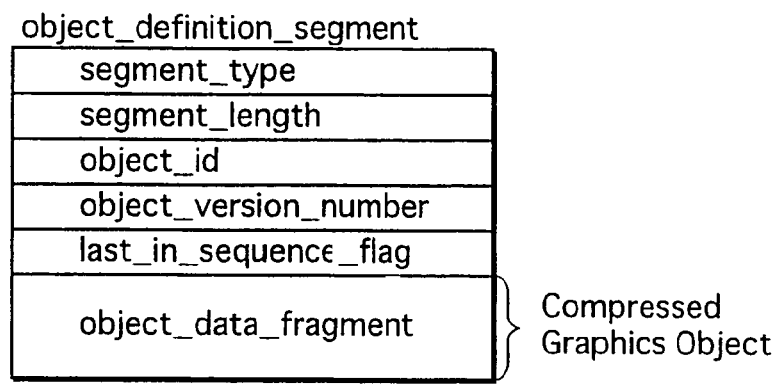
FIG. 10A is a diagram illustrating a data structure of an ODS, which defines a graphics object.

An ODS has a data structure as shown in FIG. 10A, for defining a graphics object. An ODS is comprised of: "segment_type" that indicates that it is an ODS; "segment_length" that indicates a data length of the ODS; "object_ id" that uniquely identifies the graphics object that corresponds to this ODS in the Epoch; "object_version_number" that indicates a version of the ODS in the Epoch; "last in sequence flag"; and a continuous byte-length data "object_data fragment" that is either a part or all of the graphics object.

"object_id" uniquely identifies the graphics object that corresponds to this ODS in the Epoch. However, when animation is constituted by a plurality of graphics objects defined by a plurality of ODSS, "object_id" assigned to each of the plurality of ODSs will be serial numbers.

Next, "last in sequence flag" and "object_data_fragment" are explained. There is a case where decompressed graphics constituting a button cannot be stored in one ODS, because of a constraint on the payload of a PES packet. In such a case, a division (fragment) of a button command is set as "object_data_fragment". When storing one graphics object in a plurality of ODSS, all the fragments have to have the same size, except the last fragment. That is, the last fragment will have smaller size than the other fragments. The plurality of ODSs storing these fragments will appear in the identical order in a DS. The last part of the graphics object is specified by an ODS having "last in sequence flag". The above-described data structure of an ODS assumes adoption of a storing method by which storing for a new PES packet does not start until a current PES packet becomes full. However, it is also possible to adopt a storing method by which there will be empty space in each PES packet.

Figure 10B:
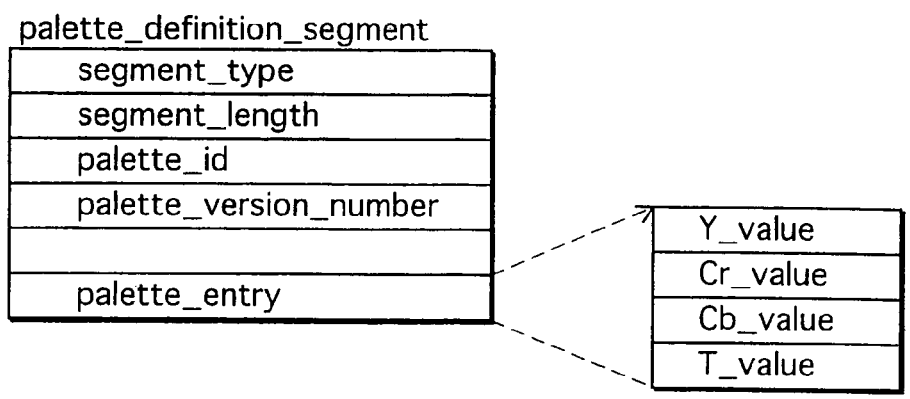
FIG. 10B is a diagram illustrating a data structure of a PDS.

"palette_definition_segment (PDS)" is information that defines a palette for color conversion. A data structure of a PDS is shown in FIG. 10B. As shown by FIG. 10B, a PDS is comprised of: "segment_type" that indicates that it is a PDS; "segment_length" that indicates a data length of the PDS; "palette_id" that uniquely identifies the palette included in the PDS; "palette_version_number" that indicates a version of the PDS in the Epoch; and "palette_entry" that is information about each entry. "palette_entry" represents a red color-difference component (Cr_value), blue color-difference component (Cb_value), brightness component (Y_value), and transparency level (T_value), for each entry.

Next, END of Display Set Segment is explained.

END of Display Set Segment is an index indicating an end of a Display Set transfer, and is disposed immediately after the last ODS. The internal structure of this "END of Display Set Segment" is comprised of: segment_type that indicates that this functional segment is an END of Display Set Segment; and segment_length that indicates a data length of the functional segment, which do not require particular explanation. Therefore the drawing does not show the internal structure.

Figure 11:
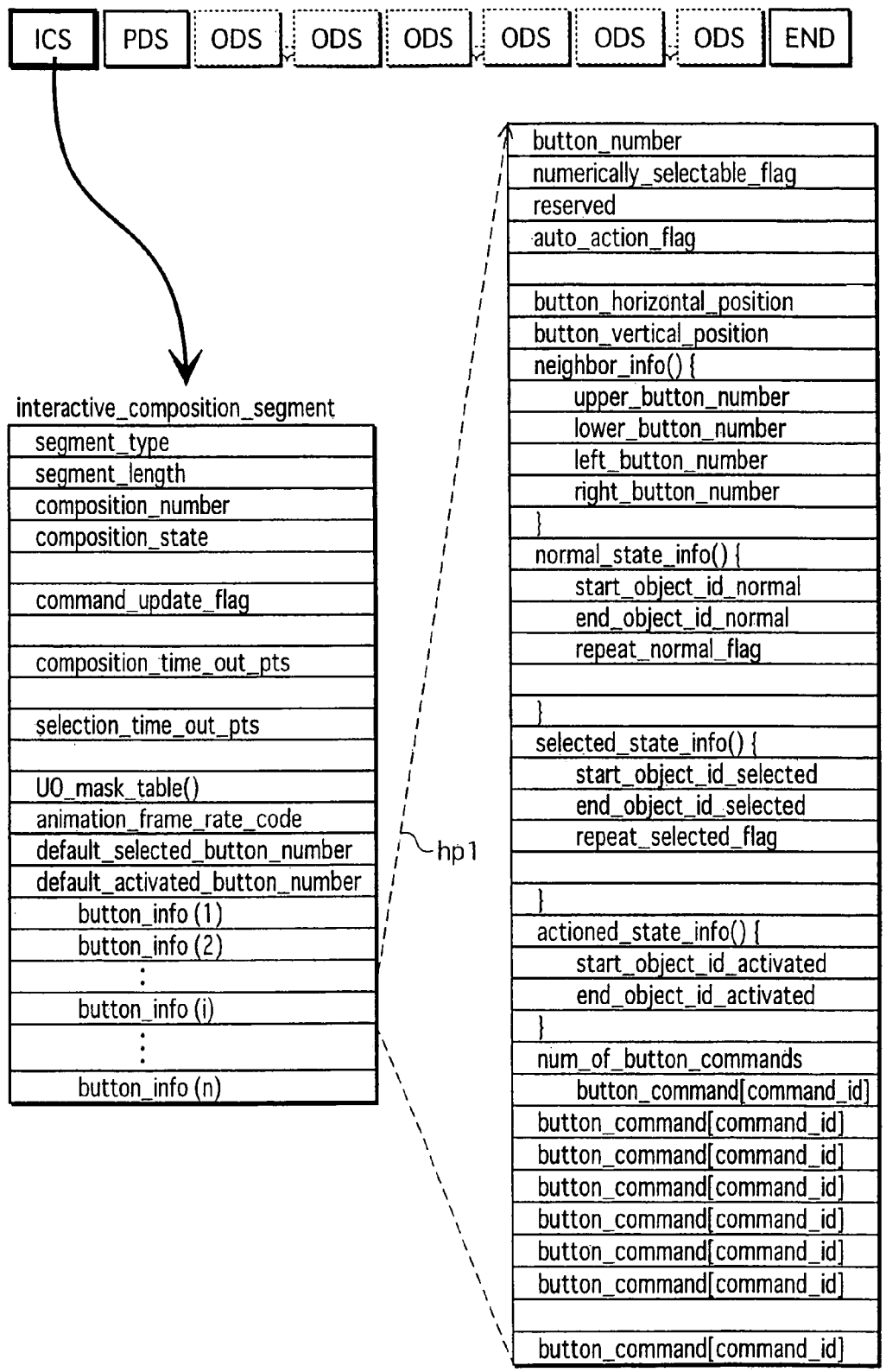
FIG. 11 is a diagram illustrating a data structure of an Interactive Composition Segment.

Next, an Interactive Composition Segment (ICS) is explained. An ICS is a functional segment constituting an interactive display. An ICS has a data structure shown in FIG. 11. As shown in this drawing, an ICS is comprised of: segment_type; segment_length; composition_number; composition_state; command_update_flag; composition_timeout_PTS; selection_timeout_PTS; UO_mask_table; animation_frame_rate_code; default_selected_button_number; default_activated_button_number; and "button information set (button info (1)(2)(3))".

"composition_number" indicates whether update is performed in the DS to which the ICS belongs, and takes a number from 0 to 15.

"composition_state" indicates whether the DS that starts with the particular ICS is a normal case, acquisition case, or epoch start.

"command_update_flag" indicates whether the button commands in the ICS have any change from the counterparts of the preceding ICS. For example, when a DS that a certain ICS belongs to is an Acquisition Point, the ICS will have the same content as the immediately preceding ICS, in principle. However, when this command_update_flag is set to be ON, it becomes possible to set, in the ICS, a button command different from the preceding DS. By this flag, a preceding graphics object can be appropriated, however the command gets valid when it is instructed to be changed.

"composition_timeout_PTS" describes an ending time of an interactive display by means of buttons. At the ending time, display of the interactive display is no more valid, and therefore is not presented. composition_timeout_PTS is preferably described in a time accuracy of the reproduction time axis for the motion picture data.

"selection_timeout_PTS" describes an ending time of a valid button selection period. At the time shown by the selection_timeout_PTS, a button specified by default_activated_button_number gets activated. selection_timeout_PTS is equal to the time specified by composition_timeout_PTS or shorter. selection_timeout_PTS is described in a time accuracy of a video frame.

"UO_mask_table" indicates permission/non-permission of a user operation in a Display Set corresponding to an ICS. When "non-permission" is set in this mask field, any user operation directed to a reproduction apparatus becomes invalid.

"animation_frame_rate_code" describes a frame rate to be applied to a button displayed in animation. The animation frame rate is given by dividing the video frame rate by a value of this field. If this field indicates a value of 00, only ODS identified by start_object_id_xxx is displayed and in non-animation, among the ODS defining graphics objects for all the buttons.

"default_selected_button_number" indicates a button number whose default is to be set in a selected state at the start of an interactive display. When this field indicates 0, the button assigned a button number stored in the register of a reproduction apparatus is set to be an active state automatically. If this field indicates other than 0, the field is interpreted to identify a corresponding button.

"default_activated_button_number" indicates a button to be set in active state automatically, in a case when a user has not set any button in active state within the time defined by the selection_timeout_PTS. When the default_activated_button_number indicates "FF", the button currently in selected state is automatically selected at the time defined by the selection_timeout_PTS. When the default_activated_button_number indicates "00", the automatic selection is not performed. When the defaut_activated_button_number indicates other than "00" and "FF", then this field is interpreted to identify a corresponding button.

"button information(button_info)" is information defining each button to be overlayed in an interactive display. In the drawing, the leader line hp1 helps clarify the internal structure of the button information i, which is information about the ith button to be controlled by the ICS (button i). The following is an explanation on information elements constituting this button information i.

"button_number" is a numerical value uniquely identifying a button i in an ICS.

"numerically_selectable_flag" is a flag indicating whether a numerical-value selection is permitted for the button i.

"auto_action_flag" indicates whether to automatically set the button i to be active state. When auto_action_flag is set to be ON (i.e. bit value of 1), the button i is set to be in active state, instead of selected state. When the auto_action_flag is set to be OFF (i.e. bit value of 0), the button i will be in mere selected state even when the button i is actually selected.

"object_horizontal_position", "object_vertical_position" respectively indicate a horizontal position and a vertical position of the upper left pixel of the button i in an interactive display.

"upper_button_number" indicates a button number to be in selected state, instead of the button i, when the MOVEUP key is pressed while the button i is in selected state. If the number for the button i is set in this field, the press of the MOVEUP key is ignored.

"lower_button_number", "left_button_number", and "right_button_number" respectively indicate the button numbers to be in selected state, instead of the button i, when the MOVEDOWN key, the MOVELEFT key, the MOVERIGHT key are pressed while the button i is in selected state. When the number for the button i is set in this field, the press for these keys is ignored.

"start_object_id_normal" indicates the first number of serial numbers assigned to a plurality of ODSs constituting animation, when the button i in normal state is to be drawn in animation.

"end_object_id_normal" indicates the last number of the object_id being the serial numbers assigned to the plurality of ODSs constituting the animation, when the button i in normal state is to be drawn in animation. If the ID indicated by this end_object_id_normal is identical to the ID indicated by the start_object_id_normal, then the still image corresponding to a graphics object identified by this ID will be the image design of this button i.

"repeated_normal_flag" indicates whether to repeatedly continue the animation display for the button i in normal state.

"start_object_id_selected" indicates the first number of the serial numbers assigned to the plurality of ODSs constituting animation, when the button i in selected state is drawn in animation. If the ID indicated by end_object_id_selected is identical to the ID indicated by this start_object_id_selected, then the still image corresponding to a graphics object identified by this ID will be the image design of this button i.

"end object_id_selected" indicates the last number of the object_id being the serial numbers assigned to the plurality of ODSs constituting the animation.

"repeat_selected_flag" indicates whether to repeatedly continue the animation display for the button i in selected state. When start_object_id_selected has the same value as end object_id_selected, 00 is set in this field.

"start_object_id_activated" indicates the first number of the serial numbers assigned to the plurality of ODSs constituting animation, when the button i inactive state is drawn in animation.

"end_object_id_activated" indicates the last number of object_id being the serial numbers assigned to the plurality of ODSs constituting animation, when the button in active state is drawn in animation.

Next, the button commands are explained.

"button command (button_command)" indicates a command to be executed when the button i is put into active state.

The button command can instruct a reproduction apparatus to perform reproduction directed to PL and PlayItem. A command that instructs a reproduction apparatus to perform reproduction directed to PL and PlayItem is called "LinkPL command". This command can start reproduction of a playlist specified by a first argument, from a position specified by a second argument.

Format: LinkPL(first argument, second argument)

The first argument specifies, by means of a number assigned to a playlist, a PL to be reproduced. The second argument specifies a reproduction start position, by means of a PlayItem included in the PL, or a chapter and a mark that are included in the PL.

A LinkPL function for specifying a reproduction start position by means of PlayItem is expressed as "LinkPLatPlayItem( )".

A LinkPL function for specifying a reproduction start position by means of Chapter is expressed as "LinkPLatChapter( )".

A LinkPL function for specifying a reproduction start position by means of Mark is expressed as "LinkPLatMark( )".

A button command is used to give instructions to a reproduction apparatus to perform a state obtaining and a state setting. A state of a reproduction apparatus is indicated by 64 Player Status Registers (whose set value is called PSR), and 4096 General Purpose Registers (whose set value is called GPR). The button command is classified into the following (i)-(iv), and performs setting of a value to these registers, and obtaining of a value from these registers.

(i) "Get value of Player Status Register" Command Format:
  Get value of Player Status Register (argument)
  This function is used when obtaining a set value of a Player Status Register specified by an argument.
(ii) "Set Value of Player Status Register" Command Format:
  Set value of Player Status Register (first argument, second argument)
  The function is used when setting a value specified by a second argument to a Player Status Register specified by a first argument.
(iii) "Get Value of General Purpose Register" Command Format: Get value of General Purpose Register (argument)
  This function is used when obtaining a set value of a General Purpose Register specified by an argument.
(iv) "Set Value of General Purpose Register" Command Format: Set value of General Purpose Register (first argument, second argument)
  This function is used when setting a value specified by a second argument to a General Purpose Register specified by a first argument.

Figure 12:
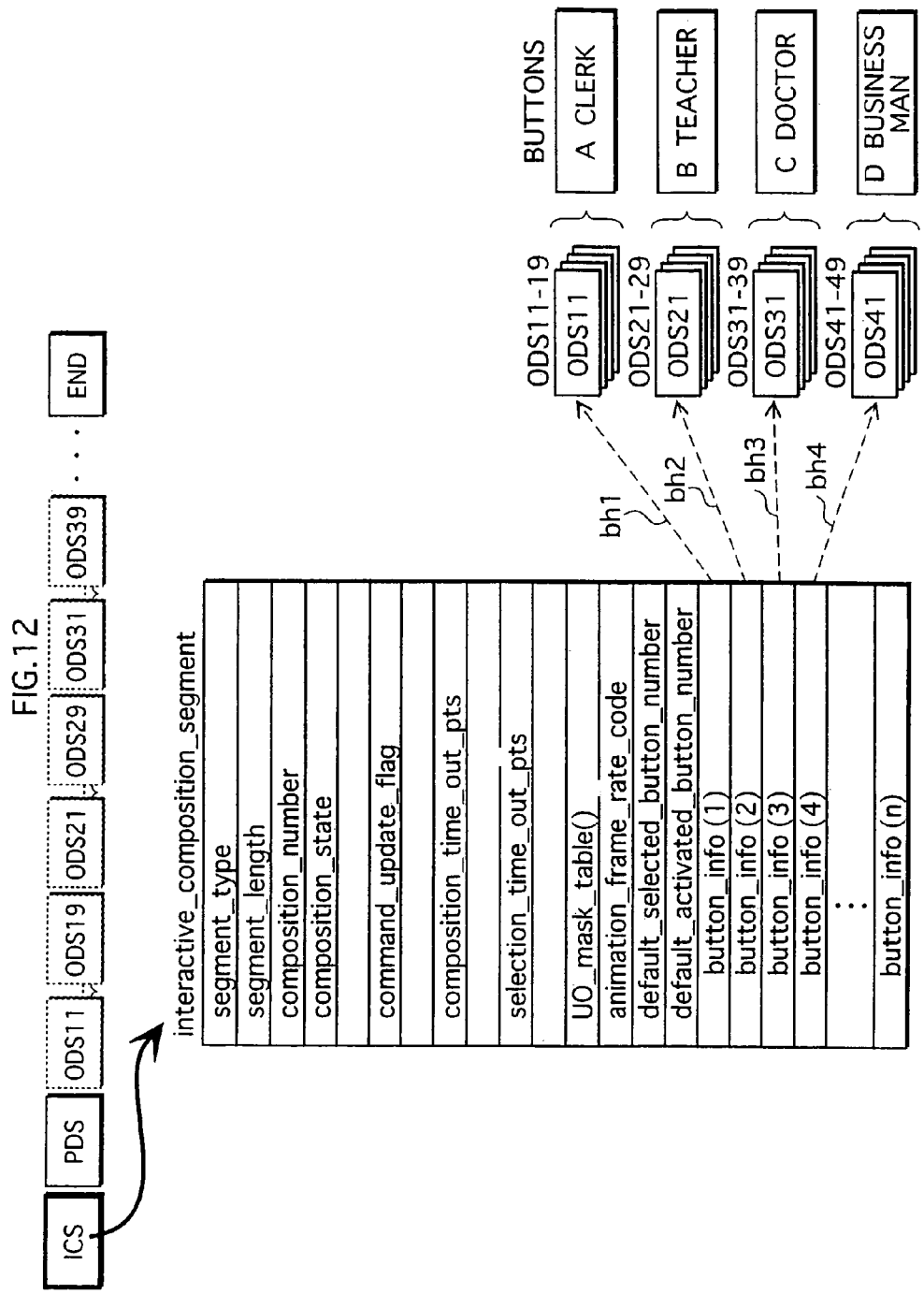
FIG. 12 is a diagram illustrating a relation between ODSs in a DSn and an ICS.

Next, a concrete example of interactive control performed by such an ICS is explained. This concrete example assumes the ODSs and the ICS as shown in FIG. 12. FIG. 12 is a diagram illustrating a relation between ODSs in a DSn, and an ICS. This DSn is supposed to include ODS11-19, 21-29, 31-39, and 41-49. Among these ODSs, ODS11-19 draw each state of a button A. ODS21-29 draw each state of a button B. ODS31-39 draw each state of a button C, and ODS41-49 draw each state of a button D (as shown by a sign "}" in the drawing). In addition, button_info(1),(2),(3),(4) respectively indicate the state control of these buttons A-buttons D (Refer to the arrows bh1,2,3,4 in the drawing).

When the execution timing of the control by means of this ICS coincides with a display timing of any picture data pt1, which is among the pictures of FIG. 13, an interactive display tm1 made of buttons A-D is displayed (gs2) by being overlayed (gs1) with this picture data pt1. An interactive display made of a plurality of buttons is displayed in accordance with the content of a motion picture. Therefore an ICS can realize realistic effect with use of buttons.

Figure 14:
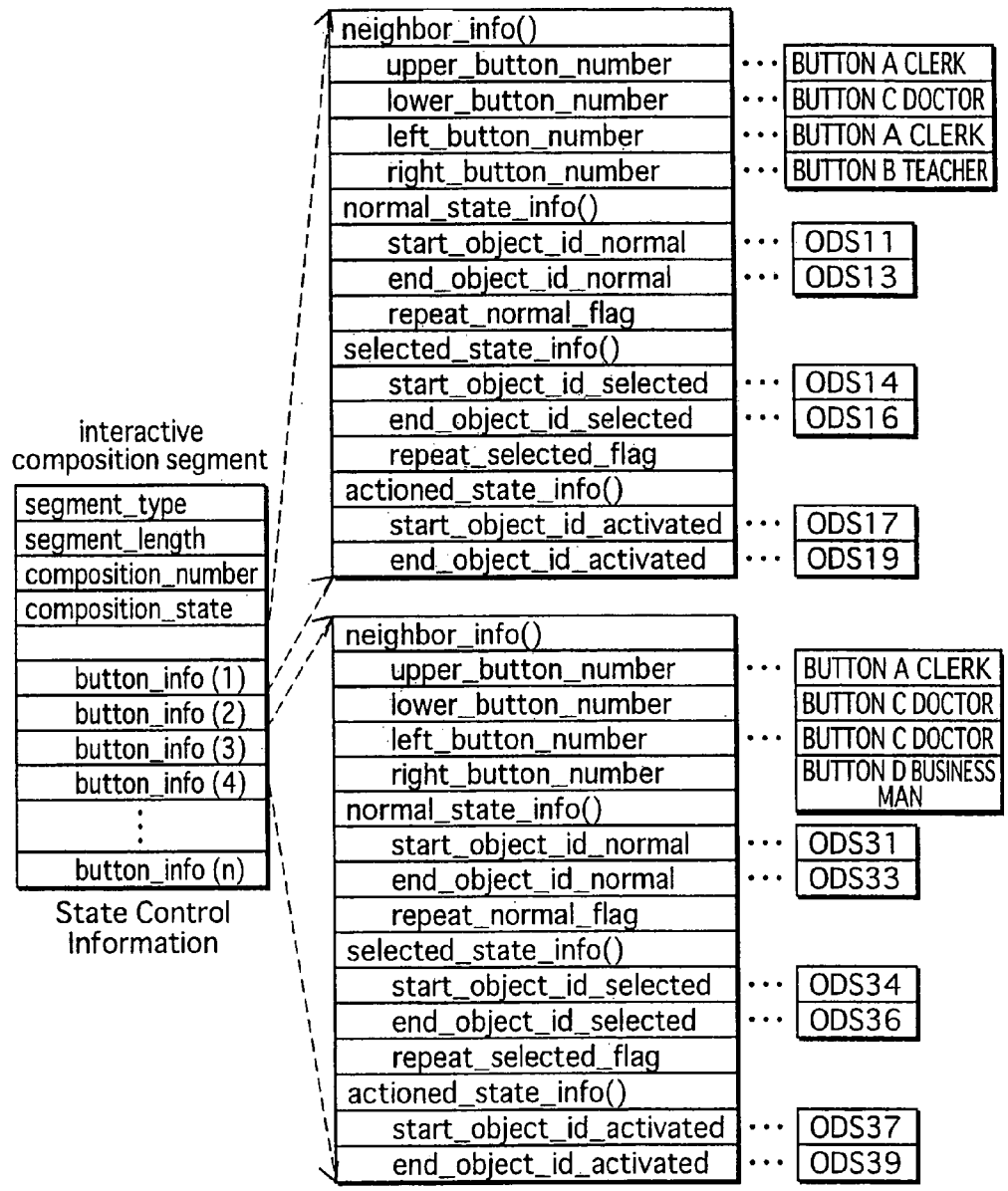
FIG. 14 is a diagram illustrating a setting example of button information in ICS.

FIG. 14 illustrates a description example of an ICS when the state transition of the buttons A-D (shown in FIG. 15) is performed.

Figure 15:
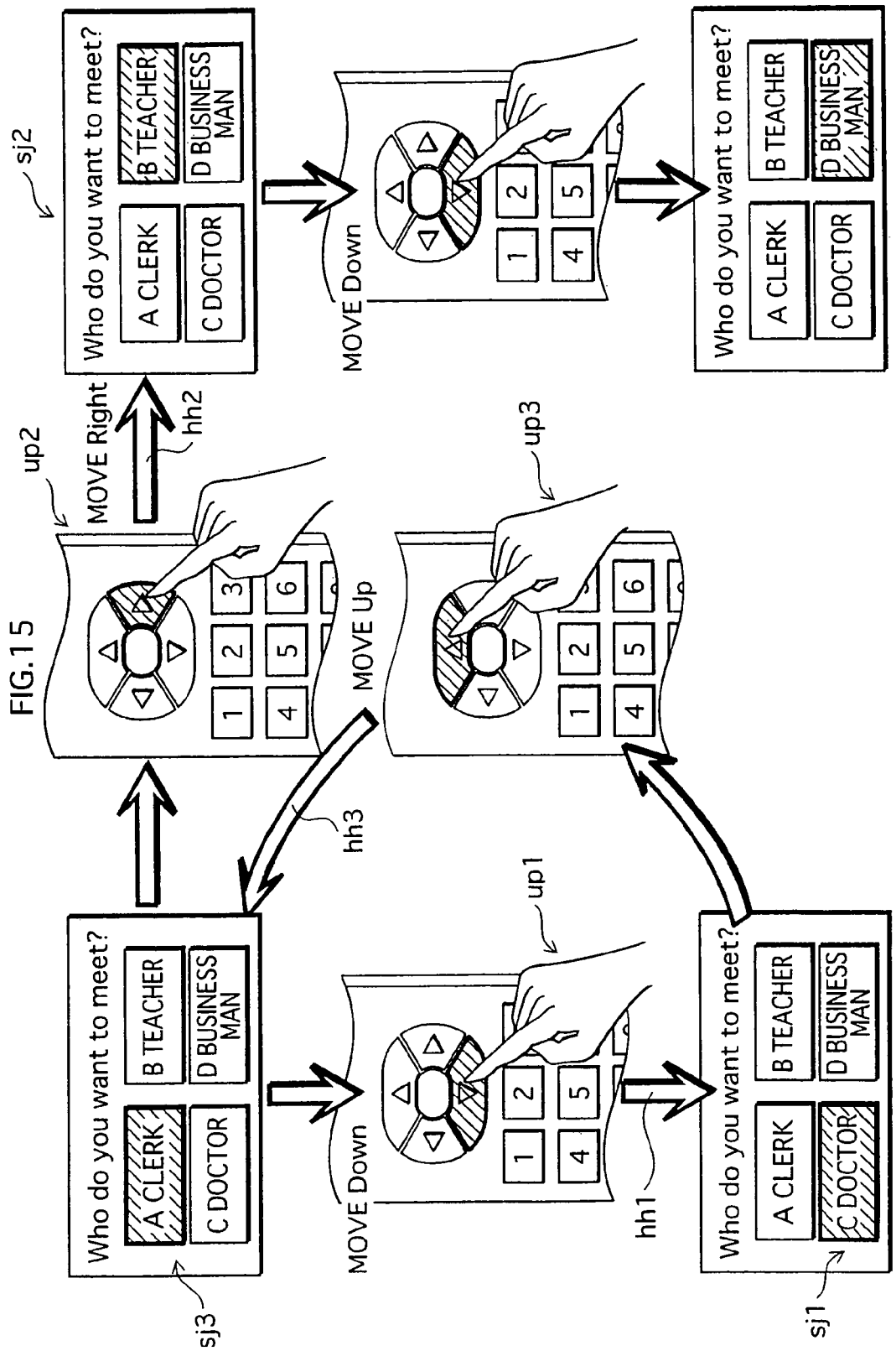
FIG. 15 is a diagram illustrating one example of the state transition of buttons A-D.

In FIG. 15, arrows hh1 and hh2 symbolically represent a state transition by means of neighbor_info( ) of button info (1). In the neighbor_info( ) of the button info(1), the lower_button_number is set as "button C", and so the button C will be in selected state (sj1 of FIG. 15) if an UO of MOVEDOWN key press occurs while the button A is in selected state (up1 of FIG. 15). In the neighbor_info( ) of the button info (1), the right_button_number is set as "button B", and so the button B will be in selected state (sj2 of FIG. 15) if an UO of MOVERIGHT key press occurs while the button A is in selected state (up2 of FIG. 15).

The arrow hh3 in FIG. 15 indicates a state transition control by means of neighbor_info( ) of the button info (3). In the neighbor_info( ) of the button info (3), upper_button_number is set as "button A", and so the button A will return to the selected state if an UO of MOVEUP key press occurs while the button C is in selected state (up3).

Next, the image designs of the buttons A-D are described. Suppose here that ODS11, 21, 31, and 41 have the image designs shown in FIG. 16, and that the ODS11-19 assigned to the button A have the image designs shown in FIG. 17. Because, in the normal_state_info( ) in the button_info (1) of the ICS, start_object_id_normal and end_object_id_normal specify ODS11-13, and so the normal state of the button A is presented in animation according to the ODS11-13. In addition, in the selected_state_info( ) of the button_info(1), start_object_id_selected and end_object_id_selected specify ODS14-16, and so the selected state of the button A is presented according to the ODS14-16. When a user puts the button A into selected state, the image design of the button A will change from the design according to the ODS11-13, to the design according to the ODS14-16. Here, in the normal_state_info( ) and the selected_state_info( ), if the repeat_normal_flag and repeat_select_flag, are set as 1, the animation according to the ODS11-13 and the animation according to the ODS14-16 will be repeatedly continued respectively, as shown by "→(A)", "(A)→", and "→(B)", "(B)→" in the drawing.

If a plurality of ODSs presentable in animation are assigned to the buttons A-D, and that the control for these ODS is described in the ICS, realistic-looking button state control will be realized (e.g. to change the expression of a character according to each user operation).

Next, application of numerically_selectable_flag is described.

Figure 18:
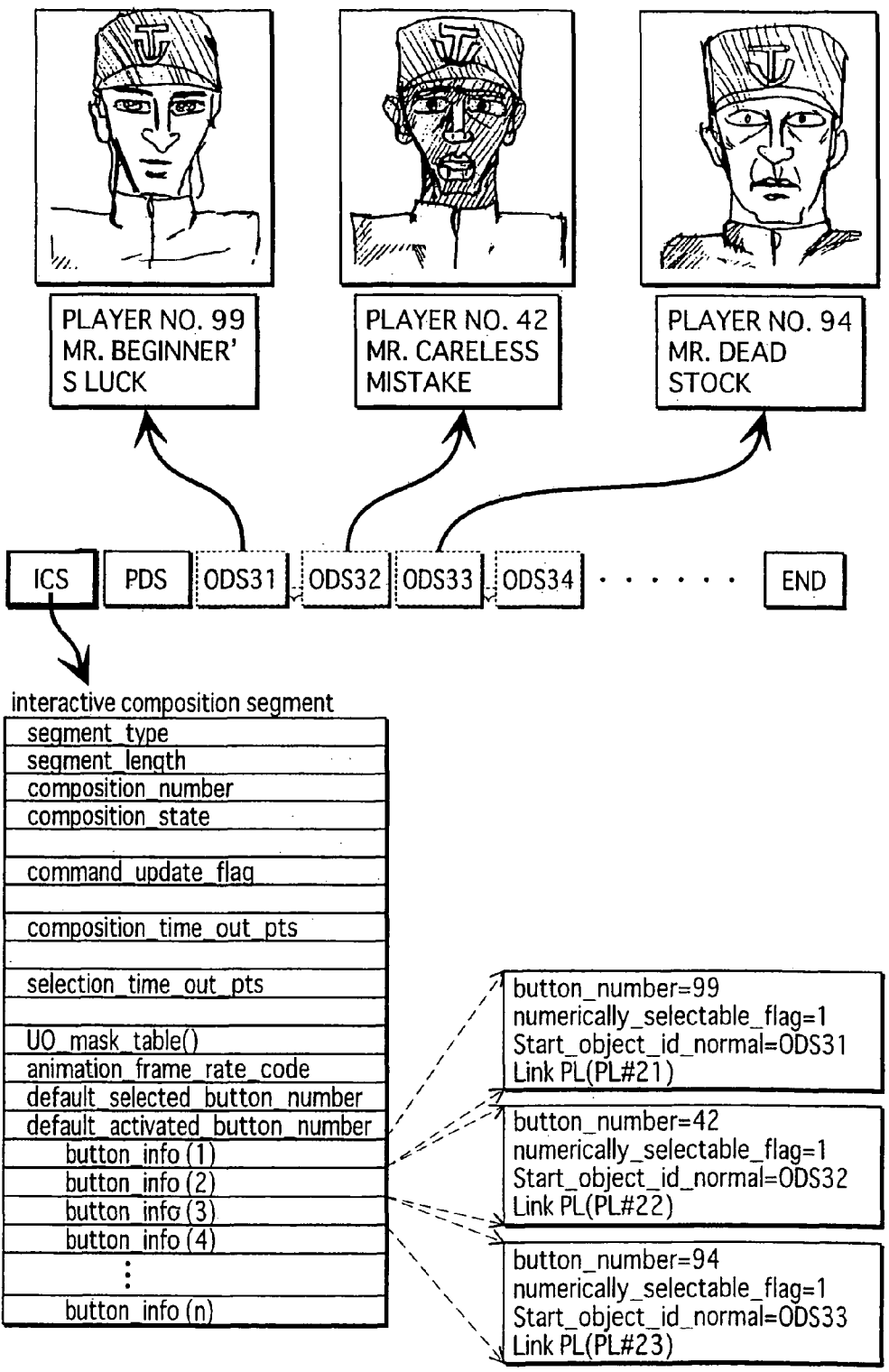
FIG. 18 is a diagram illustrating one example of ICS and ODS included in a DS.

FIG. 18 is a diagram illustrating one example of ICS and ODS included in a DS. In this drawing, the ODS31-33 respectively indicate a portrait, a name, and a uniform number of a corresponding one of three baseball players shown in the top row of the drawing. The ICS to which this DS belongs includes three sets of button information, where the button information (1)'s start_object_id is set to indicate the ODS31, the button information (2)'s start object_id is set to indicate the ODS32, and the button information (3)'s start_object_id is set to indicate the ODS33. In addition, the button information (1)'s button number is set as 99, the button information (2)'s button information is set as 42, and the button information (3)'s button information is set as 94. Furthermore, for all the button information (1)-(3), the numerically_selectable_ flag is set as 1. This means that any of the buttons corresponding to the button information (1)-(3) is selectable. Therefore if the numerical value of "99" is inputted by a user through the remote controller 400, the button corresponding to Mr. Beginner's Luck will be put to selected state. The input of the numerical value "99" may be received through sequential press of "9" and "9". Alternatively, it may be realized by a combination of a press of "9" and 9 times of press directed to "+10" key. When the numerical value of "42" is inputted, the button for Mr. Careless Mistake will be put to selected state, and when the numerical value of "94" is inputted, the button for Mr. Dead Stock will be put to selected state.

When auto_action_flag for these pieces of button information (1)-(3) are set as 1, these pieces of button information (1)-(3) will be put to active state, instead of put to selected state, and the button commands included therein, namely (LinkPL(PL#21), LinkPL(PL#22), LinkPL(PL#23)) will be executed. When the link destinations PL#21, #22, and #23 of the button commands, included in the three pieces of button information, are batting/throwing scenes of respective players, then these batting/throwing scenes will be reproduced in response to an input of a numerical value corresponding to the uniform number of a corresponding player. Since it is possible to select buttons directly using a uniform number that is well-known, the user operability will remarkably improve.

Next, the order of ODSs in a Display Set is described. As described above, each ODS belonging to a Display Set is specified by an ICS to display one state of a button. The order of ODSs in a Display Set is decided according to such a specification, i.e. which state of a button an ODS represents.

To be more specific, ODSs in a Display Set are classified into sets of (1) those representing normal state, (2) those representing selected state, and (3) those representing active state. A set of ODSs that represents one state of a particular button is called "button-state set". These button-state sets are disposed in the order of "normal state_selected state_active state". As shown above, the order of each ODS in the Display Set is decided according to which state of a button the ODS represents.

Figure 19:
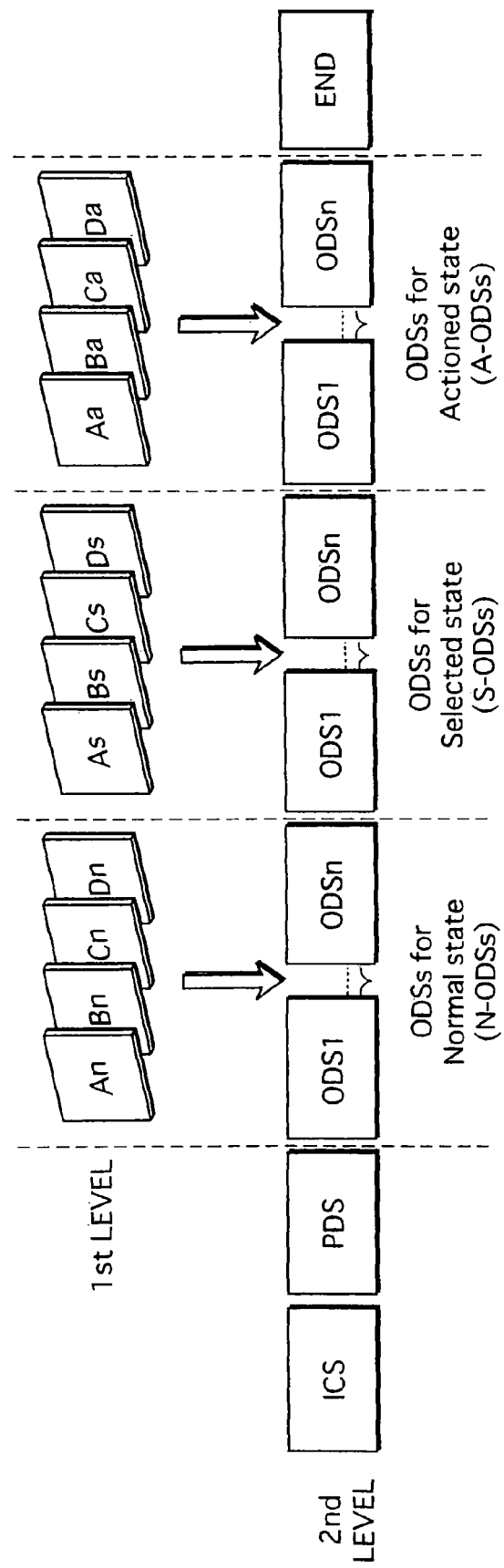
FIG. 19 is a diagram illustrating the order of ODSs belonging to a Display Set, as well as button-state sets.

FIG. 19 is a diagram illustrating the order of ODSs belonging to a Display Set. In the second row of this drawing, three button-state sets in the Display Set are illustrated. This drawing depicts: a set of ODSs for rendering normal state of the buttons (ODSs for Normal state); a set of ODSs for rendering selected state of the buttons (ODSs for Selected state); and a set of ODSs for rendering active state of the buttons (ODSs for Active state). The order of these button-state sets is as follows: normal state→selected state_active state. The purpose of this order is for facilitating reading of the ODSs constituting an initial display of an interactive display early, putting off the reading of the ODSs constituting a screen display after update.

The first row of FIG. 19 represents graphics objects An, Bn, Cn, Dn, As, Bs, Cs, Ds, Aa, Ba, Ca, Da, which will be rendered by these button-state sets. The subscript "n" assigned to An,Bn,Cn,Dn represents normal state of a corresponding button. In the same manner, the subscript "s" of As,Bs,Cs,Ds represents selected state of a corresponding button, and the subscript "a" represents active state of a corresponding button. The second row of FIG. 19 shows button-state sets to which the Graphics Objects of the first row belong. It should be noted that, in this drawing, the sets of ODS1-ODSn respectively belonging to N-ODSs, S-ODSs, and A-ODSs are assigned the same number to each other, (i.e. there is ODS1 belonging to N-ODSs, and at the same time, there is ODS1 belonging to S-ODSs.). However, each set is different from one another. This also applies to every similar drawing hereinafter.

Figure 20:
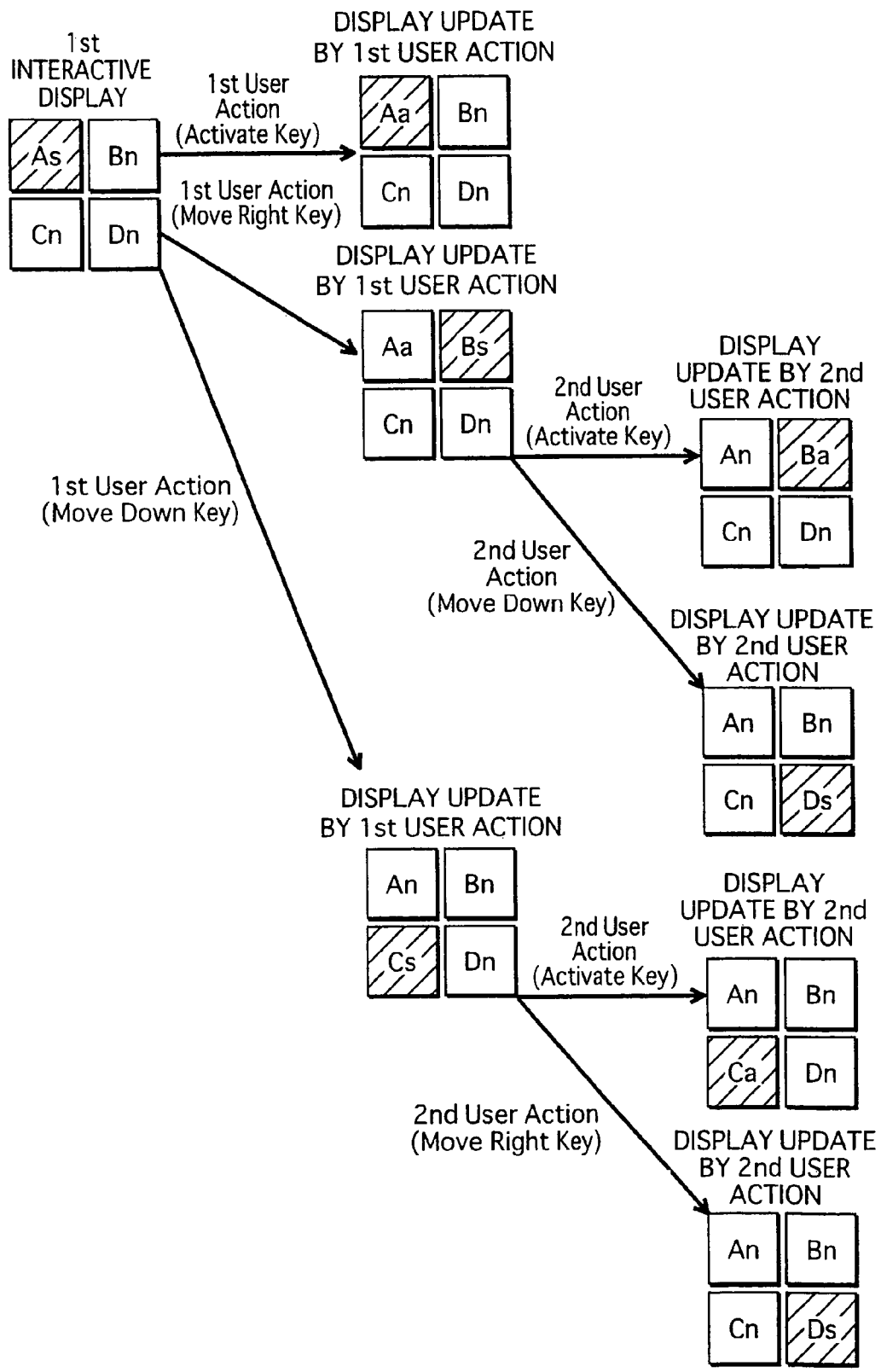
FIG. 20 is a diagram illustrating a state transition of an interactive display at which the button-state sets of FIG. 19 are disposed.

FIG. 20 is a drawing illustrating a state transition of an interactive display at which the button-state sets of FIG. 19 are disposed.

The interactive display in this drawing has a plurality of states, namely, "initial display", "update display by $1^{st}$ user action", and "update display by $2^{nd}$ update display". The arrows in the drawing represent user actions that trigger the state transition. By this drawing, the four buttons A, B, C, and D respectively have three states of "normal state", "selected state", and "active state". Among them, what is necessary for an initial display is three graphics objects for rendering a normal state and one graphics object for rendering a selected state.

Even when the default selected button is not decided yet, and it is uncertain which of the buttons A-D will be put to selected state, an initial display can be realized when decoding of graphics object representing the normal state and the selected state of each button has been complete. In view of this, in the present embodiment, the button-state sets are disposed in the order of "normal state→selected state→active state" as the second row of FIG. 19 shows. According to this disposition of button-state sets, initial display can be realized even when the reading and decoding of ODSs constituting active state has not yet been complete, and it becomes also possible to shorten a time period between the reading start of a Display Set and completion of an initial display.

Figure 16:
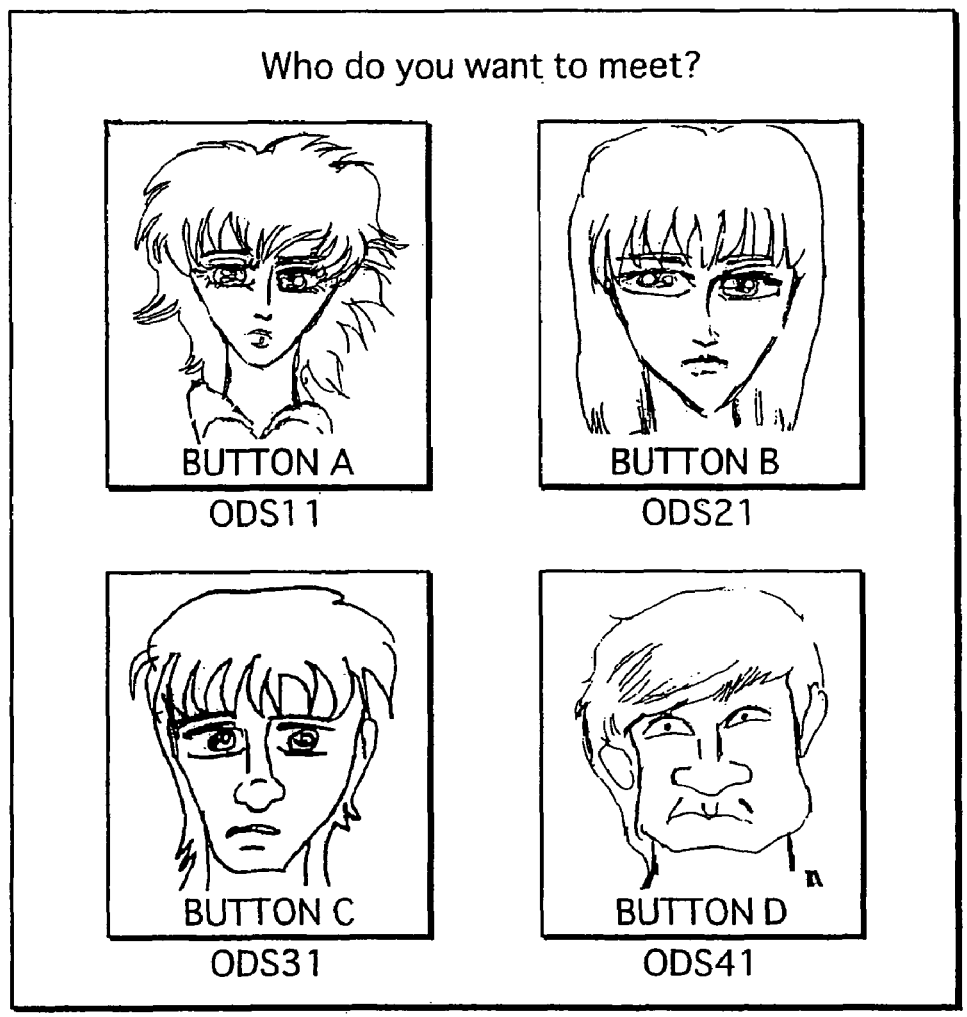
FIG. 16 is a diagram illustrating one example of the design images of the ODS11, 21, 31, and 41.
Figure 17:
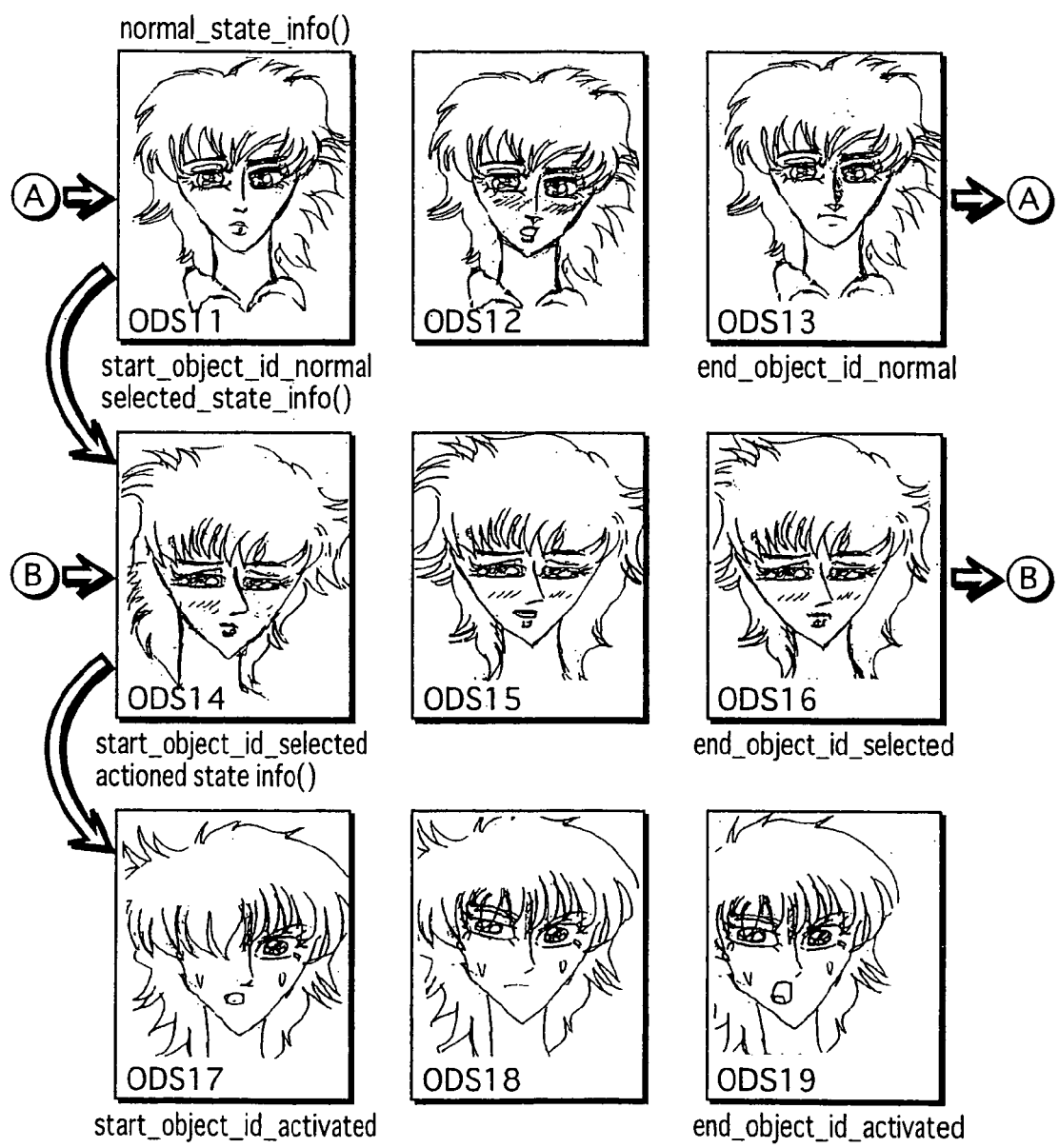
FIG. 17 is a diagram illustrating one example of the design images of the ODS11-19 of the button A.
Figure 21:
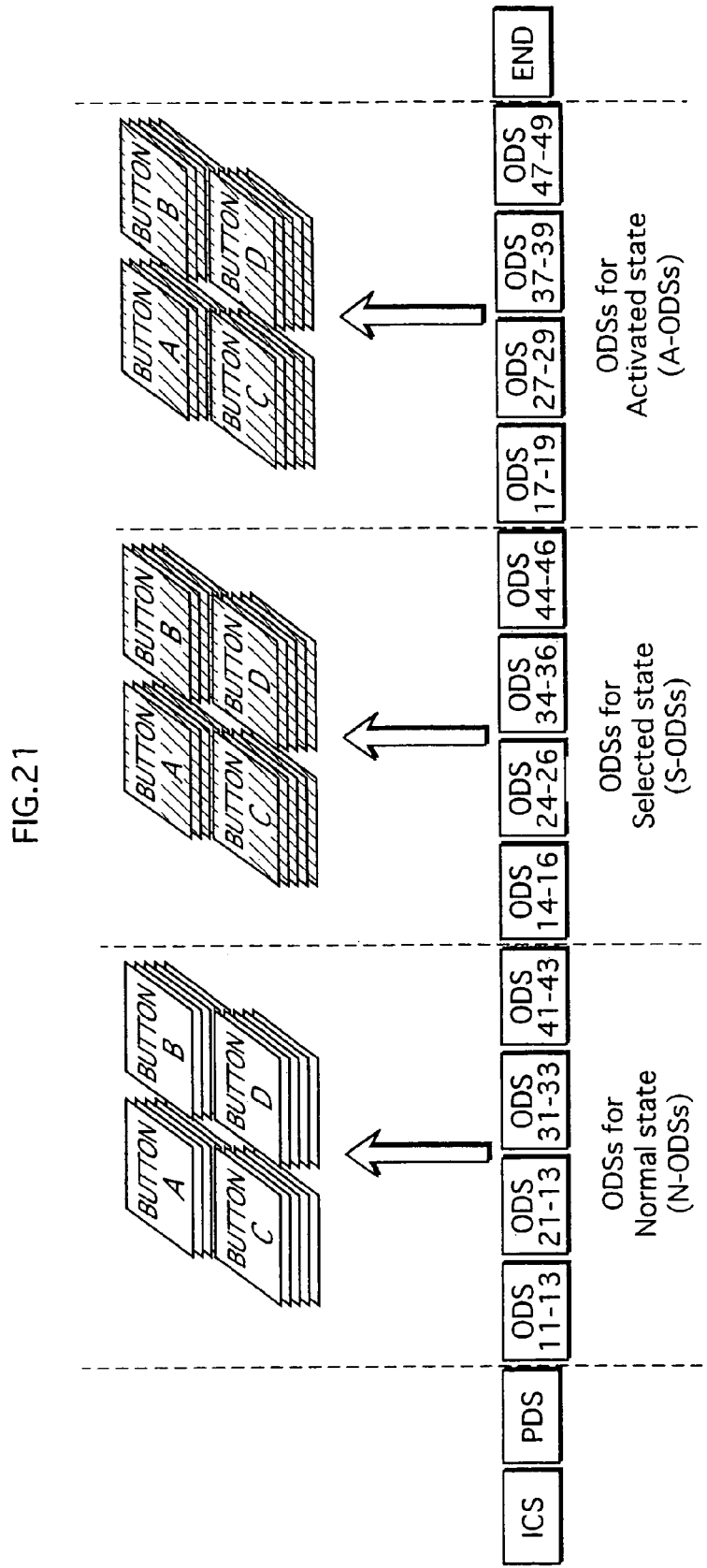
FIG. 21 is a diagram illustrating the order of ODSs in a Display Set.

Next, the order in which the ODSs shown in FIGS. 16 and 17 should be disposed is explained. FIG. 21 is a diagram illustrating the order of ODSs in a Display Set. In this drawing, ODSs for Normal state is composed of ODS11-13, ODS21-23, ODS31-33, ODS41-43. ODSs for Selected state is composed of ODS14-16, ODS24-26, ODS34-36, and ODS44-46. Finally, ODSs for Active state is composed of ODS17-19, ODS27-29, ODS37-39, and ODS47-49. ODS11-13 are for rendering expression change of a character as shown in FIG. 17, and the same thing can be said to the ODS21-23, the ODS31-33, and ODS41-43. Therefore, by disposing these ODSs in the first button-state set, preparation for an initial display can be made even during reading of the Display Set. By the above arrangement, it becomes possible to perform an interactive display to which animation is incorporated, without delay.

Next, the order of ODSs to be referenced by a plurality of button states (multi-reference) is explained. Multi-reference means that object_id of one ODS is specified by two or more sets of normal_state_info, selected_state_info, and activated_ state_info. By such multiple-reference, it becomes possible to use a graphics object for rendering the normal state of a button, for rendering another button's selected state. This means that it is possible to share the design image of one graphics object. Such sharing helps reduce the number of ODSs. Here, it is problematic which button-state set an ODS to be multiple-referenced should be made to belong.

For example, suppose when a normal state of a button and a selected state of another button are drawn by one ODS. Then it is problematic whether this ODS belongs to a button-state set corresponding to Normal state, or a button-state set corresponding to Selected state.

In principle, this ODS will be disposed only in a button-state set that corresponds to an earliest-appearing state among the plurality of states.

For instance, when an ODS is multiple-referenced by a normal state and a selected state, the ODS will be disposed in a button-state set for Normal state (N-ODSs), not in a button-state set for Selected state (S-ODSs). In a different example, if an ODS is multipe-referenced by a selected state and an active state, then the ODS will be disposed in a button-state set for Selected state (S-ODSs), and not in a button-state set for Active state(A-ODSs). In this way, a multiple-referenced ODS is disposed only in a button-state set corresponding to the earliest appearing state.

Next, the order of ODSs in S-ODSs is explained. In S-ODSS, which ODS comes first depends on whether the default selected button is statically determined or dynamically determined. A statically-determined default selected button is a button specified by a valid value (other than 00) set in default_selected_button_number in the ICS. When a valid value other than 00 is set as the default_selected_button_ number, and that no ODS representing a default selected button does not exist in the N-ODSs, the ODS representing the default selected button is disposed at the beginning of the S-ODSs.

When the default_selected_button_number indicates a value of 00, then the button to be set in selected state, as a default, will dynamically change depending on the state at a reproduction apparatus side.

The case where the default_selected_button_number is set to indicate the value 00 includes a case when the AV Clip onto which the Display Set has been multiplexed exists at a joint point of a plurality of reproduction paths. For example, suppose a case when the preceding reproduction paths are respectively first, second, and third chapters, and the Display set at the joint point is for displaying buttons corresponding to the first, second, and third chapters. In such a case, it is not appropriate to predetermine the button to be in selected state as a default, by the default_selected_button_number.

In such a case, it is ideal to change the button to be in selected state according to which one of the preceding plurality of reproduction paths has been passed, until reaching this Display Set (e.g. the second-chapter button when reaching from the first chapter, the third-chapter button when reaching from the second chapter, and the fourth-chapter button when reaching from the third button). In a case where the button to be in selected state changes depending on the preceding reproduction path, the default_selected_button_ number will be set to indicate "invalid", i.e. the zero value is set thereto. Since the button to be in selected state will change, an arrangement of disposing a certain ODS at the beginning of the button-state set is not performed.

Figure 22:
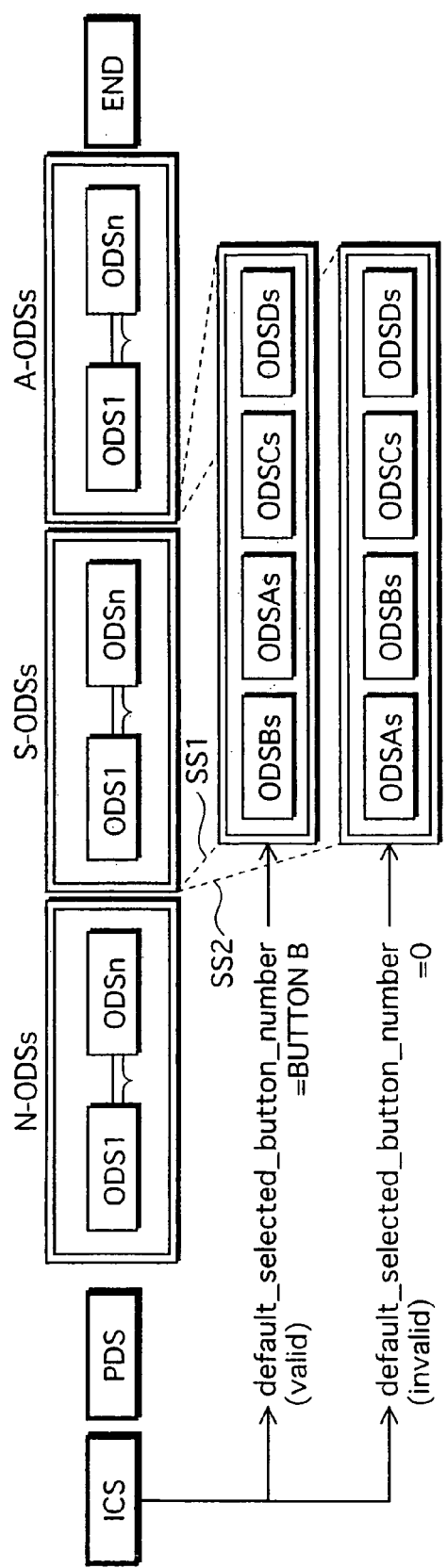
FIG. 22 is a diagram illustrating difference in the order of ODSs in a S-ODSs, between a case when default_selected_button_number is "0", and when it is "button B".

FIG. 22 is a diagram illustrating difference in the order of ODSs in a S-ODSs, between a case when default_selected_ button_number indicates "0", and when it indicates "button B". In this drawing, the broken line ss1 indicates the order of ODSs in the S-ODSs when default_selected_button_number indicates the button B, and the broken line ss2 indicates the order of ODSs in the S-ODSs when default_selected_button_ number indicates 0. As shown in the representation of this drawing, when default_selected_button_number indicates the button B, the ODSBs indicating the selected state of the button B is placed at the beginning of S-ODSs, with the other buttons' ODSs being placed thereafter. On the other hand, when default_selected_button_number indicates 0, the ODSAs indicating the selected state of the button A is placed at the beginning of the S-ODSs. In this way, whether the default_selected_button_number is valid or not affects the order of ODSs within the S-ODSS.

Next, how a Display Set having such ICS and ODS is assigned to a reproduction time axis of an AV Clip is described. An Epoch is a period during which memory management continues on the reproduction time axis. Since an Epoch is composed of one or more Display Sets, it is an issue how to assign Display Sets to the reproduction time axis of the AV Clip. Here, the reproduction time axis of an AV Clip is used to define decode/reproduction timing of each piece of picture data constituting a video stream multiplexed into an AV Clip. In this reproduction time axis, a decode timing and a reproduction timing are expressed in a time accuracy of 90 KHz. DTS and PTS assigned to these ICS and ODS in a Display Set, indicate a timing to realize synchronized control on this reproduction time axis. Synchronized control by means of DTS and PTS assigned to ICS and ODS is assigning of Display Set to the reproduction time axis.

First, what kind of synchronized control is performed by means of DTS and PTS assigned to ODS is described.

A DTS indicates a decode start time for an ODS, in a time accuracy of 90 KHz. A PTS indicates a decode end time for an ODS.

Decoding of an ODS does not end in an instant, and takes a certain time to complete.

So as to clarify the start point/end point, a DTS and a PTS respectively indicate a decode start time and a decode end time, for an ODS.

Since the value of a PTS indicates an ending time, it is necessary that the decoding of ODSj has been complete before the time shown by the PTS, and that the decompressed graphics object should be obtained in the object buffer of a reproduction apparatus by then.

Since the decode start time of an arbitrary ODSj belonging to a Display Set "n" is expressed as DTS(DSn[ODS]) in a time accuracy of 90 KHz, the time obtained by adding a maximum time required for the decoding to this decode start time will be the guaranteed decode end time of the ODSj of the Display Set.

Assume that the size of ODSj after decompression is SIZE (DSn[ODSj]), and the decode rate of the ODS is Rd. Then the maximum time required for decoding will be SIZE(DSn [ODSj])//Rd.

Note that the operator "//" used here is a division in which decimals are raised to the next whole number.

This maximum time is converted into a time accuracy of 90 KHz, and added to the DTS of ODSj. In this way, the decode end time (90 KHz) to be indicated by the PTS is obtained.

The PTS of ODSj belonging to the DSn is expressed as follows.

$$PTS(DS[ODSj])=DTS(DSn[ODSj])+90,000*(SIZE(DSn[ODSj]))//RD)$$

Then between the two ODS(ODSj, ODSj+1), the following relation should be satisfied.

$$PTS(DSn[ODSj]) \leq DTS(DSn[ODSj+1])$$

Next, the PTS value of an ICS is explained.

If immediately after an Epoch start, the PTS of an ICS is set after a value obtained by adding: (1) PTS value of ODS whose decode time finishes the last among the ODSs constituting the initial display of the DSn; (2) a time required to clear a graphics plane; and (3) a write time required to write a graphics object obtained by decoding of ODSS, to the graphics plane.

On the other hand, if at an Acquisition Point, the PTS of an IDS is set after a value obtained by adding (1) and (3).

If default_selected_button_number is indicated by an ICS, preparation for an initial display will be ready when the decoding of ODSs for rendering the normal state of all the buttons and the decoding of ODSs for rendering the selected state of the default button have been complete. The ODSs for rendering the selected state of a plurality of buttons presented in an initial display are called "S-ODSs", and the ODS in the S-ODSs whose decode time finishes the earliest is called "S-ODSsfirst" (in this case, the ODS for rendering the default button). The PTS value of the S-ODSsfirst is set as a PTS value of the ODS whose decode time finishes the last, and is used as a reference value of the PTS of the ICS.

If default_selected_button_number is not indicated by an ICS, it is not known which button will be in selected state. And so, preparation for an initial display is not complete until preparation for rendering the normal state and the selected state of all the buttons gets ready. Of all the S-ODSs for rendering the selected state of the plurality of buttons required in the initial display, the ODS whose decode time finishes the last is called "S-ODSslast". The PTS value of this S-ODSslast is set as a PTS value of the ODS whose decode time finishes the last, and is used as a reference value of the PTS of the ICS.

Suppose that the decode end time of the S-ODSsfirst is expressed as PTS(DSn[S-ODSsfirst]). Then the PTS(DSn [ICS]) is obtained by adding (2) and (3), to PTS(DSn[S-ODSsfirst]).

Suppose that the widthwise size of a rectangular area in which drawing is possible in a graphics plane is expressed as "video_width", and the lengthwise size thereof is expressed as "video_height". Also suppose that the write rate to a graphics plane is 128 Mbps. Under these presumptions, the amount of time required to clear a graphics plane is expressed as 8*video_width*video_height//128,000,000.

If this is expressed in a time accuracy of 90 KHz, then (2) a time required to clear the graphics plane is expressed as 90,000(8*video_width*video_height//128,000,000).

Also suppose that the total size of the graphics objects specified by all the button information included in an ICS is expressed as $\Sigma$SIZE(DSn[ICS.BUTTON[i]]), and a write rate to a graphics plane is 128 Mbps. Then the time required to write to the graphics plane is expressed as $\Sigma$SIZE(DSn[ICS.BUTTON[i]])//128,000,000. If this is expressed in a time accuracy of 90 KHz, the time required to clear the graphics plane is expressed as 90,000*($\Sigma$SIZE(DSn[ICS.BUTTON[i]])//128,000,000).

Here, $\Sigma$SIZE(DSn[ICS.BUTTON[i]]) indicates a total size for the first display object of the graphics objects representing a button. This $\Sigma$SIZE(DSn[ICS.BUTTON[i]]) yields a different value between a case where the default selected button is decided and a case where it dynamically changes. When the default selected button is statically decided, $\Sigma$SIZE(DSn[ICS.BUTTON[i]]) will yield a total size of: a first displayed one of ODSs that represent the selected state of a default selected button; and a first displayed one of ODSs that represent the normal state of the buttons other then the default selected button.

Next, when the default selected button dynamically changes, it is not known which button will be a selected button. Therefore it is necessary to assume the case that has the longest writing time. Here, between a graphics object representing a first page of the normal state of an arbitrary button x (ODSn1), and a graphics object representing a first page of the selected state of the button x (ODSs1), the one that has a larger size (Max(ODSn1,ODSs1)) is considered as a graphics object to be displayed first for the button x.

The result obtained by adding together Max(ODSn1, ODSs1) for all the buttons will be $\Sigma$SIZE(DSn[ICS.BUTTON[i]]).

FIG. 23A and FIG. 23B are diagrams for showing the concrete value for $\Sigma$SIZE(DSn[ICS.BUTTON[i]]), in a case when N-ODSs include a plurality of ODSs constituting the buttons A-D, and S-ODSs include a plurality of ODSs constituting the buttons A-D. Here, when the default_selected_button_number indicates a valid value, $\Sigma$SIZE(DSn[ICS.BUTTON[i]]) will be a total size of four ODSs shown by thick frames. "As1" is a firstly displayed one of a plurality of ODSs representing the selected state of the button A. "Bn1", "Cn1", and "Dn1" are respectively the firstly displayed one of a plurality of ODSs representing the normal state of the buttons B-D. When these sizes are expressed by "size( )", then $\Sigma$SIZE(DSn[ICS.BUTTON[i]]) will be expressed as size (As1)+size(Bn1)+size(Cn1)+size(Dn1).

On the other hand, when the default_selected_button_number is 0, the total of: a larger ODS of An1 and As1; a larger ODS of Bn1 and Bs1; a larger ODS of Cn1 and Cs1; and a larger ODS of Dn1 and Ds1, will be $\Sigma$SIZE(DSn[ICS.BUTTON[i]]).

Therefore, $\Sigma$SIZE(DSn[ICS.BUTTON[i]]) is expressed as follows.

$$\Sigma SIZE(DSn[ICS.BUTTON[i]]) = \max((size(An1),(size\ As1)) + \max((size(Bn1),(size\ Bs1)) + \max((size(Cn1),(size\ Cs1)) + \max((size(Dn1),(size\ Ds1))$$

Then PTS(DSn[ICS]) at immediately after the Epoch Start will be expressed as follows, using the above expressions:

$$PTS(DSn[ICS]) \geq PTS(DSn[S\text{-}ODSsfirst]) + 90,000* (8*video\_width*video\_height//128,000,000) + 90,000*(\Sigma SIZE(DSn[ICS.BUTTON[i]])128,000,000)$$

On the other hand, when the default_selected_button_number is invalid, it is only necessary to replace PTS(DSn[S-ODSsfirst]) with PTS(DSn[S-ODSslast]). The concrete expression will be as follows:

$$PTS(DSn[ICS]) \geq PTS(DSn[S\text{-}ODSslast]) + 90,000* (8*video\_width*video\_height//128,000,000) + 90,000*(\Sigma SIZE(DSn[ICS.BUTTON[i]])128,000,000)$$

Figure 24:
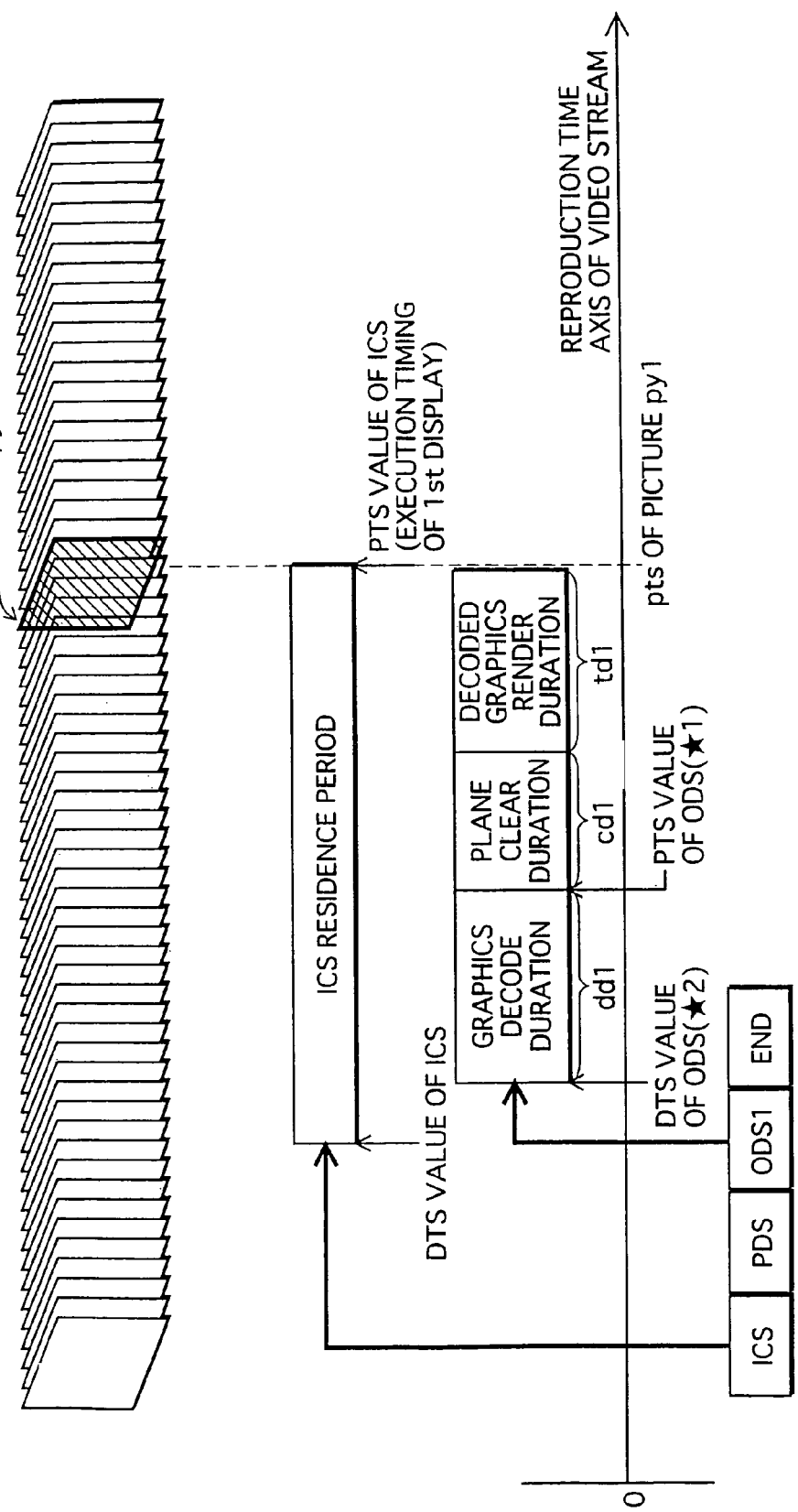
FIG. 24 is a diagram showing a timing of synchronized display by means of ICS.

FIG. 24 shows one example of realizing synchronized display by setting PTS and DTS in the above way. In this diagram, assumption is made such that a button is displayed at a display timing of arbitrary picture data "py1" which is in the motion picture in this drawing. In this case, the PTS value of the ICS should be set so as to coincide with the display timing of this picture data.

Decoding of the ODS whose decode time finishes the last, among the ODSs constituting the initial display of the DSn, should be complete by the time obtained by subtracting, from the PTS of the ICS, the screen-clearing period cd1 and the graphics-object transfer period td1. Therefore the PTS value of the ODS should be set at the timing (★1) shown in this drawing. Furthermore, the decoding of the ODS takes the period dd1, and so the DTS value of this ODS should be set at the dd1 period earlier than this PTS.

In FIG. 24, there is only one ODS to be overlayed with the motion picture, which is a simplified case. If the initial display of the interactive display to be overlayed with the motion picture is realized by a plurality of ODSs, PTS and DTS of the ICS, and PTS and DTS of ODS should be set as in FIG. 25.

Figure 25:
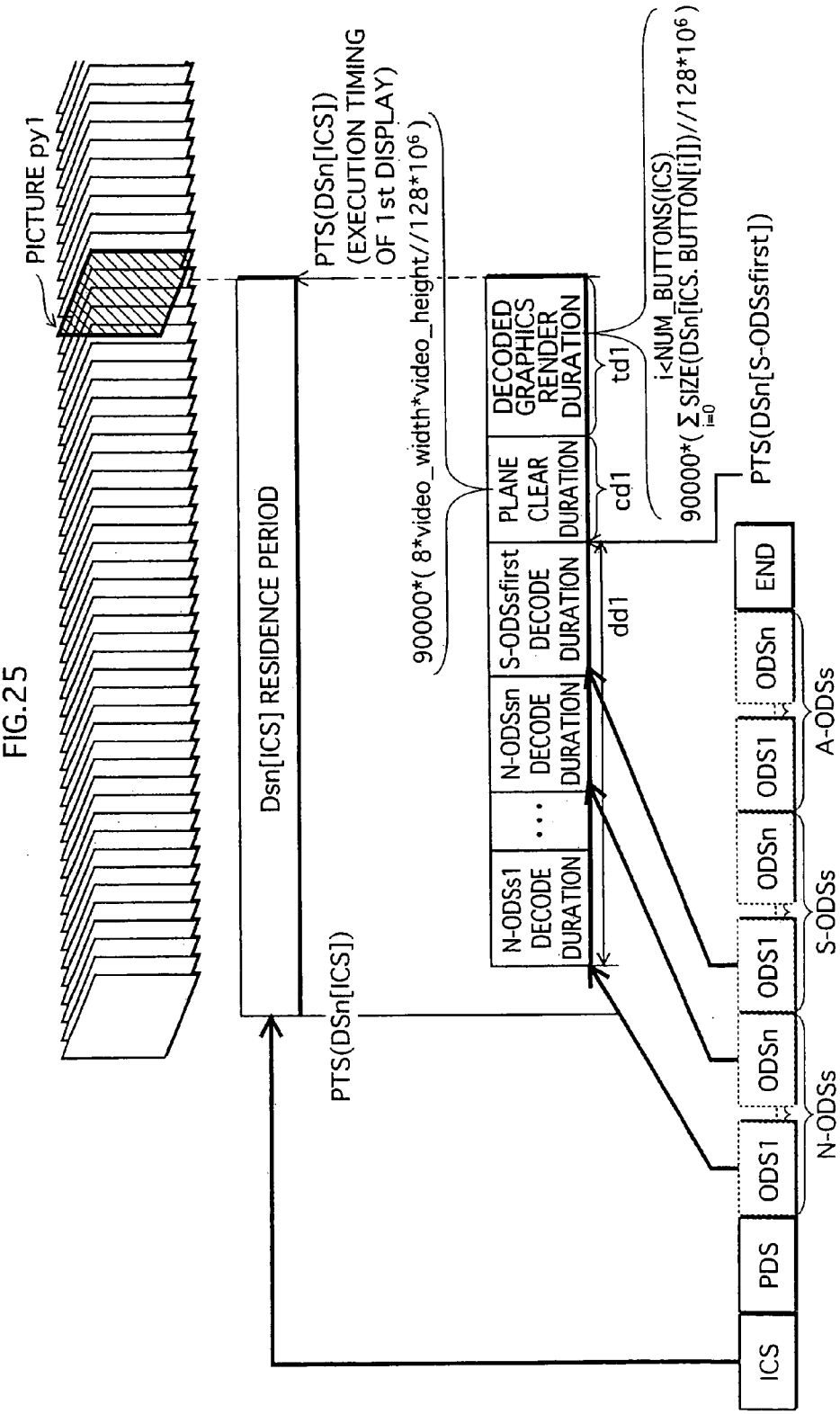
FIG. 25 is a diagram showing how to set DTS and PTS, in a case when a plurality of ODSs compose an initial display of an interactive display and the default_selected_button_number is valid.

FIG. 25 is a diagram showing how to set DTS and PTS, in a case when a plurality of ODSs compose the initial display of the interactive display, and the default selected button is statically decided. If the decoding of the ODS whose decoding takes the longest in S-ODSsfirst (the ODSs for realizing the initial display) finishes when the time dd1 has passed in the drawing, then the PTS of this S-ODSsfirst (DSn[S-ODSsfirst]) is set to indicate the time at which the period dd1 has passed.

Furthermore, it is necessary to perform screen clearing and transferring of decoded graphics objects, for realizing initial display. Therefore, the PTS of the ICS (DSn[ICS]) should be set after the time obtained by adding, to the value of this PTS(DSn[S-ODSsfirst]), a period required to perform screen clearing (90,000*(8*video_width*video_height//128,000,000)), and transferring time of decoded graphics object (90,000*(ΣSIZE(DSn[ICS.BUTTON[i]])128,000,000)).

FIG. 26 is a diagram showing how to set DTS and PTS, in a case when a plurality of ODSs compose the initial display of the interactive display, and the default selected button is not decided. If the decoding of the S-ODSslast, whose decoding takes the longest in S-ODSs for realizing the initial display, finishes when the time dd2 has passed in the drawing, then the PTS of this S-ODSslast (DSn[S-ODSslast]) is set to indicate the time at which the period dd2 has passed.

Furthermore, so as to realize an initial display, it is necessary to perform screen clearing, and transferring of decoded graphics object. Therefore the PTS(DSn[ICS]) of the ICS should be set after the time obtained by adding, to the value of this PTS(DSn[S-ODSslast]), a period required to perform the screen clearing(90,000*(8*video_width*video_height//128,000,000) and transferring time of decoded graphics object (90,000*(ΣSIZE(DSn[ICS.BUTTON[i]])128,000,000)).

In a DVD, a period during which an interactive control is valid corresponds to a period of a VOBU, which functions as a GOP of the video stream. However, in a BD-ROM, such a valid period can be set arbitrarily by means of PTS and DTS in ICS included in an Epoch. Therefore the interactive control by means of a BD-ROM is not in dependence relation with a GOP.

Note that a synchronized control by means of a PTS of an ICS is not limited to perform control so as to display a button at a certain timing on a reproduction time axis, and also includes performing of control so as to enable display of a Popup menu during a certain period on a reproduction time axis. A Popup menu is a menu that will be popped up on a screen, by a press of a menu key provided for the remote controller 400, and the synchronized control by means of PTS of ICS also include enabling of display of such a Popup menu at a display timing of certain picture data in an AV Clip. The ODSs constituting a Popup menu are decoded and a graphics object obtained by the decoding are written to a graphics plane, just as the ODSs constituting a button. Unless the writing to a graphics plane is not complete, it is not possible to respond to a menu call by a user. In view of this, a time at which the Popup display becomes possible is indicated by the PTS of ICS, in performing synchronized display of a Popup menu.

The data structure of a Display Set (ICS,PDS,ODS), described so far, is an instance in a class structural body written in a programming language. A producer who performs authoring is able to obtain the structures on a BD-ROM, by describing this class structural body.

Figure 27:
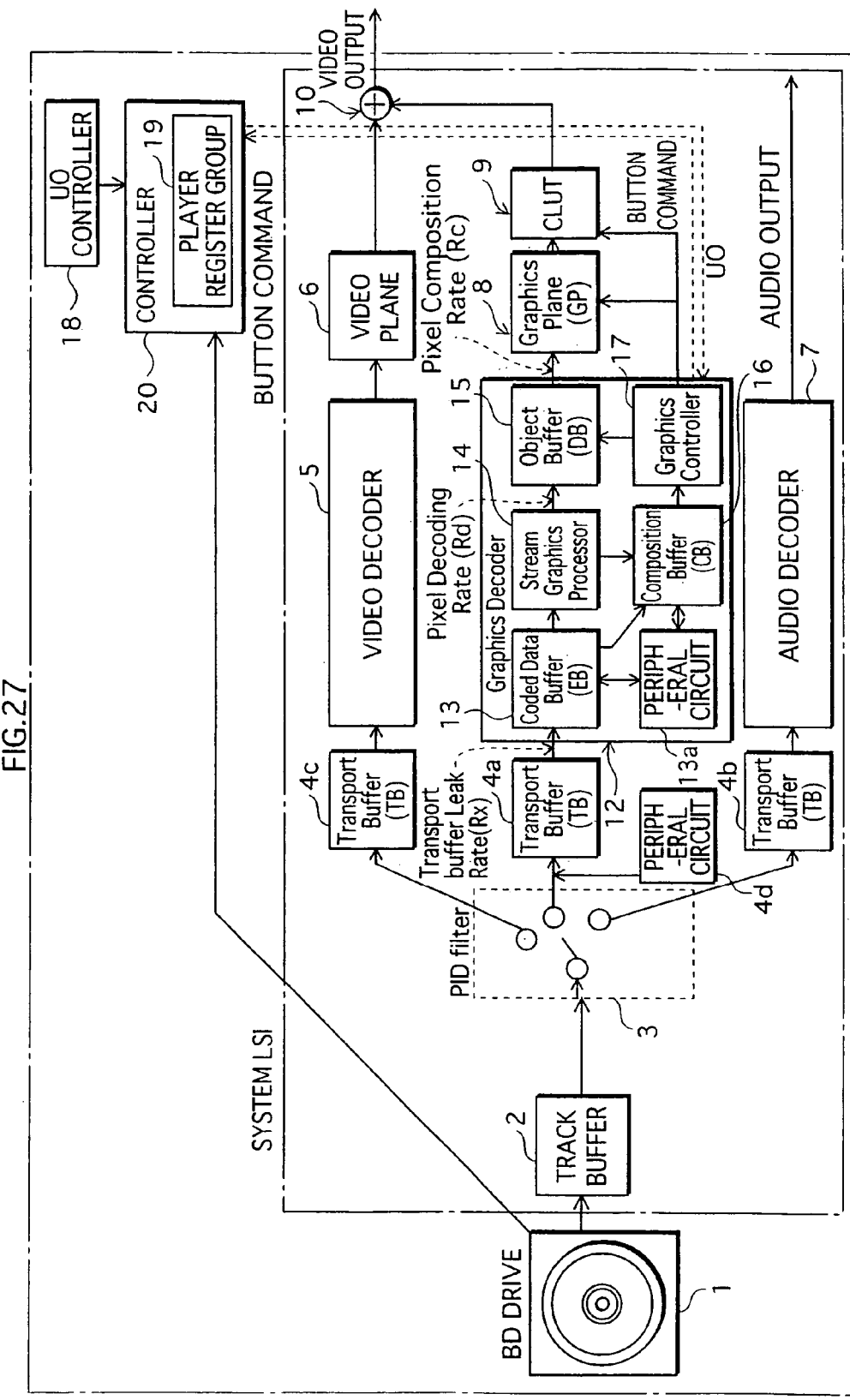
FIG. 27 is a diagram showing the internal structure of a reproduction apparatus according to the present invention.

Next, an embodiment of a reproduction apparatus according to the present invention is explained. FIG. 27 is a diagram showing the internal structure of a reproduction apparatus according to the present invention. The reproduction apparatus according to the present invention is produced industrially based on the interior shown in this drawing. The reproduction apparatus of the present invention is mainly composed of three parts: a system LSI, a drive apparatus, and a micro system. The industrial production is pursued by implementing these parts to the cabinet and to the substrate of the reproduction apparatus. The system LSI is an integrated circuit onto which varieties of processing units, having functions of the reproduction apparatus, are integrated. The reproduction apparatus produced in such a way is comprised of: a BD drive 1, a track buffer 2, a PID filter 3, a transport buffers 4a, b, and c, a peripheral circuit 4d, a video decoder 5, a video plane 6, an audio decoder 7, a graphics plane 8, a CLUT unit 9, an addition device 10, a graphics decoder 12, a coded data buffer 13, a peripheral circuit 13a, a stream graphics processor 14, an object buffer 15, a composition buffer 16, a graphics controller 17, a UO controller 18, a player register group 19, and a control unit 20.

The BD-ROM drive 1 executes access to the BD-ROM by performing loading/reading/ejecting for a BD-ROM.

The track buffer 2 is a FIFO memory, and stores TS packets read from the BD-ROM, on a first-in first-out basis.

The PID filter 3 performs filtering to a plurality of TS packets outputted from the track buffer 2. The filtering by the PID filter 3 is to write only TS packets having a desired PID, to the transport buffers 4a, b, and c, and does not require buffering. Therefore the TS packets inputted to the PID filter 3 will be written to the transport buffers 4a, b, and c, without time-delay.

The transport buffers 4a, b, and c are respectively a memory for storing TS packets outputted from the PID filter 3, on a first-in, first-out basis.

The peripheral circuit 4d is a wire logic that performs processing to convert TS packets read from the transport buffer 4a, into functional segments. The functional segments obtained by the conversion are stored in the coded data buffer 13.

The video decoder 5 decodes a plurality of TS packets outputted from the PID filter 3 to obtain decompressed pictures, and write them to the video plane 6.

The video plane 6 is a plane for motion pictures.

The audio decoder 7 decodes the TS packets outputted form the PID filter 3 to obtain decompressed audio data, and outputs the decompressed audio data.

The graphics plane 8 is a memory having an area corresponding to one screen, and is able to store decompressed graphics for one screen.

The CLUT unit 9 converts index colors of the decompressed graphics stored in the graphics plane 8, based on the Y, Cr, Cb values shown by the PDS.

The addition device 10 multiplies the decompressed graphics resulted from color conversion at the CLUT unit 9, with a T value (transmission rate) shown by the PDS, and adds the result and the decompressed picture data stored in the video plane 6, pixel by pixel, to obtain an overlayed image, and outputs the overlayed image.

The graphics decoder 12 decodes a graphics stream, to obtain decompressed graphics, and writes this decompressed graphics to the graphics plane 8, as a graphics object. By decoding of the graphics stream, subtitles and menus will appear on a screen. This graphics decoder 12 is comprised of a coded data buffer 13, a peripheral circuit 13a, a stream graphics processor 14, an object buffer 15, a composition buffer 16, and a graphics controller 17.

The coded data buffer 13 is a buffer in which the functional segments are stored together with DTS and PTS. Such functional segments result from removing a TS packet header, and a PES packet header from each TS packet in a transport stream stored in the transport buffer 4a, and then disposing the payloads sequentially. Among the removed TS packet header and the PES packet header, PTS/DTS are stored in association with a corresponding PES packet.

The peripheral circuit 13a is a wire logic that realizes: transferring between the coded data buffer 13 and the stream graphics processor 14; and transferring between the coded data buffer 13 and the composition buffer 16. In such transferring processing, when it reaches a time shown by the DTS of an ODS, the ODS is transferred from the coded data buffer 13 to the stream graphics processor 14. In addition, when it reaches the time shown by the DTS of an ICS and a PDS, the ICS and the PDS are transferred to the composition buffer 16.

The stream graphics processor 14 decodes an ODS, and writes the decompressed graphics composed of index colors resulting from decoding, to the object buffer 15, as a graphics object. The decoding by the stream graphics processor 14 starts at the time of a DTS associated with the ODS, and ends at the time of a PTS associated with the ODS. The decode rate "Rd" for the aforementioned graphics object corresponds to an output rate of this stream graphics processor 14.

Figure 28:
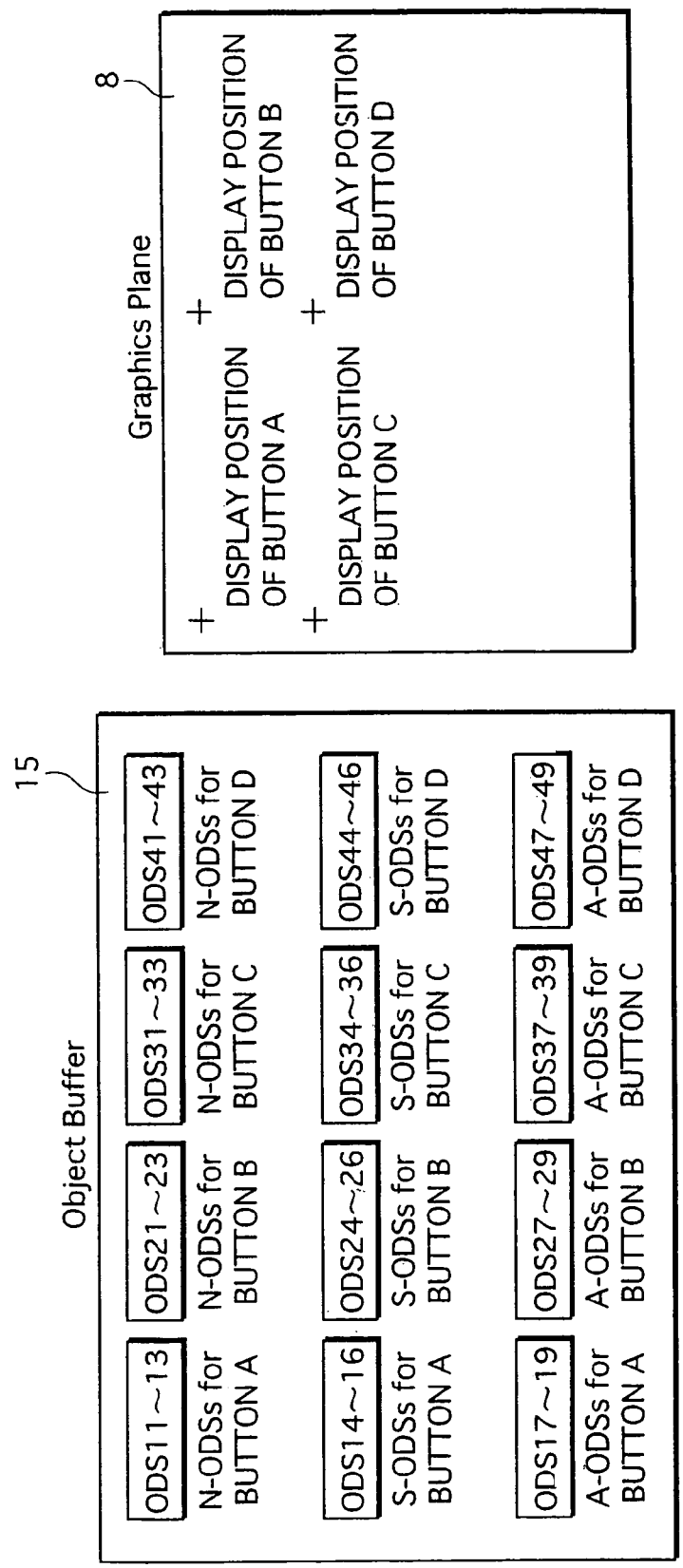
FIG. 28 is a diagram showing a storage content of the object buffer 15, in contrast to the graphics plane 8.

The graphics object obtained from the decoding of the stream graphics processor 14 is stored in the object buffer 15. FIG. 28 is a diagram showing a storage content of the object buffer 15, in contrast to the graphics plane 8. This storage content assumes a case where the ODSs in the example shown by FIGS. 16 and 17 are written to the object buffer 15. In the example of FIGS. 16 and 17, four-button animation is realized by 36 ODSs (ODS11-49). In this example, the ODSs representing all the frames of this animation are stored in the object buffer 15. In contrast, a display position of each of the ODSs stored in the object buffer 15 is defined in the graphics plane 8. This display position is defined by button_horizontal position and button_vertical position of each piece of button information. The animation is realized by transferring the ODSs from the object buffer 15, frame by frame, so as to write the ODSs to the corresponding display positions of the graphics plane 8.

The composition buffer 16 is a memory in which ICS and PDS are disposed.

Figure 29:
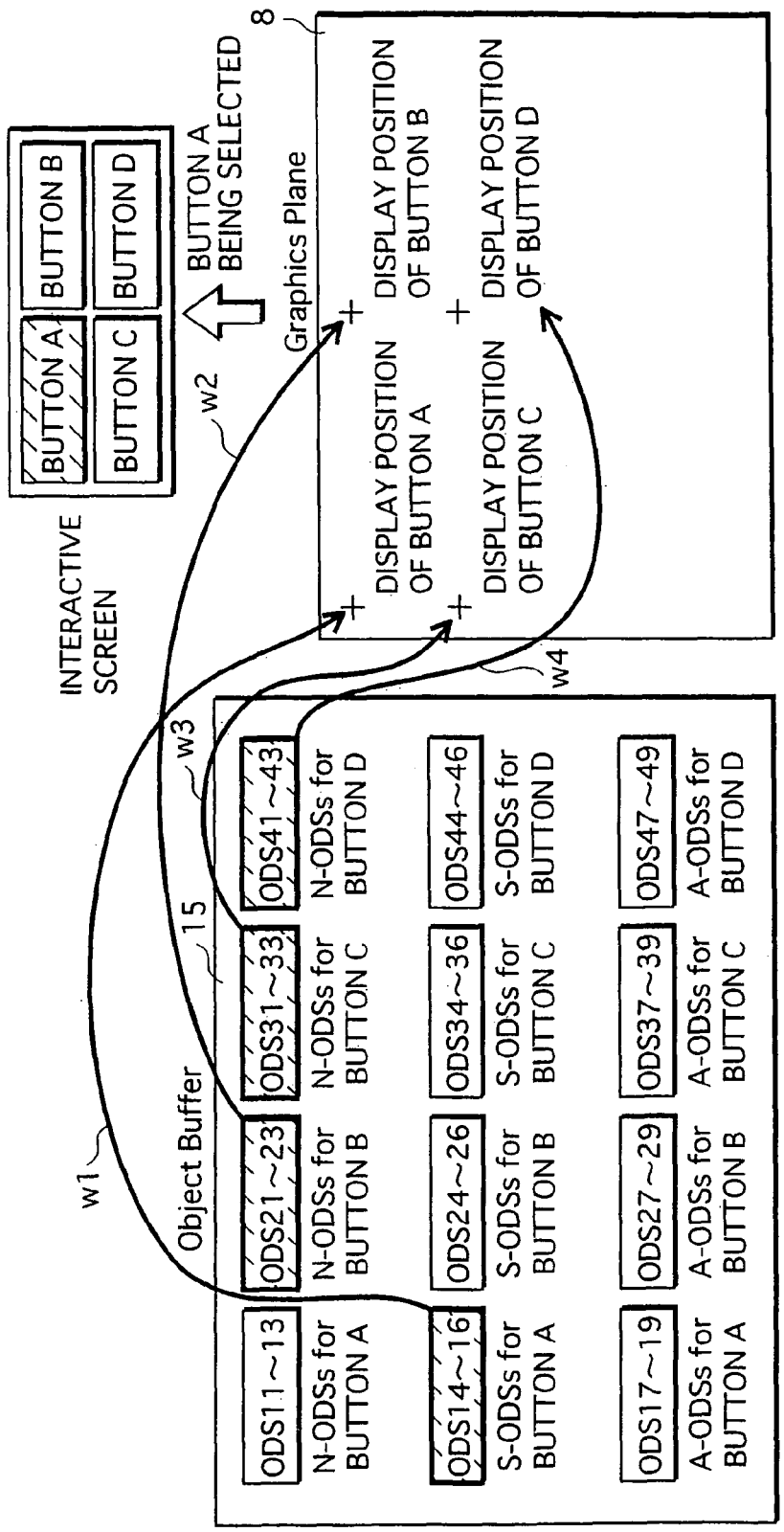
FIG. 29 is a diagram showing the processing performed by the graphics controller 17 at an initial display.

The graphics controller 17 decodes the ICS disposed in the composition buffer 16, and performs control according to the ICS. The execution timing of this control is based on the value of PTS assigned to the ICS. One of the most important functions of this graphics controller 17 is writing processing at initial display and at update of an interactive display. The following explains writing processing of the graphics controller 17 at initial display and at update, by referring to FIG. 29. FIG. 29 is a diagram showing the processing performed by the graphics controller 17 at an initial display. As shown in this drawing, the graphics controller 17 performs control to write the ODSs belonging to the S-ODSs of the button A, to a display position defined by the button_horizontal_position and the button_vertical_position of the button A's button information, and to write the ODSs belonging to the N-ODSs of the buttons B, C, and D, respectively to display positions defined by the button_horizontal_position and the button_vertical_position of the button information of the buttons B, C, and D (The arrows w1, w2, w3, and w4 in the drawing symbolically show the above-described writing). By the writing, the initial display of FIG. 20 is realized. Please note here that not all the ODSs are not necessary for an initial display of an interactive display. The initial display is realized when the ODSs belonging to the S-ODSs of the default selected button and the ODSs belonging to the N-ODSs of the other buttons have been ready on the object buffer 15. That is, the graphics controller 17 can start writing for an initial display, if decoding has been complete for the ODSs belonging to the S-ODSs of the default selected button, and for the ODSs belonging to the N-ODSs of the other buttons.

Figure 30:
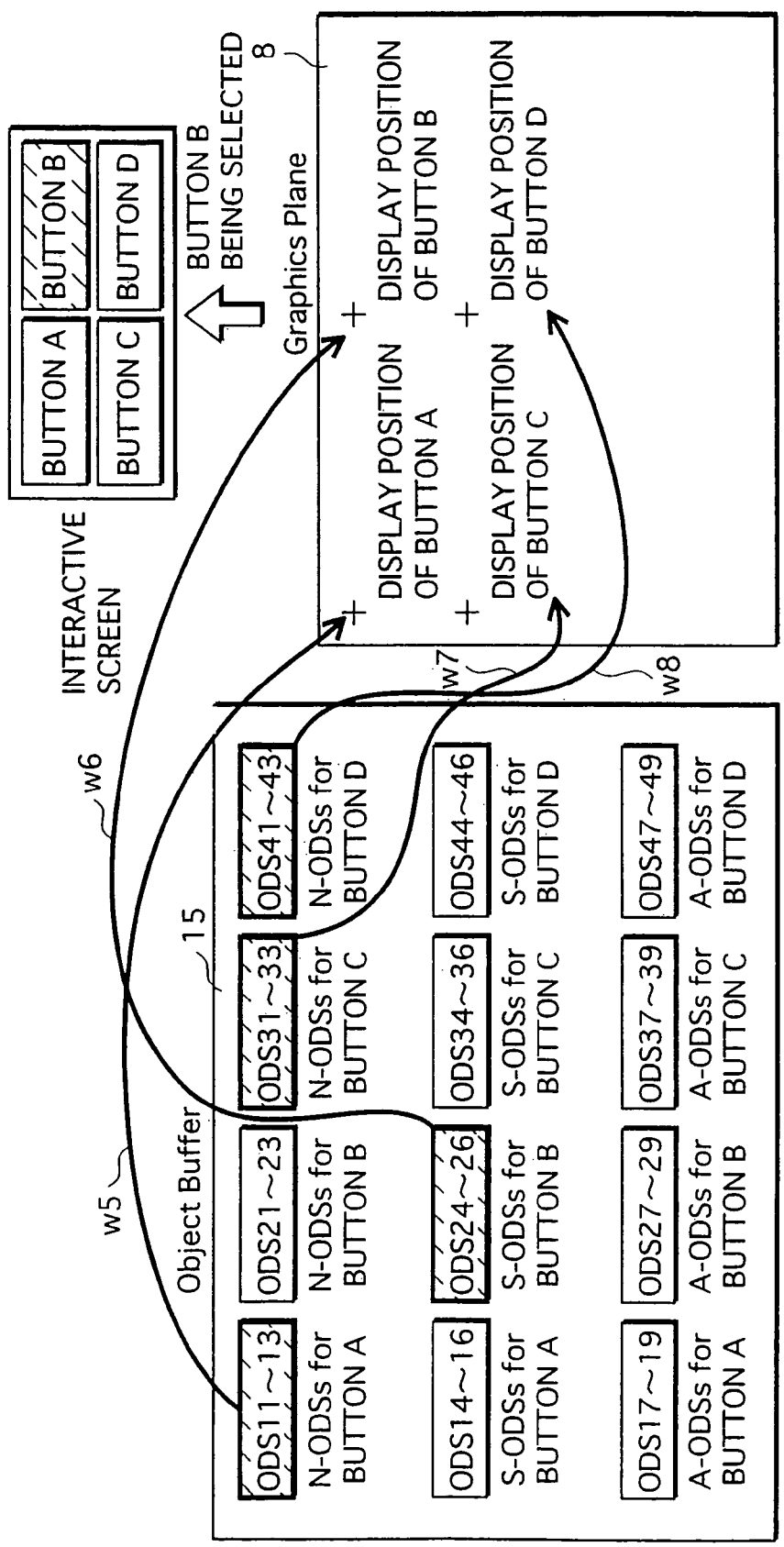
FIG. 30 is a diagram showing processing of the graphics controller 17 at an update of an interactive display according to 1stUserAction(MoveRight).

FIG. 30 is a diagram showing processing of the graphics controller 17 at an update of an interactive display according to 1stUserAction(MoveRight). As shown in this drawing, the graphics controller 17 performs control to write the ODSs belonging to the S-ODSs of the button B, to a display position defined by the button_horizontal_position and the button_vertical_position of the button B's button information, and to write the ODSs belonging to the N-ODSs of the button A, to a display position defined by the button_horizontal_position and the button_vertical_position of the button A's button information (The arrows w5, w6, w7, and w8 symbolically show the writing). By this writing, the state transition as shown in FIG. 20 is realized. The buttons C and D stay in normal state, just as in the initial display of the interactive display, but the writing for these buttons to the graphics plane 8 is continued so as to continue the animation.

Figure 31:
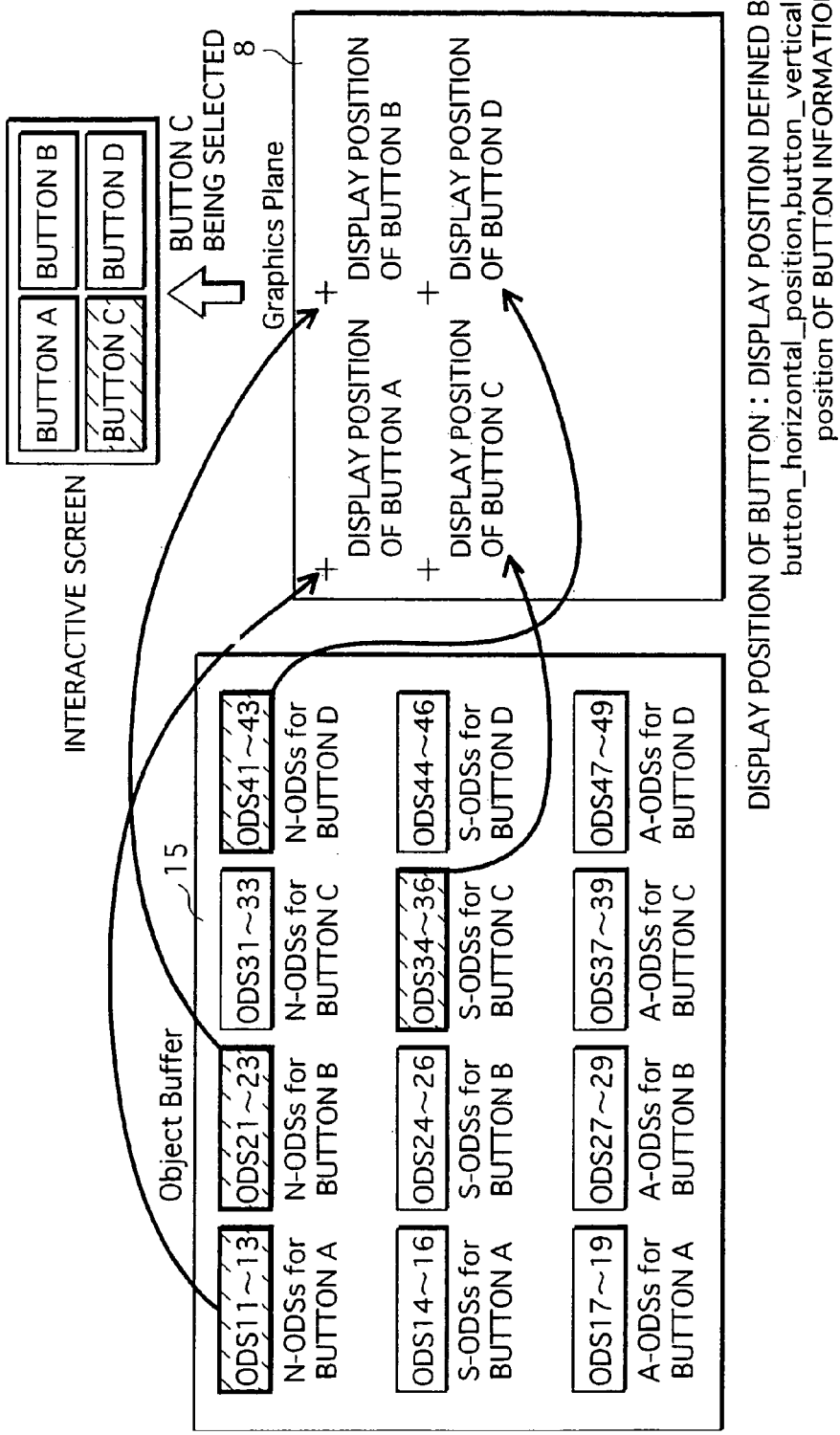
FIG. 31 is a diagram showing processing of the graphics controller 17 at an update of an interactive display according to 1stUserAction (MoveDown).
Figure 32:
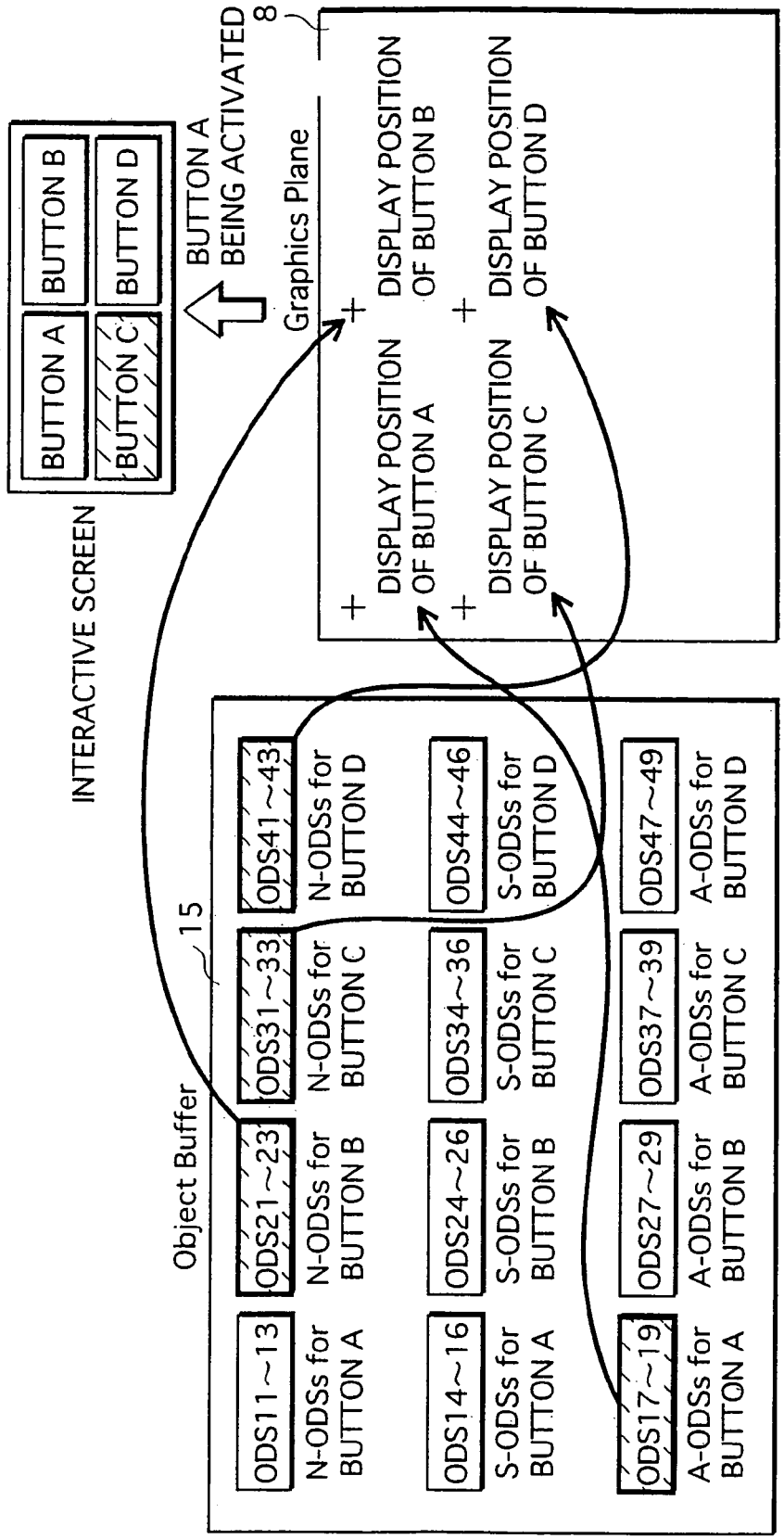
FIG. 32 is a diagram showing processing of the graphics controller 17 at an update of an interactive display according to 1stUserAction (Activated).

FIGS. 31 and 32 respectively show the processing of the graphics controller 17, in each cases where the 1stUserAction is MoveDown and Activated. At an interactive-display update, S-ODSs and A-ODSs for the buttons other than the default selected button are involved, and so all the ODSs are required to exist in the object buffer 15.

The UO controller 18 detects a user operation directed to the remote controller and to the front panel of the reproduction apparatus, and outputs information corresponding to the user operation (hereinafter "UO(user operation)"), to the control unit 20.

The player register group 19 is a register embedded in the control unit 20, and is comprised of 32 player status registers and 32 general purpose registers. The meaning of the set value of the player status registers (PSR) is described below. In the following, the notation as "PSR(x)" represents a set value of the xth player status register.

PSR(0): Reserved
PSR(1): stream no. of audio stream to be decoded
PSR(2): stream no. of sub-picture stream to be decoded
PSR(3): no. representing angle setting by a user
PSR(4): title no. currently reproduced
PSR(5): chapter no. currently reproduced
PSR(6): PL no. currently reproduced
PSR(7): PlayItem no. currently reproduced
PSR(8): time information indicating current reproduction point
PSR(9): counted value at navigation timer
PSR(10): button no. currently in selected state
PSR(11)-(12): Reserved
PSR(13): parental level setting by a user
PSR(14): video reproduction setting of reproduction apparatus
PSR(15): audio reproduction setting of reproduction apparatus
PSR(16): language code representing audio setting of reproduction apparatus
PSR(17): language code representing sub-title setting of reproduction apparatus
PSR(18): language setting for menu rendering
PSR(19)-(63): Reserved The PSR(8) is updated every time each piece of picture data of a AV Clip is displayed. In other words, when the reproduction apparatus displays a new piece of picture data, the PSR(8) is updated to indicate the value shown by the display start time (presentation time) of the new piece of picture data. By referring to this PSR(8), it is possible to know the current reproduction point.

The control unit 20 performs integration control through bi-directional communication with the graphics decoder 12. The communication from the control unit 20 to the graphics decoder 12 is to output an UO received at the UO controller 18 to the graphics decoder 12. The communication from the graphics decoder 12 to the control unit 20 is to output a button command included in an ICS to the control unit 20.

In the reproduction apparatus constituted as above, each constituting element performs decoding processing using pipelining.

Figure 33:
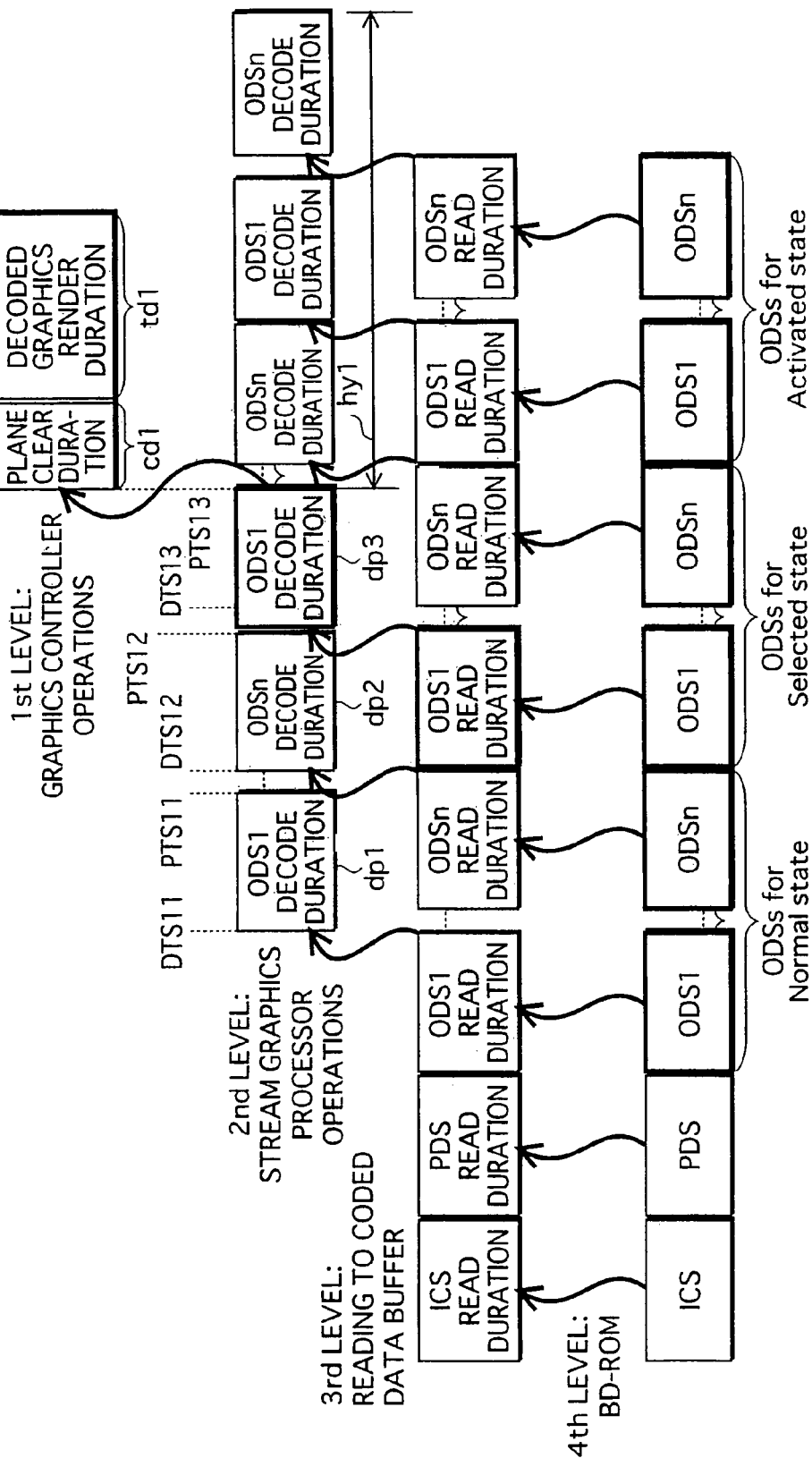
FIG. 33 is a timing chart showing pipelining performed by the reproduction apparatus.

FIG. 33 is a timing chart showing the pipelining performed by the reproduction apparatus. The fourth row represents a Display Set in a BD-ROM, and the third row represents reading periods that are respectively for reading the ICS, PDS, and ODS, to the coded data buffer 13. The second row represents decoding periods for ODSs, performed by the stream graphics processor 14. The first row represents processing periods by the graphics controller 17. The decoding start time for each ODS is shown by the DTS11, DTS12, and DTS13 in the drawing. The storing of ODS(N-ODSs[ODS1]) (being the first ODS among the N-ODSs) to the coded data buffer 13, finishes by DTS11, and the storing of ODS(N-ODSs[ODSn]) (being the last ODS among the N-ODSs) to the coded data buffer 13, finishes by DTS12. In this way, each ODS will have been read to the coded data buffer 13 by the time shown by its own DTS.

On the other hand, the decode end time for each ODS is shown by PTS11, PTS12, PTS13, in the drawing. Decoding of N-ODSs(ODS1) performed by the stream graphics processor 14 finishes by PTS11, and decoding of N-ODSs(ODSn) finishes by PTS12. In the above way, each ODS is read to the coded data buffer 13 by the time shown by the DTS of the ODS, and the ODS read to the coded data buffer 13 is decoded and written to the object buffer 15 by the time shown by the PTS of the ODS. The stream graphics processor 14 performs the described series of processing using pipelining.

When the default selected button is statically decided, the time at which all the graphics objects for an initial display of an interactive display are ready is when the decoding of a first ODS of the button-state set corresponding to the normal state and of a first ODS of the button-state set corresponding to the selected state is complete. In this diagram, at the time shown by the PTS13, all the graphics objects necessary for the initial display of the interactive display are ready.

In the drawing, the period cd1 in the first row represents a period required to clear the graphics plane 8 by the graphics controller 17. In addition, the period td1 is a period required to write, to the graphics plane 8, graphics objects that correspond to the first page of the interactive display, among those obtained in the object buffer 15. The writing destination in the graphics plane 8 is shown by button_horizontal_position and button_vertical_position in the ICS. In other words, the decompressed graphics constituting the interactive display is obtained to the graphics plane 8, at a time calculated by adding the screen clearing period "cd1" and the write time required to write the graphics object obtained by decoding "td1", to the PTS13 for ODS. An overlayed image can be obtained by having the CLUT unit 9 to perform the color conversion for the aforementioned decompressed graphics, and having the addition device 10 to perform combining the result with the decompressed pictures stored in the video plane 6.

In contrast to the case where an initial display is performed by decoding all the ODS included in a Display Set, the initial display in the present embodiment is performed earlier by the period hy1 in the drawing, because the initial display is performed before decoding completion for the button-state set corresponding to the selected sate and the button-state set corresponding to the active state.

Note that in this drawing, there are several sets of ODS1-ODSn. However these sets respectively belong to N-ODSs, S-ODSs, and A-ODSs, and so the same ODS1s are different in content from each other. This also applies to the similar drawings in the present invention.

Even while the graphics decoder 12 is performing clearing of, and writing to the graphics plane 8, the stream graphics processor 14 is continuously decoding the remaining ODSs (i.e. decoding period for ODSn in the second row, decoding period for ODS1, and decoding period for ODSn). According to this, decoding of the remaining ODSs will finish early. This leads to early preparation for updating the interactive display, and so it becomes possible to respond to a user operation regarding an interactive display update by means of the remaining ODSs, without delay. The pipelining as above enables prompt execution of both of an initial display and an update of an interactive display.

Figure 34:
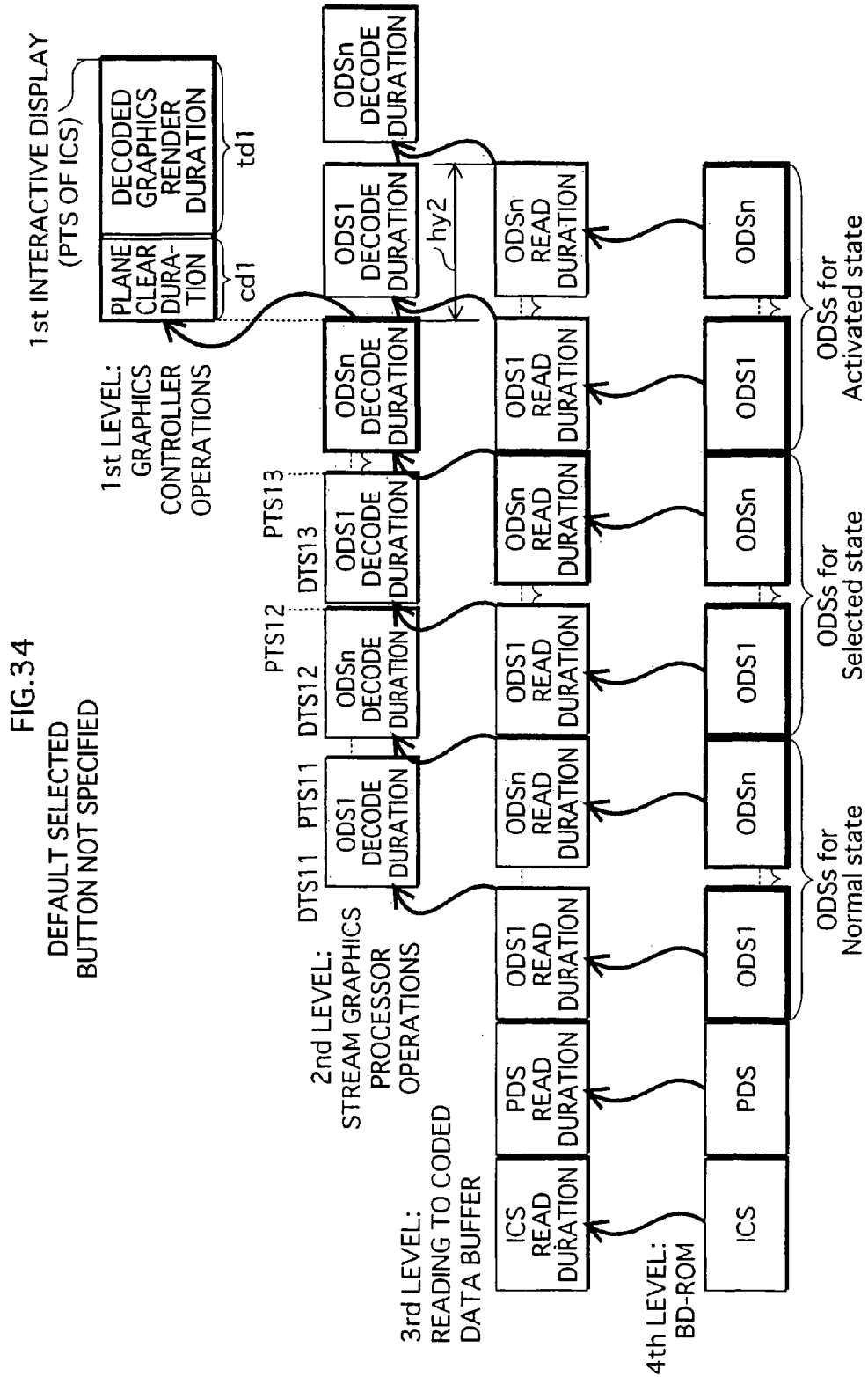
FIG. 34 is a timing chart showing pipelining performed by the reproduction apparatus in a case where the default selected button dynamically changes.

FIG. 33 assumes a case where the default selected button is statically decided, whereas FIG. 34 is a timing chart showing pipelining performed by the reproduction apparatus in a case where the default selected button dynamically changes. When the default selected button dynamically changes, the graphics objects necessary for an initial display will be ready when all the ODSs belonging to the button-state sets respectively corresponding to the N-ODSs and the S-ODSs are decoded, and corresponding graphics objects are obtained in the graphics plane 8. In contrast to the case where it is necessary to decode all the ODSs in a display set so as to perform an initial display, the initial display in the present embodiment is made possible before decoding completion of the button-state set corresponding to the active state. Therefore the initial display execution is performed earlier by the period hy2 in the drawing.

Next, how to implement the control unit 20 and the graphics decoder 12 is explained. The control unit 20 creates a program for performing processing shown in FIGS. 35 and 36, which is implementable by a general CPU. As follows, the processing performed by the control unit 20 is explained with reference to FIGS. 35 and 36.

Figure 35:
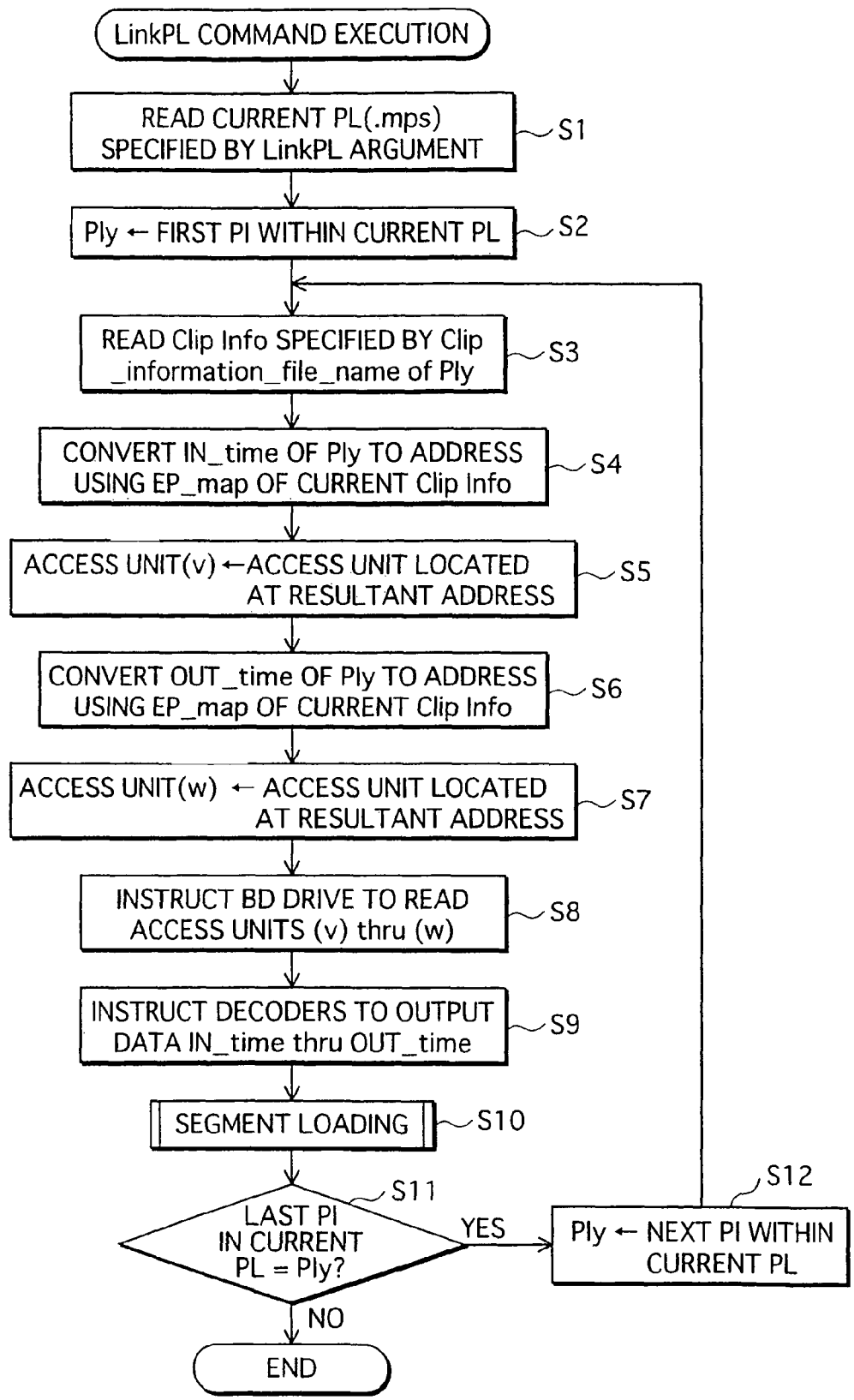
FIG. 35 is a flowchart showing the execution procedure for LinkPL function, performed by the control unit 20.

FIG. 35 is a flowchart showing the execution procedure for a LinkPL function, performed by the control unit 20. In decoding of the commands including the LinkPL function, the control unit 20 follows the flowchart of this drawing.

Here, assumption is made that a processing-target PlayItem in the flowchart is called "PIy", and a processing-target ACCESS UNIT is called "ACCESS UNITV". In this flowchart, current PL information (.mpls) indicated by an argument of the LinkPL is read (Step S1), and the first PI information in the current PL information is set as PIy (Step S2). Then the Clip information specified by the Clip_information_file_name of the PIy is read (Step S3).

Once the Clip information is read, In_time of the PIy is converted to an address using EP-map of the current Clip information (Step S4). Then the ACCESS UNIT specified by this address is set as the ACCESS UNITV (Step S5). Out_time of the PIy is converted to an address using EP-map of the current Clip information (Step S6). Then the ACCESS UNIT specified by this address is set as ACCESS UNITW (Step S7).

In this way, once the ACCESS UNITv,w are decided, an instruction is given to the BD drive to read from the ACCESS UNITv to the ACCES UNITW (Step S8), and an instruction for decoding/outputting of PIy from the In_time to the Out_time, is given to the video decoder 5, the audio decoder 7, and the graphics decoder 12 (Step S9).

Step S11 is for performing ending judgment for the flowchart. Specifically, it is judged whether the PIy has reached the last PI. If the Step S11 results in Yes, the flowchart is ended. Otherwise, the next PlayItem is set as PIy (Step S12), and the operation returns to Step S3. Hereinafter, the processing of Step S1-Step S10 is repeated until Step S11 results in Yes.

Step S10 is a step for loading functional segments to the coded data buffer 13, in response to the reading of ACCESS UNIT.

Figure 36:
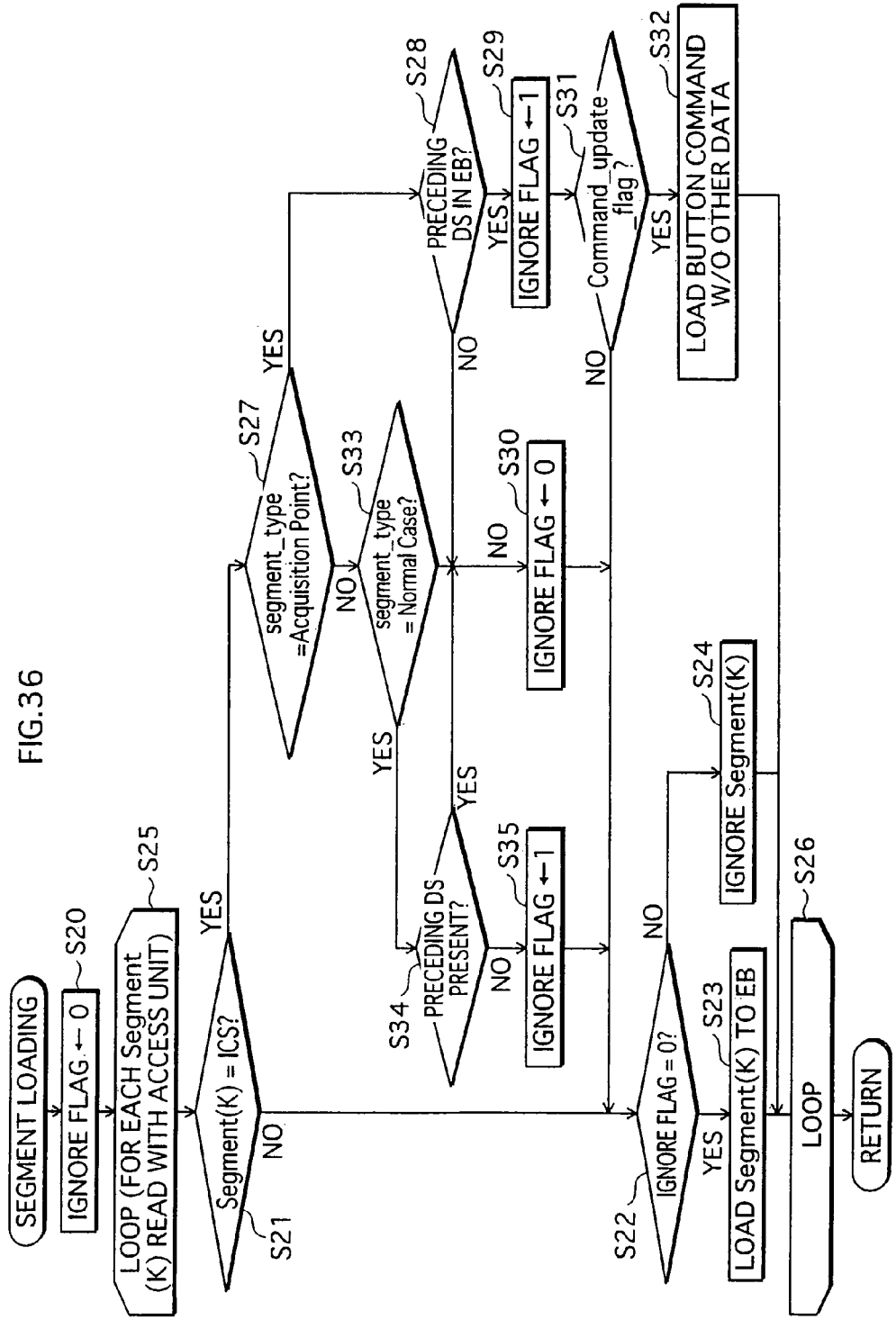
FIG. 36 is a flowchart showing the procedure of loading processing for Segment.

FIG. 36 is a flowchart showing the procedure for loading processing for the functional segments. In this flowchart, "SegmentK" represents a variable corresponding to each of Segment (ICS,ODS,PDS) read together with the ACCESS UNIT. An ignore flag is used to switch between ignoring and loading of SegmentK. This flowchart has a loop structure in which processing of Steps S21-S24, and Steps S27-S35 is repeatedly performed for all the SegmentK, when the ignore flag has been set as "0", and has been initialized (Step S25, S26).

Step S21 is for judging whether a SegmentK is an ICS. If the SegmentK is an ICS, judgments of Step S27 and Step S28 are performed.

Step S27 is for judging whether the Segment_Type of the ICS is an Acquisition Point or not. If the SegmentK turns out to be an Acquisition Point, the operation moves onto Step S28. Conversely, if the SegmentK turns out to be either an Epoch Start or a Normal Case, the operation moves onto Step S33.

Step S28 is for judging in which buffer (among the coded data buffer 13, the stream graphics processor 14, the object buffer 15, and the composition buffer 16), the preceding DS is found within the graphics decoder 12, and is performed when Step S27 has resulted in Yes. When a DS is not found in the graphics decoder 12, it means that a random access has been performed. In this case, display should start from the DS being an Acquisition Point. Therefore the operation moves onto Step S30 (Step S28:No).

When the preceding DS is found in the graphics decoder 12 (Step S28:Yes), the ignore flag is set as "1" (Step S29), and the operation moves onto Step S31.

Step S31 is for judging whether the command_update_flag is set as 1 or not. If 1 (Step S31:Yes), only the button command in the button information is loaded to the coded data buffer 13, and the others are ignored (Step S32). If 0, the operation moves onto Step S22. In this way, ICSs indicating an Acquisition Point will be ignored (Step S24).

If the ignore flag is set as 1, Step S22 will result in No, and as a result, all the functional segments belonging to an Acquisition-point DS are ignored.

Step S33 is for judging whether the Segment_Type in an ICS indicates a Normal Case or not. When the SegmentK is an Epoch Start, the ignore flag is set as 0 at Step S30.

When the ignore flag is 0 (Step S22:Yes), the SegmentK is loaded to the coded data buffer 13 (Step S23).

When the SegmentK is a Normal Case, the operation moves onto Step S34. Step S34 is the same as Step S28, in content, and is for judging whether the preceding DS is found in the graphics decoder 12. If the judgment is in the affirmative, the ignore flag is set as "0" (Step S30). If the judgment is in the negative, the ignore flag is set as "1", because it is inherently impossible to obtain sufficient number of functional segments for constituting an interactive display (Step S35). According to the above flag setting, when the preceding DS cannot be found in the graphics decoder 12, the functional segments constituting the Normal Case will be ignored.

Figure 37:
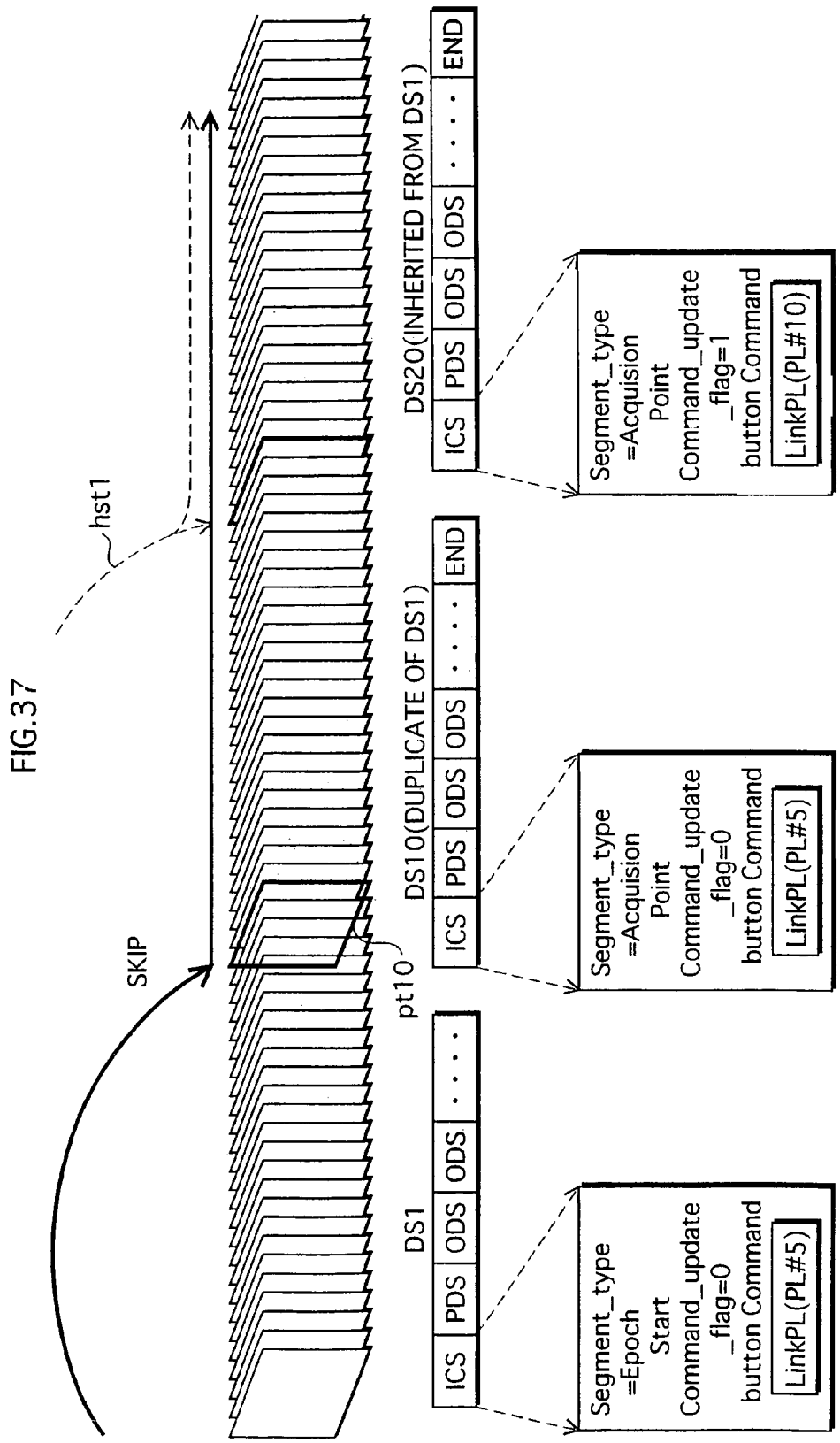
FIG. 37 is a diagram showing one example of multiplexing.

Next, the following explains how reading of a DS is performed in a case where multiplexing involving DS is performed as in FIG. 37. In the example of FIG. 37, three DSs have been multiplexed with a motion picture made of a plurality of pictures. In the first DS (DS1) among the three DSs, Segment_Type indicates an Epoch_Start, Command_update_ flag is set as 0, and a button command of LinkPL(PL#5) is included.

DS10 is a duplicate of DS1, and DS10's Segment_Type indicates an Acquisition Point, and Command_update_flag is set as 0, and a button command of LinkPL(PL#5) is included therein.

DS20 is an Inherit of DS1, and DS20's Segment_Type indicates an Acquisition Point. The only difference with DS1 is the button command (LinkPL(PL#10)). So as to indicate existence of a difference, Command_update_flag is set as 1.

Figure 38:
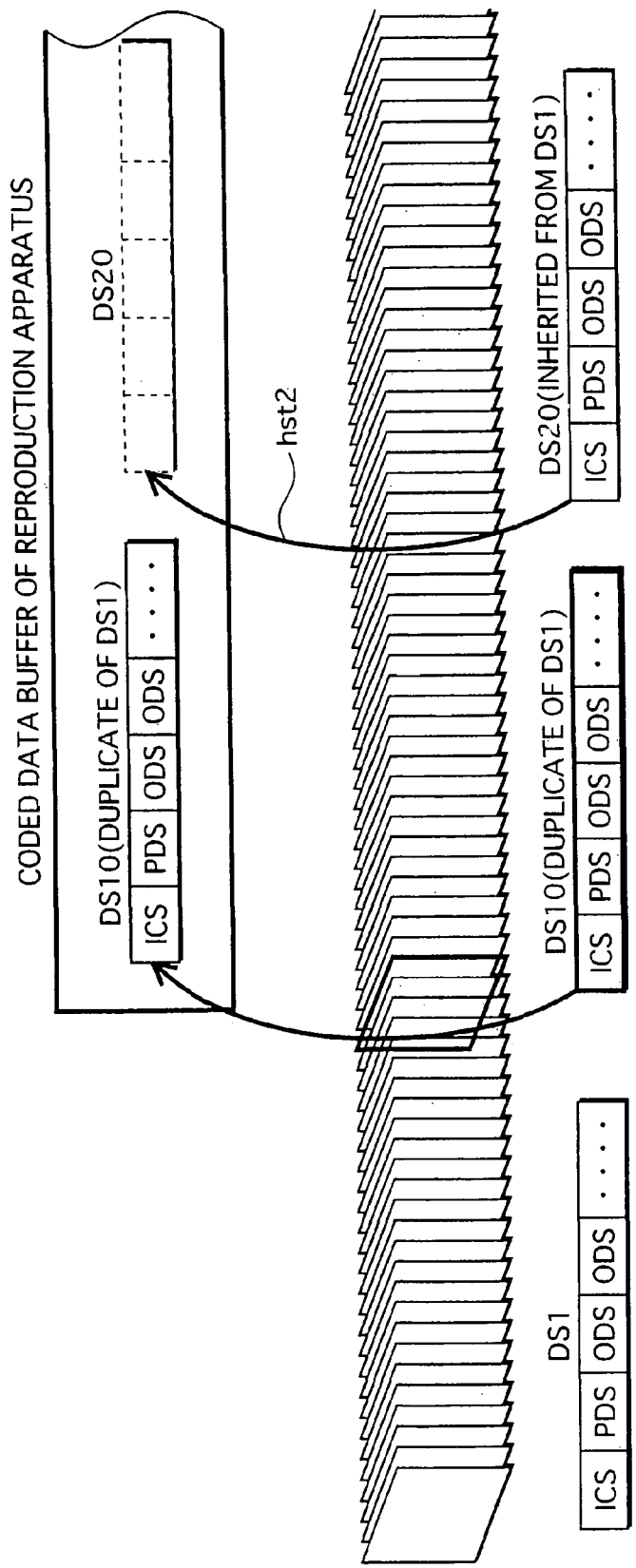
FIG. 38 is a diagram showing the manner in which DS10 is loaded to the coded data buffer 13 of the reproduction apparatus.

In an AV Clip in which the above-described three DSs have been multiplexed with a motion picture, suppose that random access is performed at the picture data pt10. In this case, the nearest DS10 to this random-access point will be a target of the flowchart processing of FIG. 36. At Step S27, segment_type is judged to be an Acquisition Point, but the preceding DS cannot be found in the graphics decoder 12. Therefore the ignore flag is set as 0, and this DS10 is loaded to the coded data buffer 13 in the reproduction apparatus, as shown in FIG. 38. On the other hand, when the random-access point exists after the point where the present Display Set 10 exists (the broken line hst1 in FIG. 37), the Display Set 20 (hst2 in FIG. 38) that follows the Display Set 10 is read to the coded data buffer 13.

Figure 39:
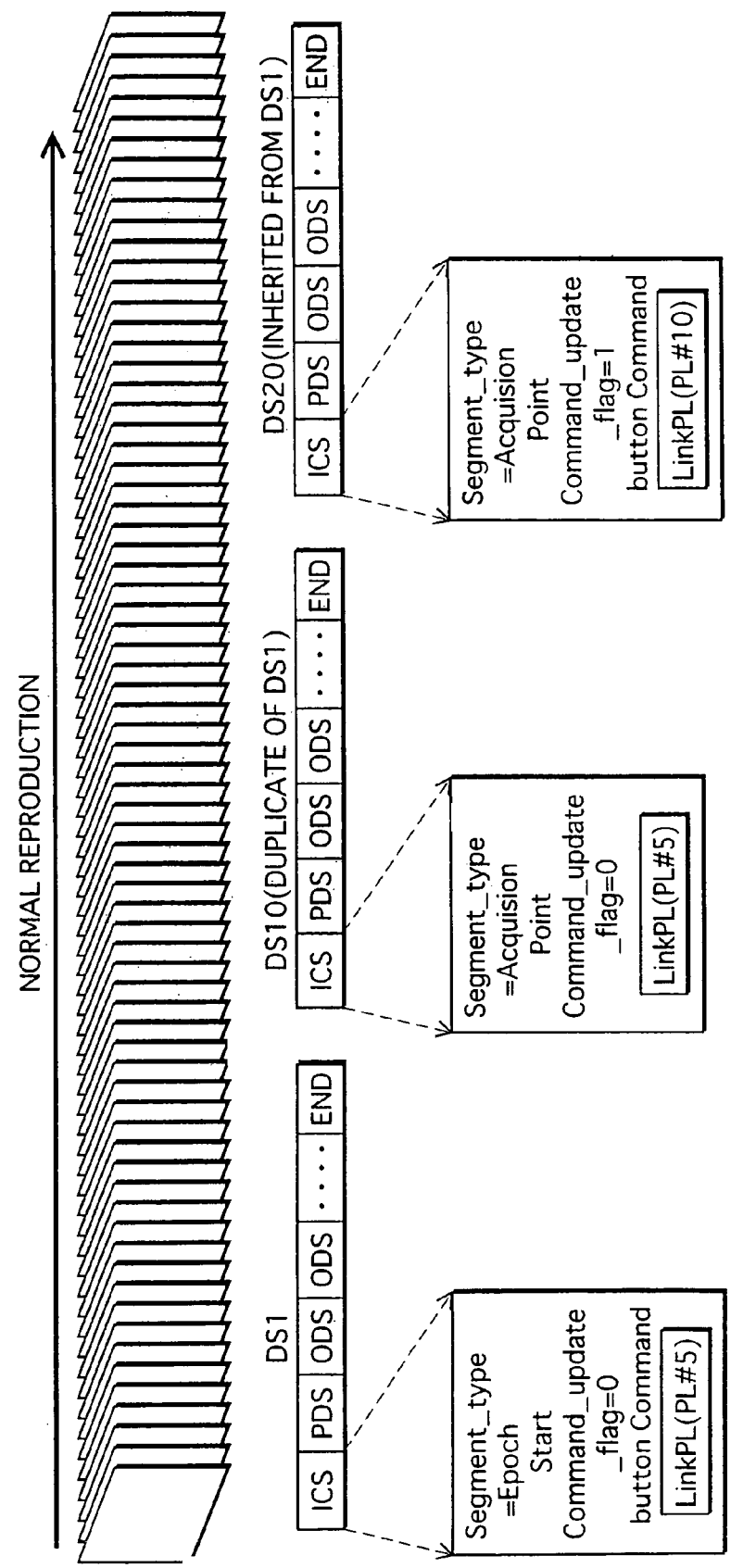
FIG. 39 is a diagram showing a case in which a normal reproduction is performed.
Figure 40:
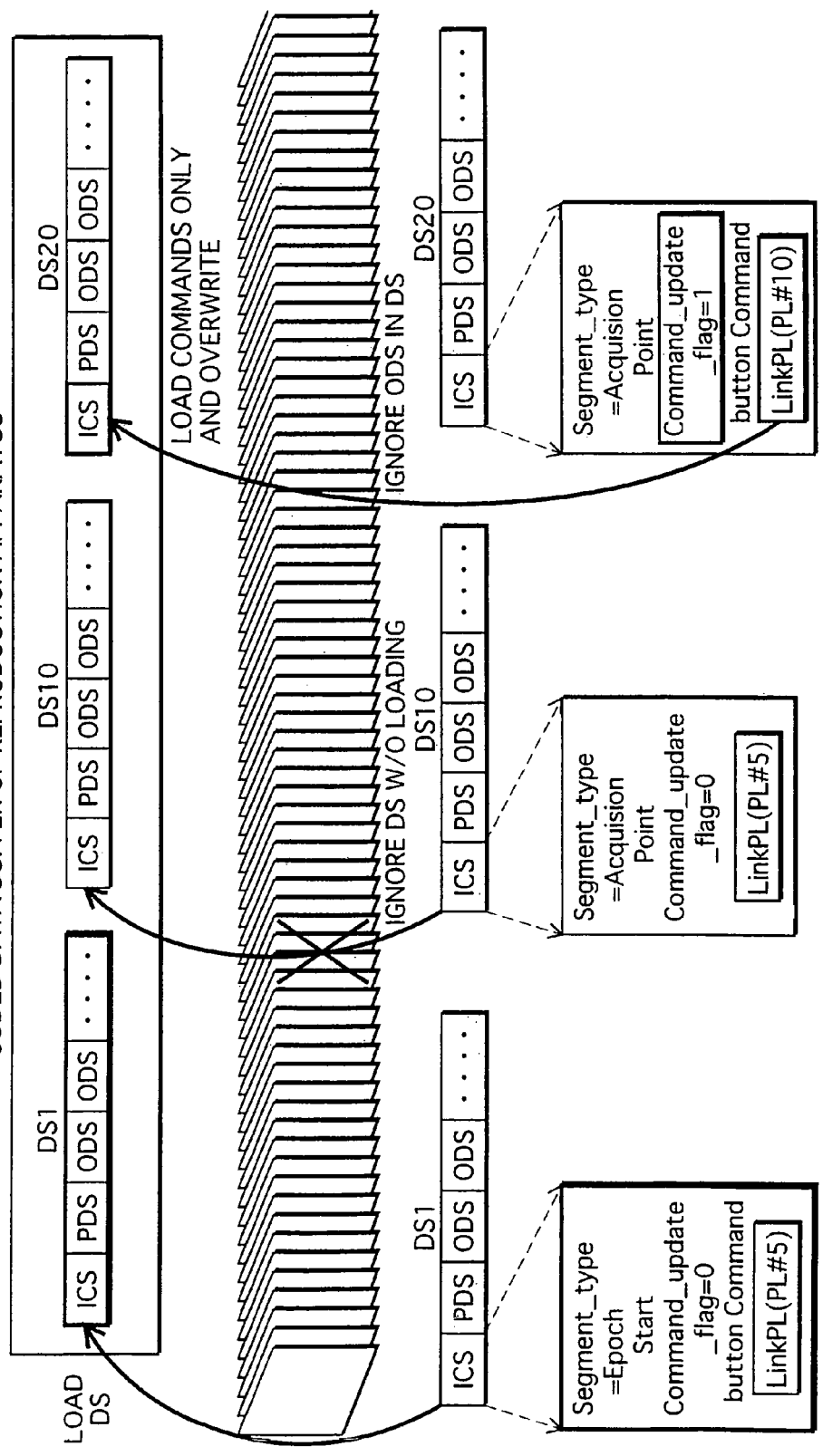
FIG. 40 is a diagram showing how the loading of DS1, DS10, and DS20 is performed when a normal reproduction is performed as in FIG. 39.

FIG. 40 shows how the loading of DS1, DS10, and DS20 is performed when a normal reproduction is performed as in FIG. 39. Among the three DSs, DS1 whose segment_type in ICS is an Epoch Start is loaded to the coded data buffer 13, as it is (Step S23). However, DS10 whose segment_type in ICS is an Acquisition Point, has the ignore flag set as 1 (Step S29), and so the functional segments constituting DS10 are ignored and not loaded to the coded data buffer 13 (Step S24). With regard to DS20, Segment_type of ICS indicates an Acquisition Point, but command_update_flag is set as 1. Therefore, Step S31 results in Yes, and so only the button command is loaded. As a result, as for the DS of the coded data buffer 13, only the button command in the ICS is replaced with this loaded button command (Step S32). Here, since the ignore flag still indicates 1, other elements than the button command are ignored and not loaded.

Figure 41:
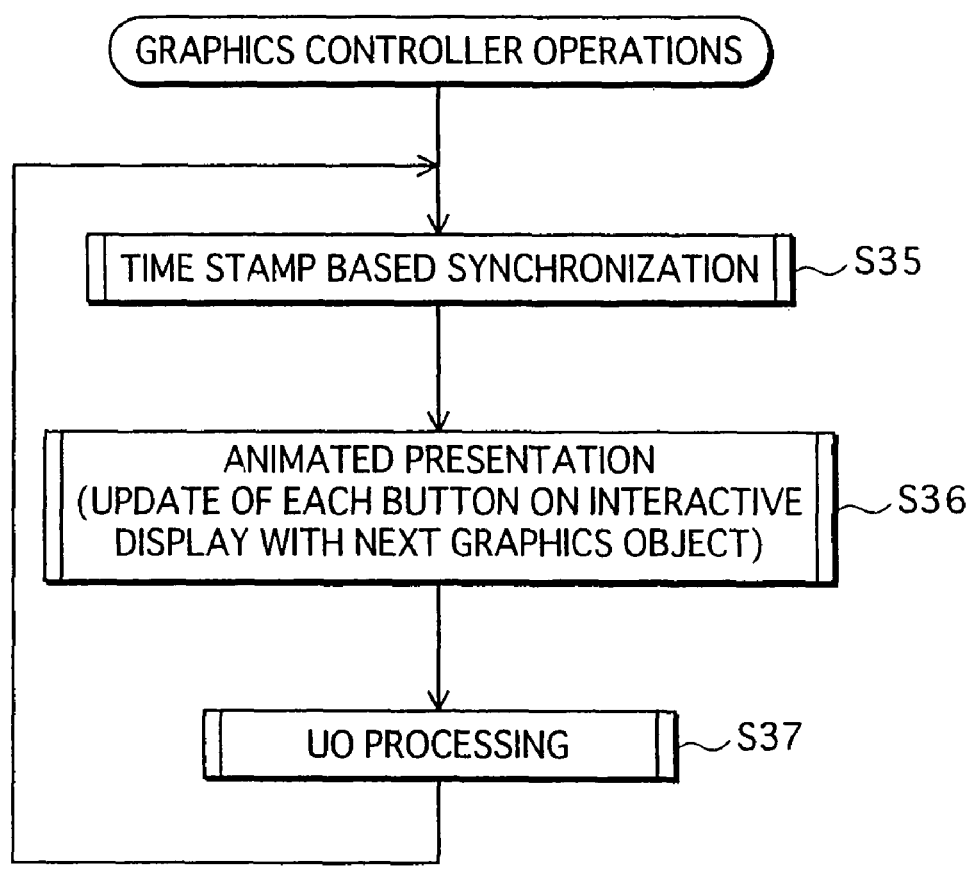
FIG. 41 is a flowchart in which processing corresponding to the main routine in the processing of the graphics controller 17 is described.

Although having the same display content as the DS1, the button command has been replaced from the LinkPL(#5) of the DS1 to the LinkPL(#10) of DS20, on arriving at the DS20. Such replacement facilitates control to change the content of the button command in course of the reproduction. Next, the processing procedure of the graphics controller 17 is described. FIG. 41 is a flowchart in which processing corresponding to the main routine in the processing of the graphics controller 17 is described. In this flowchart, the three kinds of processing are repeatedly performed: time stamp synchronized processing (Step S35); animation display processing (Step S36); and UO processing (Step S37).

Figure 42:
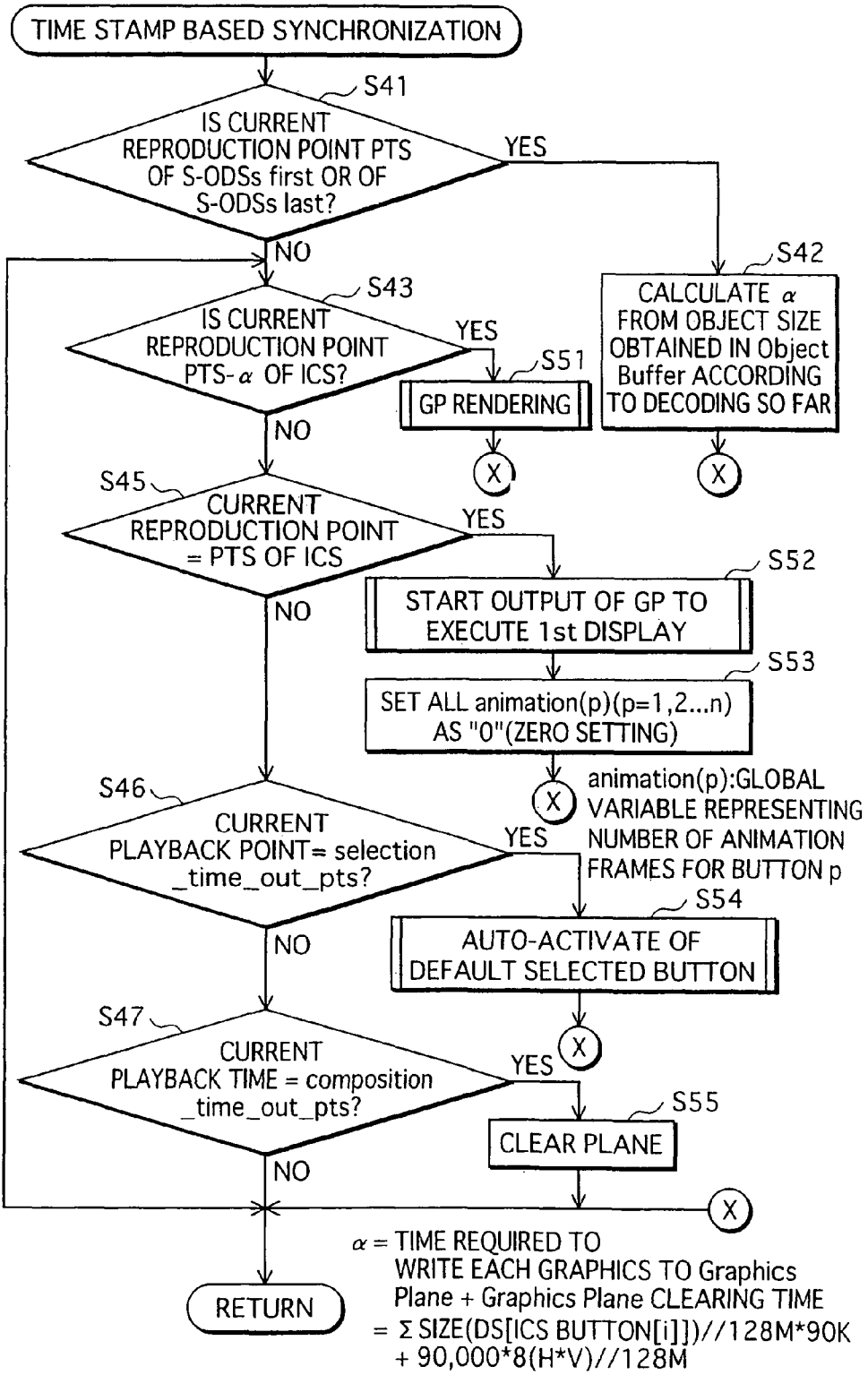
FIG. 42 is a flowchart showing the processing procedure for synchronized control performed by means of a time stamp.

FIG. 42 is a flowchart showing the processing procedure for synchronized control performed by means of a time stamp. In this flowchart, it is judged whether any of the phenomena of Step S41, S43-Step S47 holds. If any of the phenomena holds, a subroutine is formed in which a corresponding operation is performed, and then the operation returns to the main routine.

Step S41 is for judging whether the current reproduction time is any one of a time shown by the PTS of the S-ODSsfirst, and a time shown by the PTS of the S-ODSslast. If the judgment is in the affirmative, a period α is calculated at Step S42. The period α is a period obtained by adding (2) a time required to clear a graphics plane, and (3) a time required to write a graphics object obtained by decoding an ODS to the graphics plane.

At Step S42, the graphics controller 17 refers to Segment_Type of ICS, and if the Segment_Type indicates an Epoch Start, α is set as (2) plane clearing time+(3) plane writing time. If it indicates an Acquisition Point, α is set as (3) plane writing time. To calculate the plane writing time (3), the calculation of FIG. 23A is used when the default_selected_button_number indicates a valid value. On the other hand, when the default_selected_button_number indicates 0, the calculation of FIG. 23B is used to calculate the plane writing time (3). After the period α is calculated in the above way, the operation returns to loop processing.

Step S43 is for judging whether the current reproduction time is a time indicated by the PTS-α of ICS. If the judgment is in the affirmative, writing processing to the graphics plane 8 is performed (Step S51), and the operation returns to the main routine.

Step S45 is for judging whether the current reproduction time is PTS of ICS. If the judgment is in the affirmative, outputting the storage content of the graphics plane 8 is started. The outputting destination of this storage content is the CLUT unit 9. After being subjected to the color conversion at the CLUT unit 9, the interactive display will be overlayed with the storage content of the video plane 6. By doing so, an initial display is performed (Step S52). Then the variable "animation(p)(p=1, 2, 3, . . . n) is set as 0 (Step S53), and the operation returns to the main routine. Here, the variable "animation(p)" is a global variable indicating the ordinal position of the current frame in the sequence of frames, which will stay valid throughout a plurality of flowcharts. At Step S53, the button (p) of all the buttons will be set as 0.

Step S46 and Step S47 are for judging whether the current reproduction time has reached the time information described in ICS.

Step S46 is for judging whether the current reproduction time is a time shown by selection_TimeOut_PTS. If the judgment is in the affirmative, processing to activate a button indicated by the default_activated_button_number is performed, and the operation returns to the main routine (Step S54).

Step S47 is for judging whether the current reproduction time is a Composition_TimeOut_PTS. If the judgment is in the affirmative, screen clearing is performed and the operation returns to the main routine (Step S55). In the above-described synchronized processing by means of a time stamp, Step S51 and for Step S54 are respectively created as a subroutine. As follows, the processing performed at the subroutine of Step S51 is explained with reference to FIG. 43.

Figure 43:
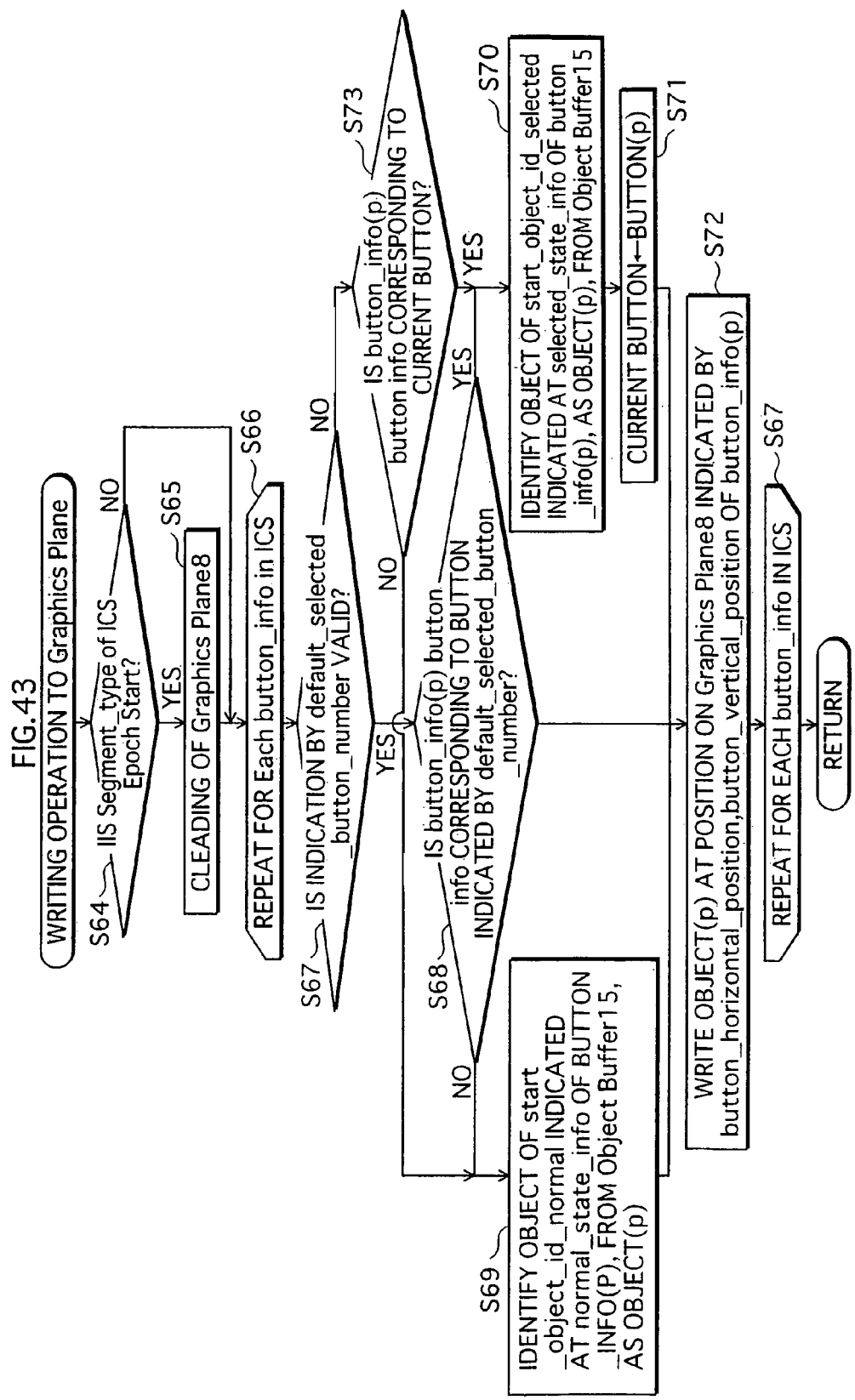
FIG. 43 is a flowchart showing the procedure for writing processing directed to the graphics plane 8.

FIG. 43 is a flowchart showing a processing procedure for writing an initial display of a menu to the graphics plane 8. Step S64 is for judging whether Segment_type of ICS indicates an Epoch Start. If the judgment is in the affirmative, the graphics plane 8 is cleared at Step S65, and the processing of Step S66-Step S73 is performed. The time required to clear the graphics plane 8 corresponds to a period cd1 in FIG. 25 and in FIG. 26. If the judgment is in the negative, Step S65 is skipped and the processing of Step S66-Step S73 is performed.

StepS66-Step S73 form loop processing that is repeated for each piece of button information in an ICS (Step S66, Step S67). In this loop processing, a piece of button information that is the processing target is called "button information (p)".

Step S67 is for judging whether default_selected_button_number indicates a valid number. Step S68 is for judging whether button_info(p) corresponds to the default selected button specified by the default_selected_button_number.

If the button_info(p) does not correspond to the default selected button, the graphics object of the start_object_id_normal indicated by the normal_state_info of the button_info(p) is found from the object buffer 15, and set as a graphics object(p) (Step S69).

If the button_info(p) does correspond to the default selected button, the graphics object of the start_object_id_selected is found from the object buffer 15 (Step S70), and the button(p) is set as a current button (Step S71). The current button is a button set in selected state in the interactive display currently displayed, and the reproduction apparatus stores the identifier of this current button as PSR(10).

After being identified by going through Step S69-Step S70, the graphics object (p) is written to a graphics plane 8, at a position shown by the button_horizontal_position and button_vertical_position of the button_info(p) (Step S72). By repeating this processing to each piece of button information of an ICS, the first graphics object will be written to the graphics plane 8. The time required to complete this processing for the graphics objects, which are among those on the graphics plane 15 and are necessary for an initial display, corresponds to the time td1 shown in FIG. 25 and FIG. 26.

When the default_selected_button_number indicates 0, and the default selected button dynamically changes, Step S67 will be No, and at Step S73, it is judged whether the button_info(p) corresponds to the current button. If the judgment is in the affirmative, the operation moves onto Step S70. If the judgment is in the negative, the operation moves onto Step S69.

Next, a processing procedure for a subroutine of Step S54 is explained with reference to FIG. 44.

Figure 44:
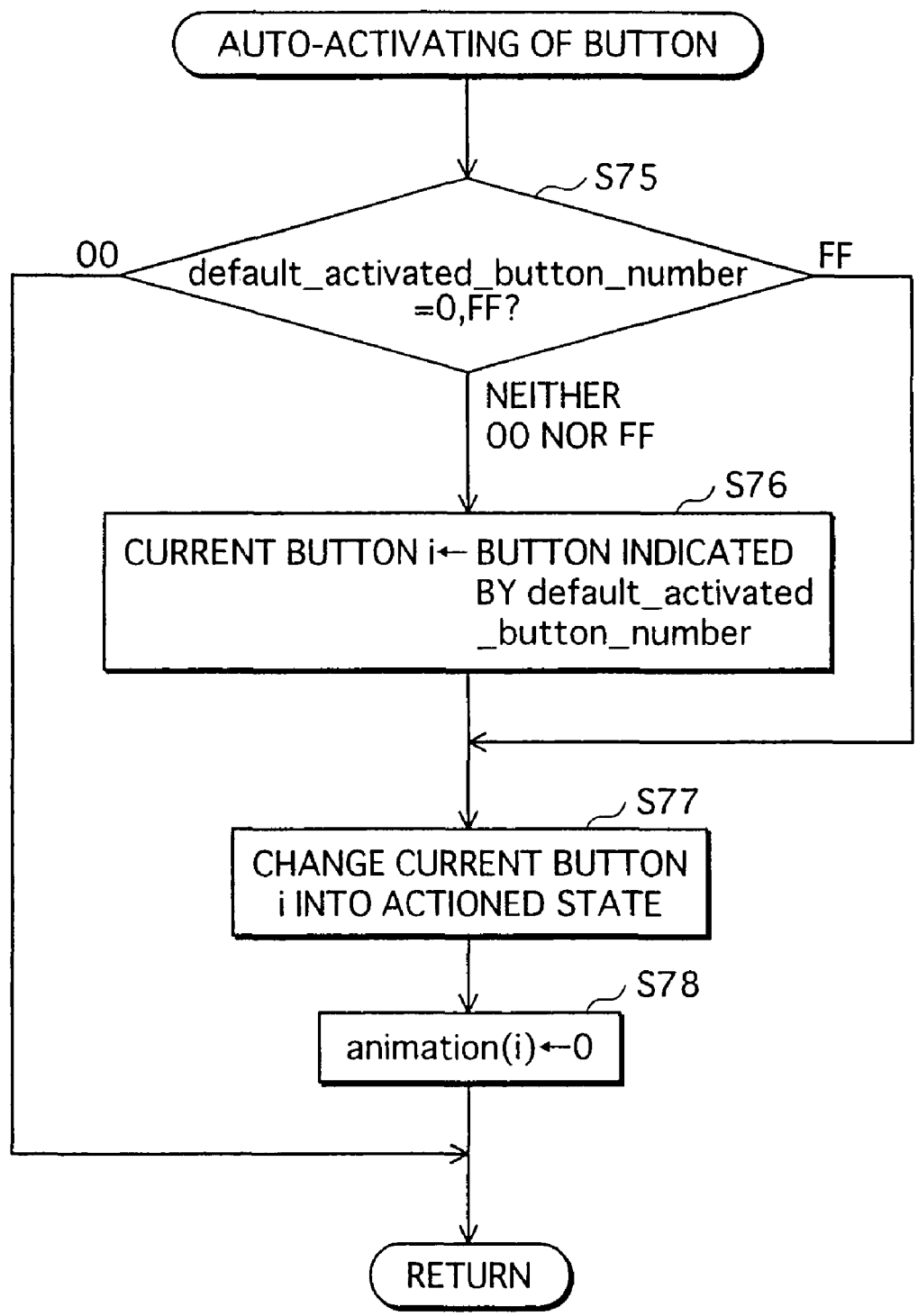
FIG. 44 is a flowchart showing a processing procedure for auto-activating a default selected button.

FIG. 44 is a flowchart showing a processing procedure how to auto-activate a default selected button. First, whether the default_activated_button_number is 00 or FF, is judged (Step S75). If the default_activated_button_number is "00", the operation returns to the main routine without performing any processing. If the default_activated_button_number is "FF", the current button i is changed to active state (Step S77). Then animation (i), which is a variable corresponding to the current button i, is set as 0, and the operation returns to the main routine (Step S78).

If the default_activated_button_number is neither 00 or FF, the button indicated by the default_activated_button_number is set as a current button (Step S76), and the current button i is changed to active state (Step S77), and the animation (i), which is a variable correpsonding to the current button i, is set as 0, and the operation returns to the main routine (Stpe S78).

According to the above processing, after a predetermined time, the button in selected state will be changed to active state.

Figure 45:
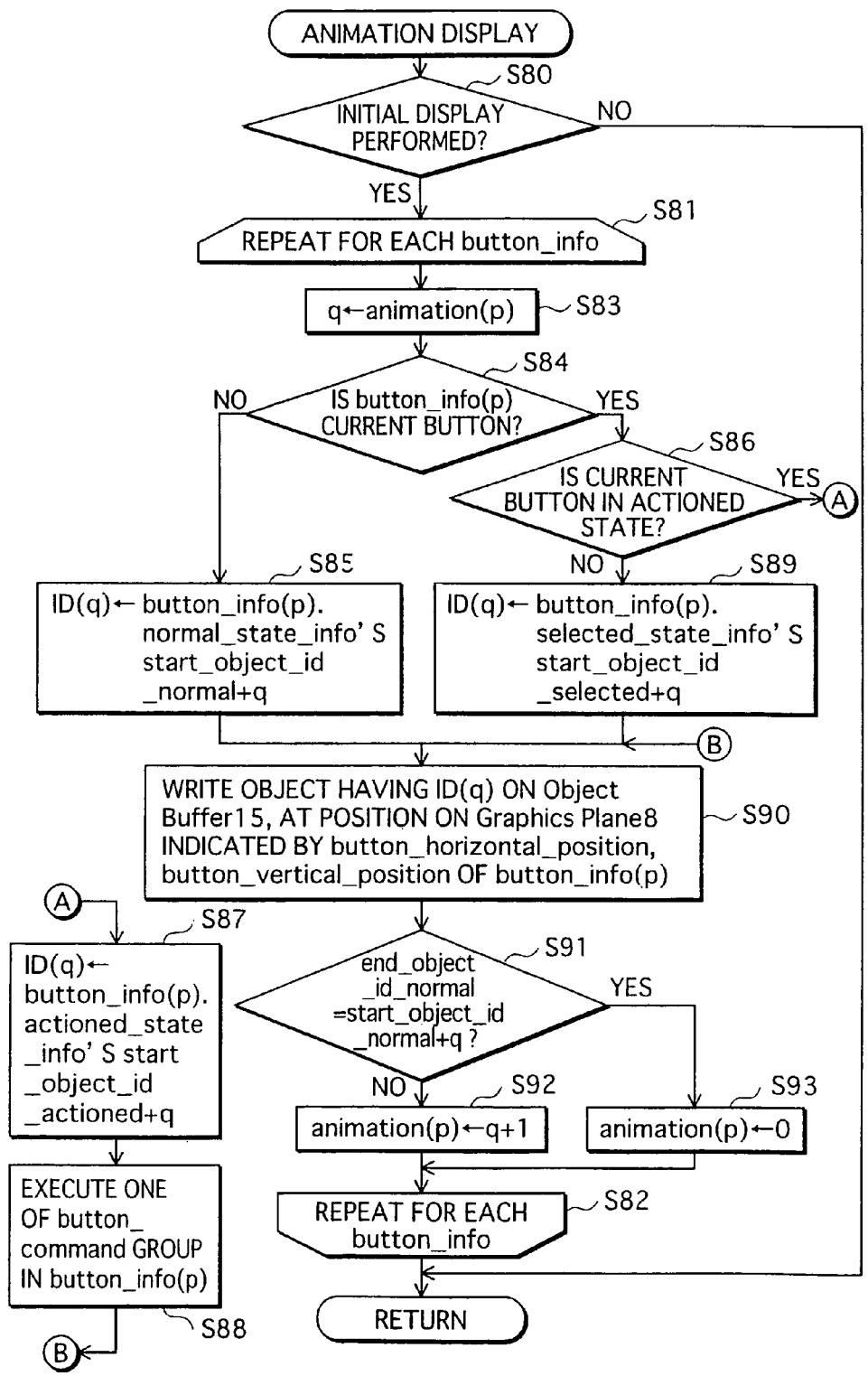
FIG. 45 is a flowchart showing a processing procedure for an animation display.

Next, the animation in a menu (Step S36) is described. FIG. 45 is a flowchart showing a processing procedure for an animation display.

Here, the initial display is realized by writing graphics objects specified by start_object_id_normal of normal_state_info, and start_object_id_selected of selected_state_info, in each button_info, to the graphics plane 8. The animation is processing to overwrite this graphics plane 8 with an arbitrary frame (i.e. a graphics object corresponding to a qth frame) in each button, every time the loop operation of Step S35-Step S37 finishes one loop. Specifically, this process of updating is realized by writing graphics objects specified by normal_state_info and selected_state_info, in button_info, one by one to the graphics plane 8 and returning to the main routine. Here, "q" is a variable for specifying each graphics objects specified by normal_state_info and selected_state_info of button_info of each piece of button information.

The processing for realizing this animation display is explained with reference to FIG. 45. For brevity, this flowchart is created based on the assumption that repeat_normal_flag and repeat_selected_flag are set to indicate that the repetition is necessary.

Step S80 is for judging whether an initial display has been complete. If an initial display has not been complete, the operation makes a return, without performing any processing. If an initial display has been complete, Step S81-Step S93 is designed to structure loop processing in which the processing of steps S81-Step S93 is repeated for each button_info in an ICS (Step S81, Step S82).

Step S83 sets animation (p) (the variable corresponding to the button_info(p)), to a variable q. In this way, the variable q will indicate the ordinal position of the current frame in the sequence of frames, which corresponds to the button_info(p).

Step S84 is for judging whether button_info(p) corresponds to a button currently in selected state (current button).

If the button_info(p) corresponds to a different button from the current button, an identifier, obtained by adding the variable q to start object_id_normal of normal_state_info of button_info(p), is set as ID(q) (Step S85).

If the button_info(p) corresponds to the current button, the judgment of Step S86 is performed.

Step S86 is for judging whether the current button is in active state. If the judgment is in the affirmative, an identifier, obtained by adding the variable q to start_object_id_actioned of actioned_state_info of button_info(p), is set as ID(q) (Step S87). Then one of the button commands that are included in button_info(p) is executed (Step S88).

If the current button is judged not to be in active state, an identifier, obtained by adding the variable q to start_object_id_selected of selected_state_info of button_info(p), is set as ID(q) (Step S89).

In this way, once ID(q) is decided, the graphics object (p) that has the ID(q) and exists in the object buffer 15 is written to the graphics plane 8, at a position indicated by button_horizontal_position and button_vertical_position of button_info(p) (Step S90).

According to the above loop processing, qth frame of the plurality of graphics objects, which respectively constitute the selected state (or active state) of the current button and the normal state of the other buttons, will be written to the graphics plane 8.

Step S91 is for judging whether start_object_id_normal+q has reached end_object_id_normal. If the judgment is in the negative, the variable "animation(p)" is incremented by the variable q (Step S92). If the judgment is in the affirmative, the variable "animation(p)" is initialized to have a value "0" (Step S93). The above-described processing is repeated to all the button_info in the ICS (Step S81, StepS82). After completion of the processing for all the button_info in the ICS, the operation returns to the main routine.

By performing Step S80-Step S93, the design image for each button in the interactive display will be updated to a new graphics object every time one loop of Step S35-Step S37 is finished. If the loop of StepS35-Step S37 is performed many times, a so-called animation is realized. In the animation, the graphics controller 17 performs time adjustment so that the display interval for one frame of graphics object is set as a value indicated by animation_frame_rate_code.

In the above explanation, the button commands in button_info(p) are executed one by one. However, it is also possible to execute all the button commands included in button_info(p) at a time, after all the graphics objects corresponding to the active state have been displayed. Next, the processing procedure for UO processing at Step S37 in the main routine is explained with reference to FIG. 46.

Figure 46:
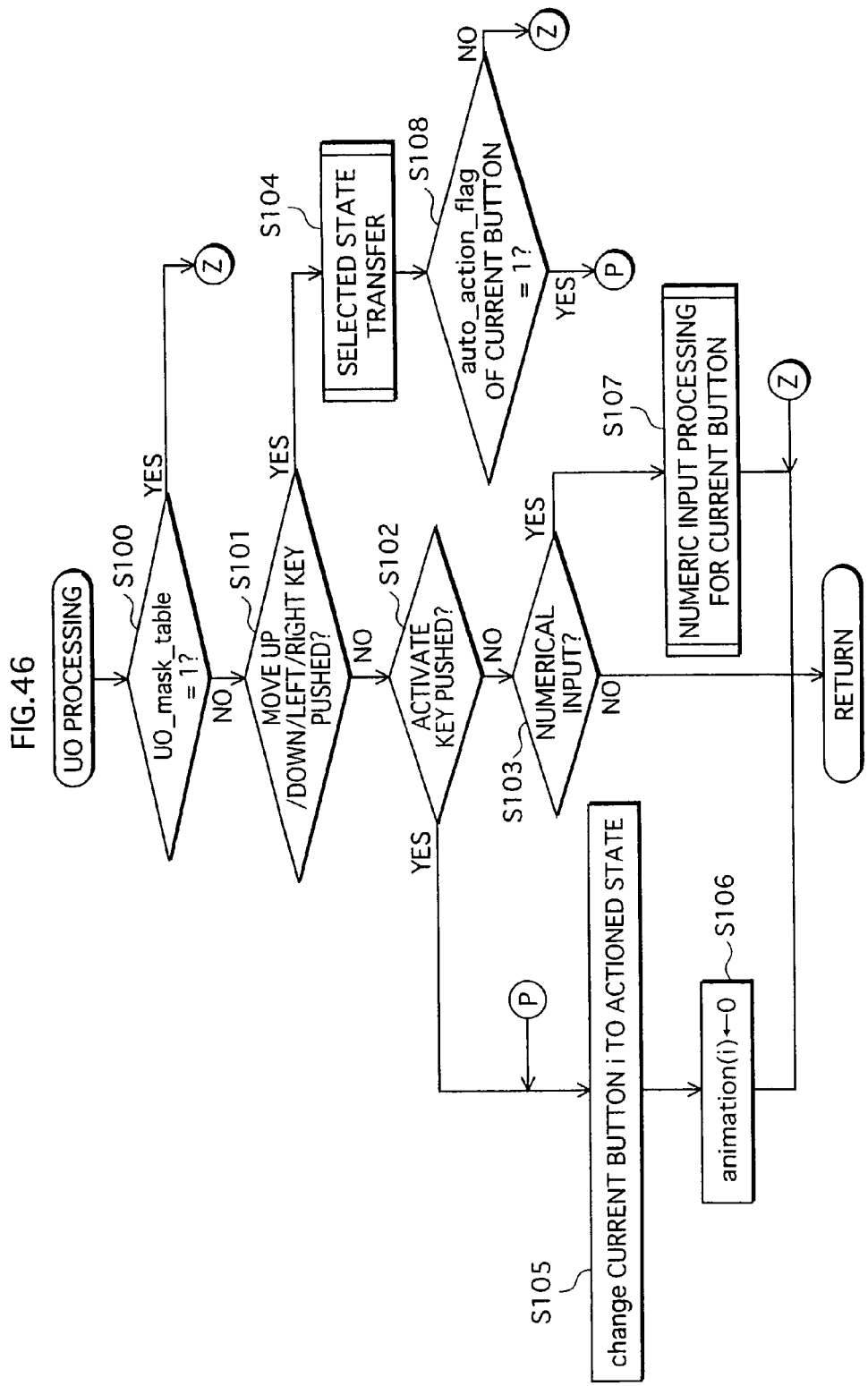
FIG. 46 is a flowchart showing a processing procedure of a UO processing.

FIG. 46 is a flowchart showing the processing procedure of the UO processing. In this flowchart processing, it is judged whether any of the phenomena of Step S100-Step S103 holds, and if it does, corresponding processing is executed, and the operation returns to the main routine. Step S100 is for judging whether UomaskTable is set as 1. If the judgment is in the affirmative, the operation returns to the main routine without performing any processing.

Step S101 is for judging whether any of MoveUP/Down/Left/Right keys has been pushed. If the judgment is in the affirmative, the current button is changed (Step S104), and it is judged whether auto_action_flag for the current button is 01 (Step S108). If the judgment is in the negative, the operation returns to the main routine. If the judgment is in the affirmative, the operation moves onto Step S105.

Step S102 is for judging whether the activated key has been pushed. If the judgment is in the affirmative, the current button i is changed to active state (Step S105). Then, the variable "animation(i)" is set as 0 (Step S106).

Figure 47:
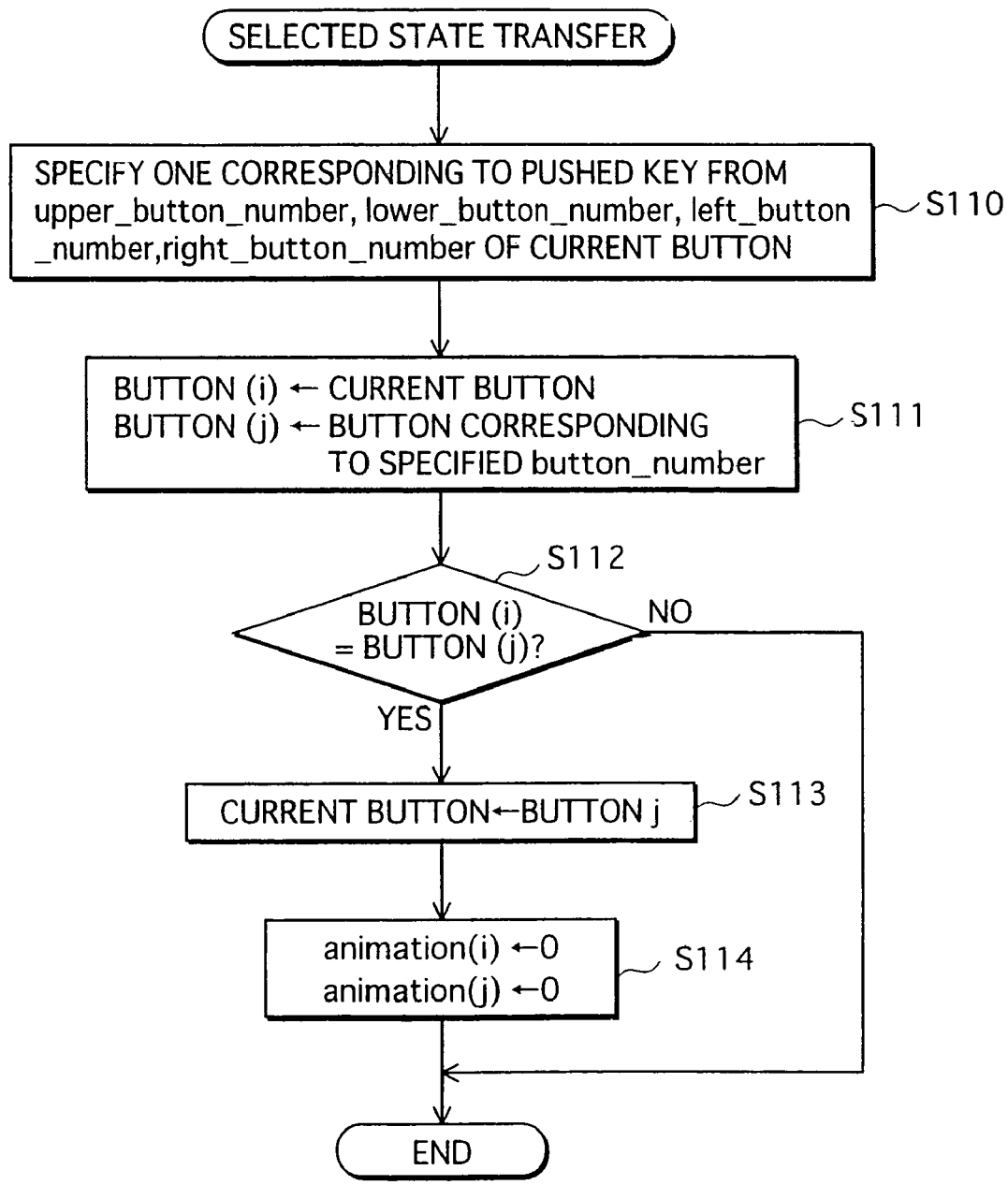
FIG. 47 is a flowchart showing a procedure of changing processing for a current button.
Figure 48:
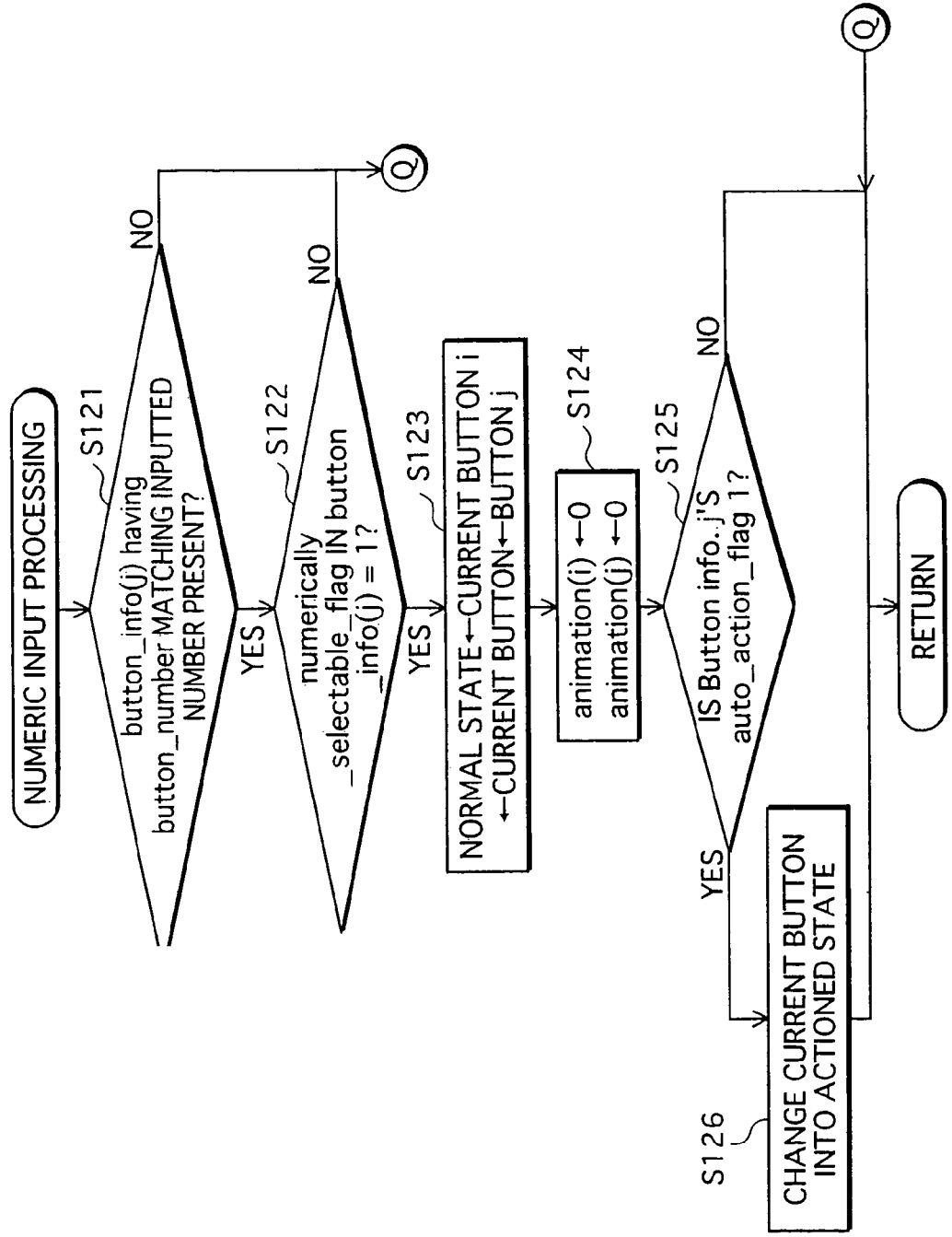
FIG. 48 is a flowchart showing a procedure of numerical inputting processing.

Step S103 is for judging whether it is a case of numerical value inputting. If the judgment is in the affirmative, numerical-value inputting processing is performed (Step S107), and the operation returns to the main routine. Among the processing procedures in FIG. 46, Step S104 and Step S107 respectively have a structure as a subroutine. The concrete processing procedures for the subroutines are shown in FIG. 47 and FIG. 48. As follows, these flowcharts are explained.

FIG. 47 is a flowchart showing the procedure of changing processing for a current button. First, in neighbor_info of the current button, one of upper_button_number, lower_button_number, left_button_number, and right_button_number, which corresponds to the pressed key, is identified (Step S110).

Then, the current button is set as "button i", and the new current button is set as "button j" (Step S111). Step S112 is for judging whether the button j set at Step S11*l* is identical to the button i. If they are identical, the operation returns to the main routine, without performing any processing. If they are not identical to each other, the button j is set as a current button (Step S113), and the variables "animation (i)" and "animation (j)" are set as 0. Then the operation returns to the main routine (Step S114).

FIG. 48 is a flowchart showing the procedure of numerical inputting processing. It is judged whether button info.j having the button_number that corresponds to the inputted numerical value exists (Step S121), and whether numerically_selectable_flag of button info.j is 1 is judged (Step S122). If Step S121 and Step S122 result in Yes, the current button is changed to normal state, and the button j is set as a current button (Step S123), and the variable "animation(i)" and the variable "animation(j)" are set as 0 (Step S124). Then it is judged whether auto_action_flag of Button info.j is 1 (Step S125). If it is not 1, the operation returns to the main routine.

If it is 1, the current button is changed to active state at Step S126, and then the operation returns to the main routine.

If one of Steps S121-S123 is No, the operation returns to the main routine.

When trying to perform interactive-display display using a user operation as a trigger (e.g. popup display), the stream graphics processor 14 and the graphics controller 17 perform the following processing, which is the same as the processing performed for synchronized display. According to this, the graphics object is obtained at the graphics plane 8. After obtaining of graphics object in this way, it is waited until the current reproduction time reaches the time shown by the PTS assigned to the ICS. Then after this reproduction time, once a UO indicating a menu call is received at the UO controller 18, the graphics object is outputted from the graphics plane 8 to the CLUT unit 9 for combining. By performing such outputting in synchronization with the UO, a popup display according to the pressing of the menu call is realized.

So far, how to set PTS in ICS; and DTS and PTS in ODS, where the ICS and ODS belong to a DSn, was explained. However, DTS in ICS; DTS, PTS in PDS; and DTS, PTS in END have not been explained yet. As below, these timestamps are explained. The ICS should be loaded to the Composition buffer 16, before: a decode start time of the first ODS(ODS1) in the DSn (i.e. DTS(DSn[ODS1])); and before the first PDS(PDS1) in the DSn becomes valid (i.e. PTS(DSn[PDS1])). Specifically, the following relations should be satisfied.

$$DTS(DSn[ICS]) \leq DTS(DSn[ODS1])$$

$$DTS(DSn[ICS]) \leq PTS(DSn[PDS1])$$

As follows, setting of DTS, PTS in each PDS belonging to the DSn is described.

Each PDS belonging to the DSn should be valid in the CLUT unit 9, between a time at which the ICS is loaded to the composition buffer 16 (DTS(DSn[ICS])) and a decode start time of the first ODS (DTS(DSn[ODS1])). Therefore for each of PTS values for PDS(PDS1-PDSlast), the following relations should be satisfied.

$$DTS(DSn[ICS]) \leq PTS(DSn[PDS1])$$

$$PTS(DSn[PDSj]) \leq PTS(DSn[PDSj+1]) \leq PTS(DSn[PDSlast])$$

$$PTS(DSn[PDSlast]) \leq DTS(DSn[ODS1])$$

Note that even though not being referred to at reproduction, a DTS of a PDS will be set at the same value as a corresponding PTS, so as to comply with the MPEG2 standard.

Figure 49:
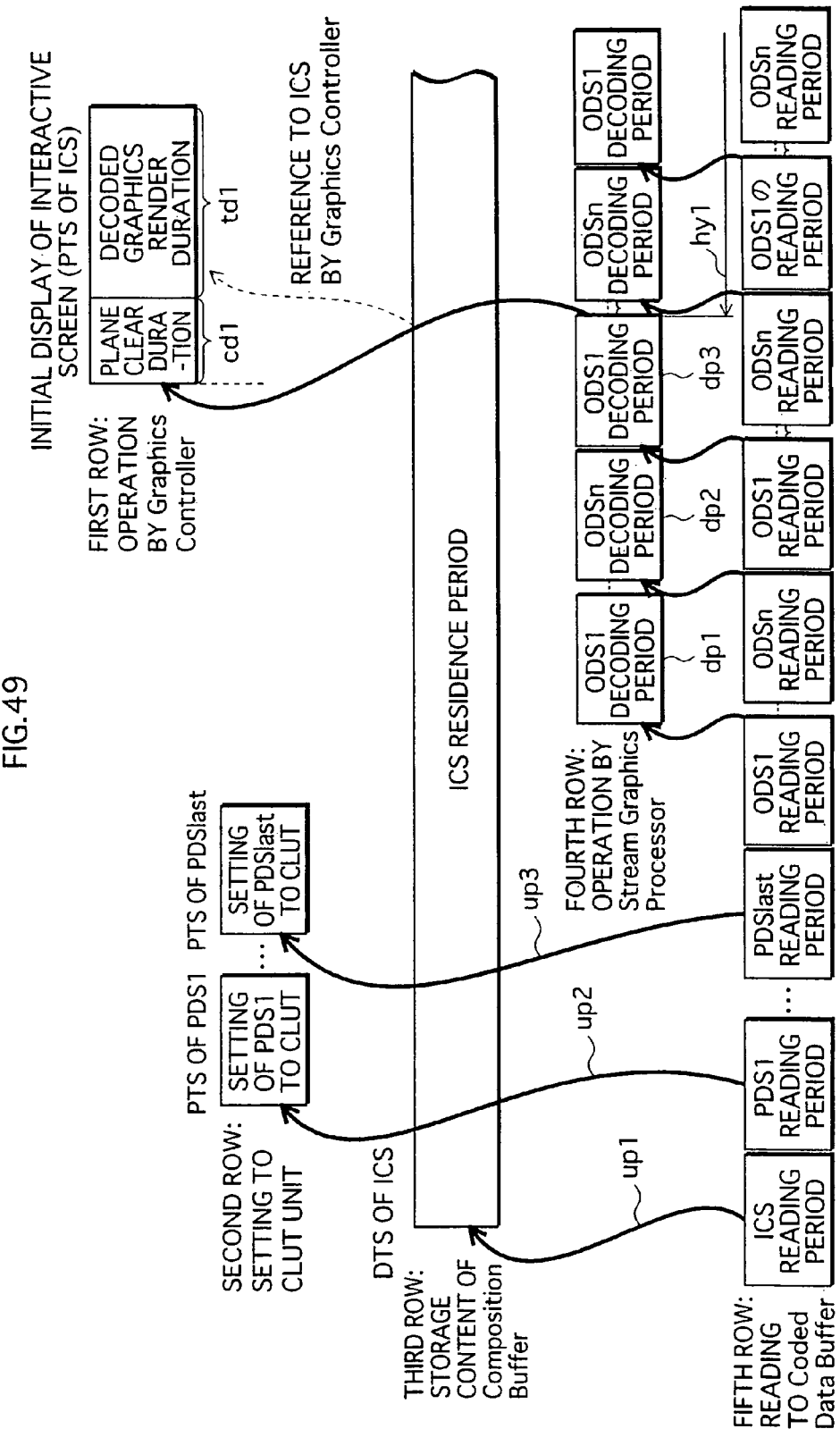
FIG. 49 is a diagram showing a pipeline in a reproduction apparatus, based on DTS, and PTS in PDS.

The following explains the meaning of DTS and PDS in the pipeline of a reproduction apparatus, once the DTS and the PDS are set so as to satisfy the above relations. FIG. 49 is a diagram showing a pipeline in a reproduction apparatus, based on the DTS in the ICS, and the PTS in the PDS. FIG. 49 is created based on FIG. 33. "Reading to coded data buffer 13" found in the third row of FIG. 33 corresponds to the fifth row in the present drawing. In addition, "decoding by Stream Graphics processor 14" found in the second row corresponds to the fourth row in the present drawing. Moreover, the ICS and the PTS are set so as to satisfy the above-presented relations.

The second row in FIG. 49 is a PDS setting to the CLUT unit 9. The third row shows a storage content of the compositionbuffer16. The DTS in the ICS is set at an earlier time than the DTS of the PDS or the DTS of the ODS. Therefore, as the arrow up1 shows in this drawing, loading of the ICS to the composition buffer 16 is performed first of all. In addition, setting of PDS1-last to the CLUT unit 9 is performed after transfer of the ICS and before decoding of the ODS1, and so is set before the DTS of the ODS1, as the arrow up2 and up3 show in the drawing.

As clear from the above, loading of ICS, and setting of PDS are done prior to decoding of ODS.

Next, setting of PTS for "END of Display Set Segment" belonging to the DSn is described. The End of the DSn indicates ending of the DSn, and so is to indicate a decode end time of the last ODS(ODSlast) of the DSn. This decode end time is indicated by the PTS of the ODSlast (PTS(DSn[ODSlast])). Therefore the PTS in the END should satisfy the following relation.

$$PTS(DSn[END]) = PTS(DSn[ODSlast])$$

In relation to the ICSs belonging to DSn and DSn+1, the ICS in the DSn is loaded to the composition buffer 16 prior to the loading time of the first ODS(ODS1), and so the PTS of the END should be after a loading time of ICS belonging to the DSn (DTS(DSn[ICS])), and before a loading time of ICS belonging to the DSn+1 (DTS(DSn+1[ICS])).

$$DTS(DSn[ICS]) \leq PTS(DSn[END]) \leq DTS(DSn+1[ICS])$$

On the other hand, a loading time for the first ODS(ODS1) is after a loading time of the last PDS(PDSlast). And so PTS of END (PTS(DSn[END])) should be after a loading time of PDS belonging to the DSn belonging to the DSn (PTS(DSn[PDSlast])). Therefore PTS of END should satisfy the following relation.

$$PTS(DSn[PDSlast]) \leq PTS(DSn[END])$$

Figure 50:
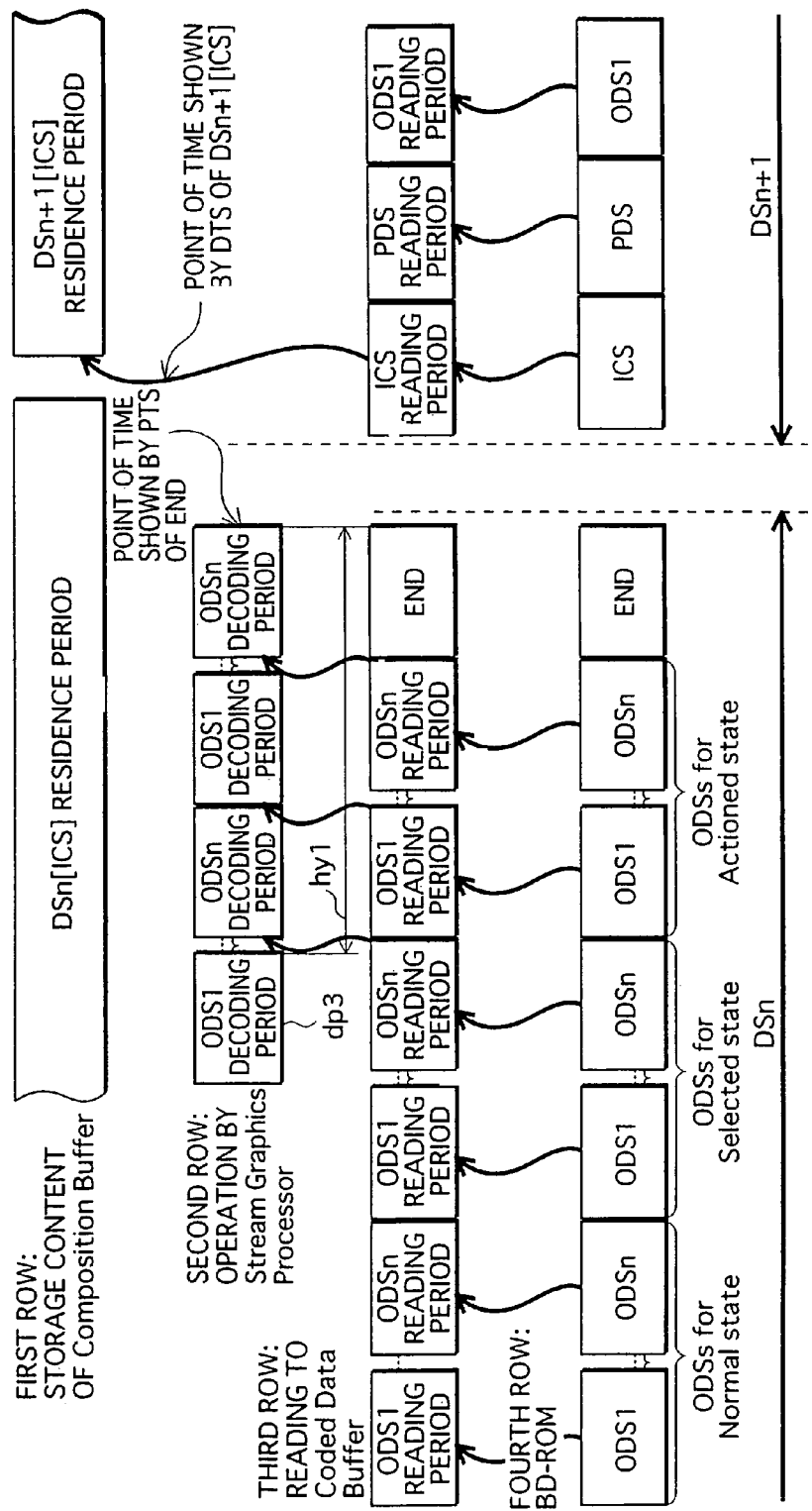
FIG. 50 is a diagram showing a meaning of an END during pipelining of the reproduction apparatus.

Next, the meaning of PTS of END in the pipeline of the reproduction apparatus is explained. FIG. 50 is a diagram showing the meaning of the END during operation of the pipeline of the reproduction apparatus. This diagram is created based on FIG. 33, and almost all the rows therein are the same as those of FIG. 33, except that the first row indicates the storage content of the composition buffer 16. In addition, FIG. 50 renders two display sets, namely DSn and DSn+1. In the DSn, the ODSlast is the last ODSn of A-ODSs, and so the PTS of the END is set to indicate the PTS of this ODSn. The time shown by the PTS of this END is earlier than the time shown by the DTS of the ICS in DSn+1.

According to the PTS of this END, in reproduction, it becomes possible to know which time ODS loading with respect to DSn completes.

Note that even though not being referred to at reproduction, a DTS of an END will be set at the same value as a corresponding PTS, so as to comply with the MEPG2 standard.

In the above structure, ICS, PDS, and ODS, in which DTS and PTS a reset, are incorporated into an AV Clip in advance. This is convenient for describing interactive control for having a reproduction apparatus to execute certain processing at which a frame of the motion picture appears on a screen, such interactive control being closely synchronized with the content of a motion picture. In addition, in the above structure, ICS, PDS, and ODS are multiplexed to the AV Clip itself. Therefore even when the number of sections to be a reproduction control target is some hundreds, it is not necessary to store all the corresponding ICS, PDS, and ODS. ICS, PDS, and ODS are read from a BD-ROM together with video packets. The procedure to be followed is to read ICS, PDS, and ODS for a motion picture section that is to be reproduced at the moment onto the memory, and after completion of the reproduction of this motion picture section, delete the ICS, PDS, and ODS from the memory, and then store a new set of ICS, PDS, and ODS corresponding to the next motion picture section, to the memory. According to the above structure, the occupied area of a memory is limited to minimum even when the number of ICS, PDS, and ODS becomes some hundreds.

As described so far, according to the present embodiment, there are 360 pages of ODSs for rendering animation. Under an assumption that there are three button-state sets, the ODSs will be grouped under three button-state sets (e.g. 120+120+120 pages). Each button-state set is placed so that the set that appears earlier in the animation will be placed nearer to the top, and the set that appears later will be placed farther to the top. Accordingly, in reproduction, the earlier appearing button-state set will be loaded to the reproduction apparatus early, postponing loading of later appearing button-state sets. By doing so, when once reading/decoding of about ⅓-⅔ of the entire ODSs are complete, the preparation for an initial display is ready, even though not all of the 360 pages of ODSs have not been finished being decoded. This further means that in a case when there is an enormous amount of ODSs to be read/decoded, execution of initial display will not be delayed. According to this, the interactive display with animation can be performed without delay.

Second Embodiment

Figure 51:
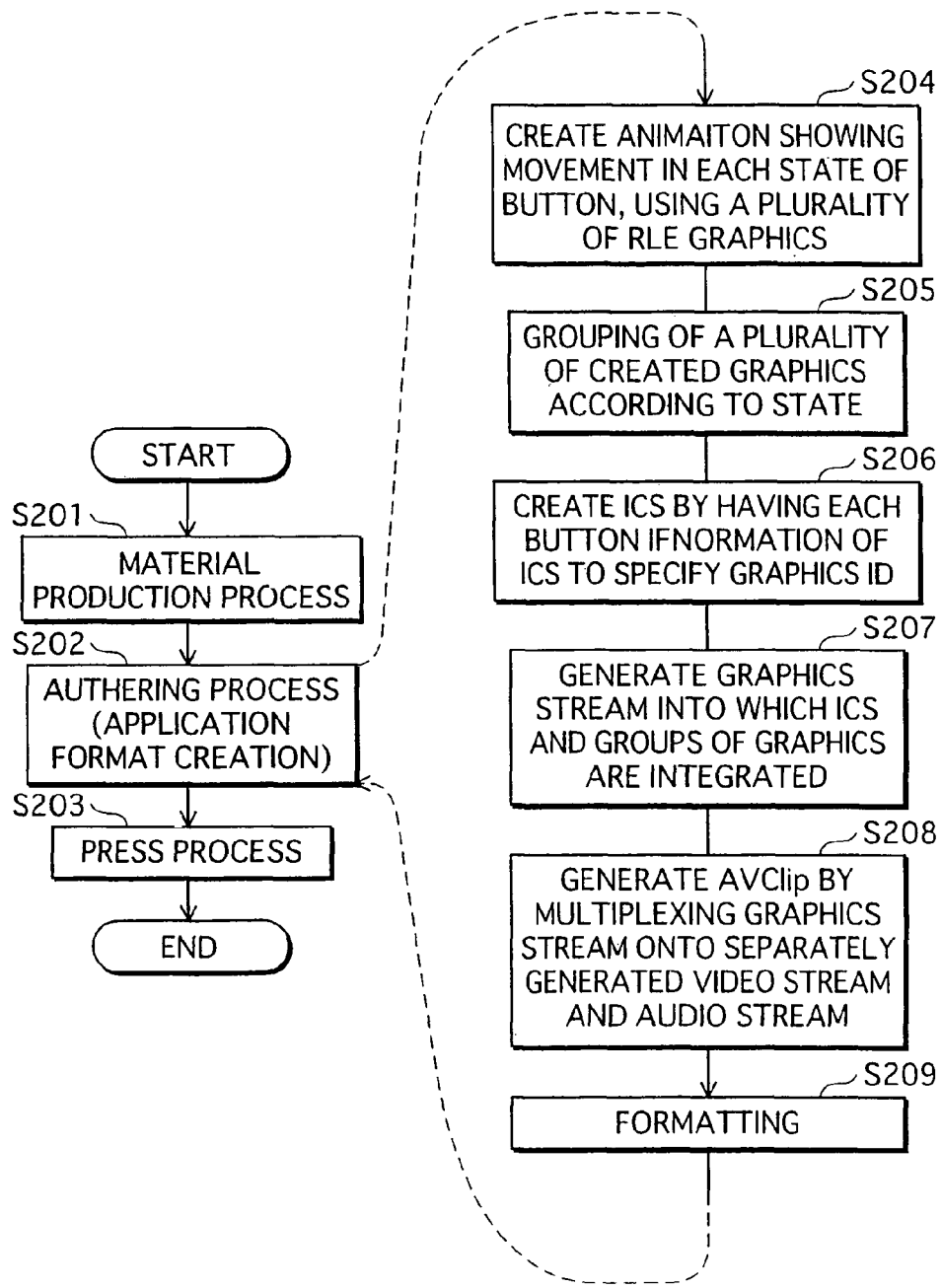
FIG. 51 is a flowchart showing a production method of a BD-ROM that relates to the second embodiment.

The present embodiment relates to a production method of a BD-ROM. FIG. 51 is a flowchart showing the production method of the BD-ROM that relates to the second embodiment.

The production method of the BD-ROM includes: a material production process S201 in which material creation such as motion picture photographing and audio recording is performed; an authoring process S202 in which an application format is generated using an authoring apparatus; and a press process S203 in which a master for the BD-ROM is created by pressing and laminating, so as to complete the BD-ROM.

Among these processes, the authoring process directed to a BD-ROM includes the following steps, Step S204-Step S209.

First, at Step S204, animation for frames corresponding to button states are created, frame by frame, in a plurality of pieces of graphics data in a plurality of run-length encoding method.

At Step S205, the created pieces of graphics data are grouped under button states. Then an ICS is created in which each button information specifies an identifier of a piece of graphics data. In creation, at Step S206, setting of default selected button and how to vary the states of buttons, are written to the ICS. At Step S207, the ICS and the grouped graphics data are integrated into a graphics stream. Once the graphics stream is generated, at Step S208, the graphics stream is multiplexed with a video stream and an audio stream created independently of the graphics stream, to obtain an AV Clip. Once the AV Clip is obtained, at Step S209, a static scenario, an active scenario, and the AV Clip are made to comply with the BD-ROM format, thereby completing an application format.

As explained so far, according to the present embodiment, such a graphics stream as explained in the first embodiment is generated by performing grouping of graphics data during the authoring process. This is an easy way to generate an application format for a BD-ROM described in the first embodiment.

Third Embodiment

The interactive graphics stream of the first embodiment is recorded onto a BD-ROM by being overlayed onto an AVClip. However, in the third embodiment, the interactive graphics stream is recorded to a BD-ROM as a sub Clip separate from the AVClip, and the playlist information is used to associate the AVClip and the sub Clip.

In the playlist information, the reproduction path formed by Play Item information is called "main path". In contrast, information indicating the sub Clip is called sub-path information and defines a reproduction path called "sub path".

Figure 52:
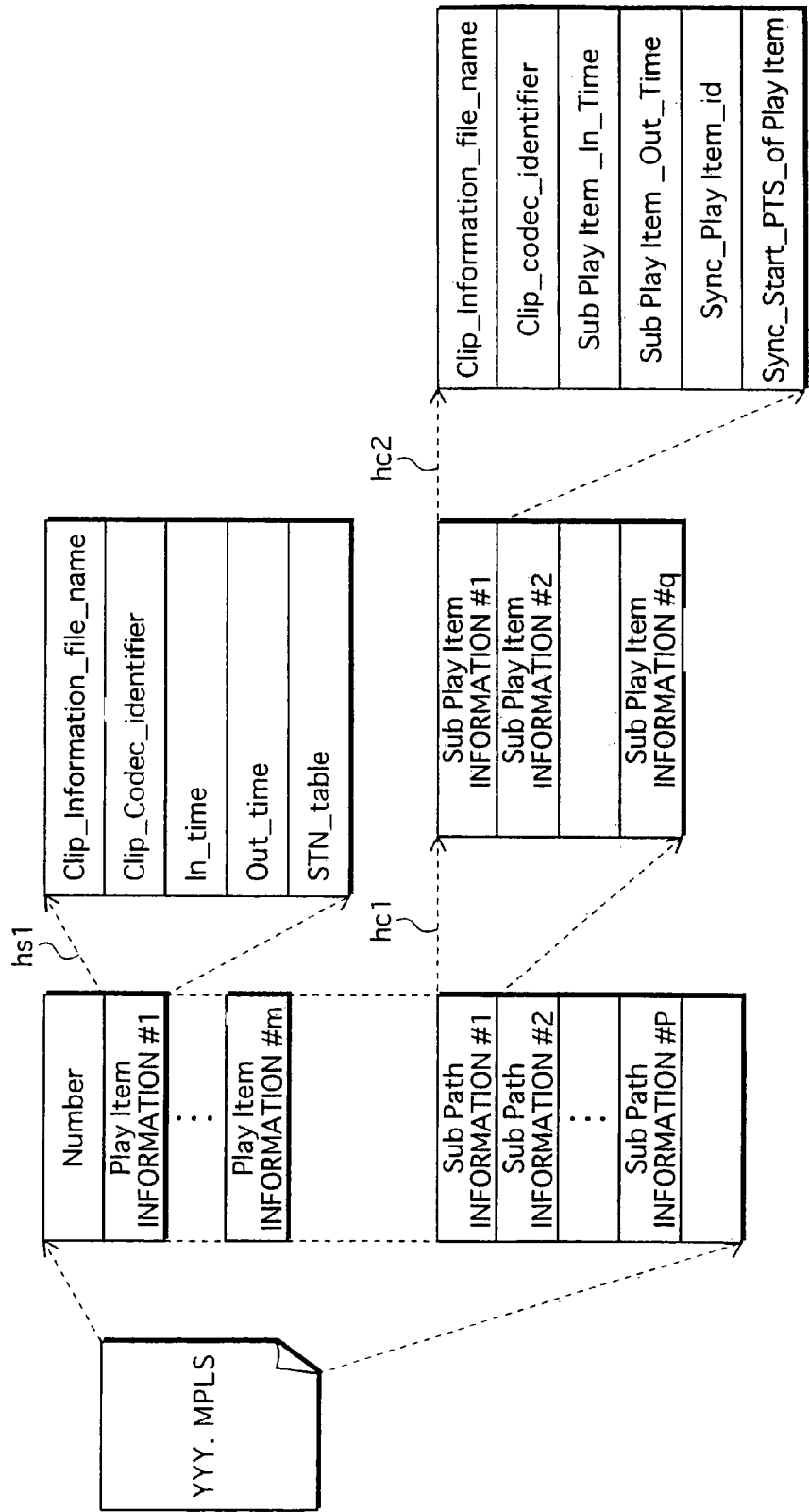
FIG. 52 is a diagram showing an internal structure of PL information relating to the third embodiment.

FIG. 52 is a diagram showing an internal structure of PL information relating to the third embodiment.

The arrow hc1 in FIG. 52 focuses on each piece of sub-path information. As this arrow hc1 shows, a piece of sub-path information is made of one or more sub PlayItems. As the arrow hc2 in the drawing shows, each sub PlayItem is made of "Clip_information_file_name", "Clip_codec_identifier", "Sub Play Item_In_Time", "Sub Play Item_Out_time", "Sync_Play Item_id", and "Sync_start_PTS_of PlayItem".

"Clip_information_file_name" is a description of a file name of Clip information, which uniquely identifies a sub Clip corresponding to the sub PlayItem.

"Clip_codec_identifier" indicates in which coding method the AVClip has been encoded.

"SubPlayItem_In_time" indicates a start point of the sub PlayItem on a reproduction time axis of the sub Clip.

"SubPlayItem_Out_time" indicates an end point of the sub PlayItem on the reproduction time axis of the sub Clip.

"Sync_PlayItem_id" uniquely identifies one of PlayItems constituting the main stream, with which the present sub PlayItem is to be synchronized. "SubPlayItem_In_time" exists on the reproduction time axis of the PlayItem identified by this Sync_PlayItem_id".

"Sync_start_PTS_of_PlayItem" indicates where on the reproduction time axis of the PlayItem identified by the Sync_ PlayItem_id, the start point of the sub PlayItem identified by the SubPlayItem_In_time exists. During reproduction of the PlayItem, the sub PlayItem will start being reproduced when the current reproduction time has reached this Sync_ start_PTS_of_PlayItem.

Figure 53:
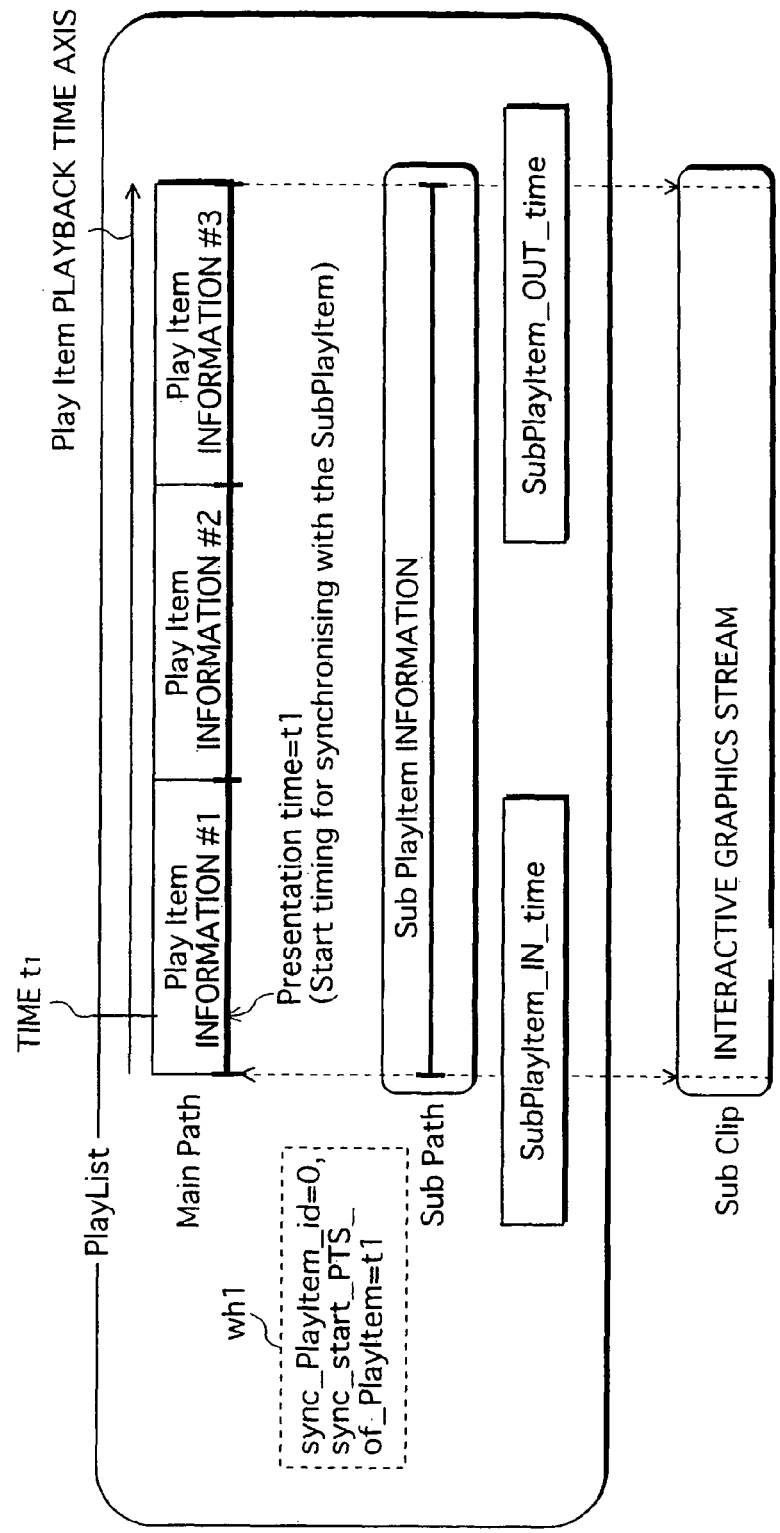
FIG. 53 is a diagram schematically showing synchronization of sub PlayItem according to "sync_PlayItem_id,sync_start_PTS_of_PlayItem".

FIG. 53 is a diagram schematically showing the synchronization of sub PlayItem according to sync_PlayItem_id and sync_start_PTS_of_PlayItem. The main path in this drawing is made of PlayItems #1, #2, and #3. Sync_PlayItem_id and sync_start_PTS_of_PlayItem for the sub PlayItem constituting the sub path are as shown within the frame drawn in a broken line of "wh1". Specifically, the sync_PlayItem_id is set to indicate the PlayItem#1, and the sync_start PTS_of_ PlayItem is set to indicate the time t1 on the reproduction time axis for the Play Item. In this way, when the current reproduction time has reached t1 on the reproduction time axis of the Play Item, a part of the sub Clip (interactive graphics stream) identified by the Clip_information_file_name will be reproduced, the part specifically corresponding to a part from the SubPlayItem_In_time to Sub_PlayItem_Out_time. By performing reproduction in the above way, only a corresponding part from SubPlayItem_In_time to SubPlayItem_Out_time within the interactive graphics stream will be synchronously reproduced with the AVClip.

Figure 54:
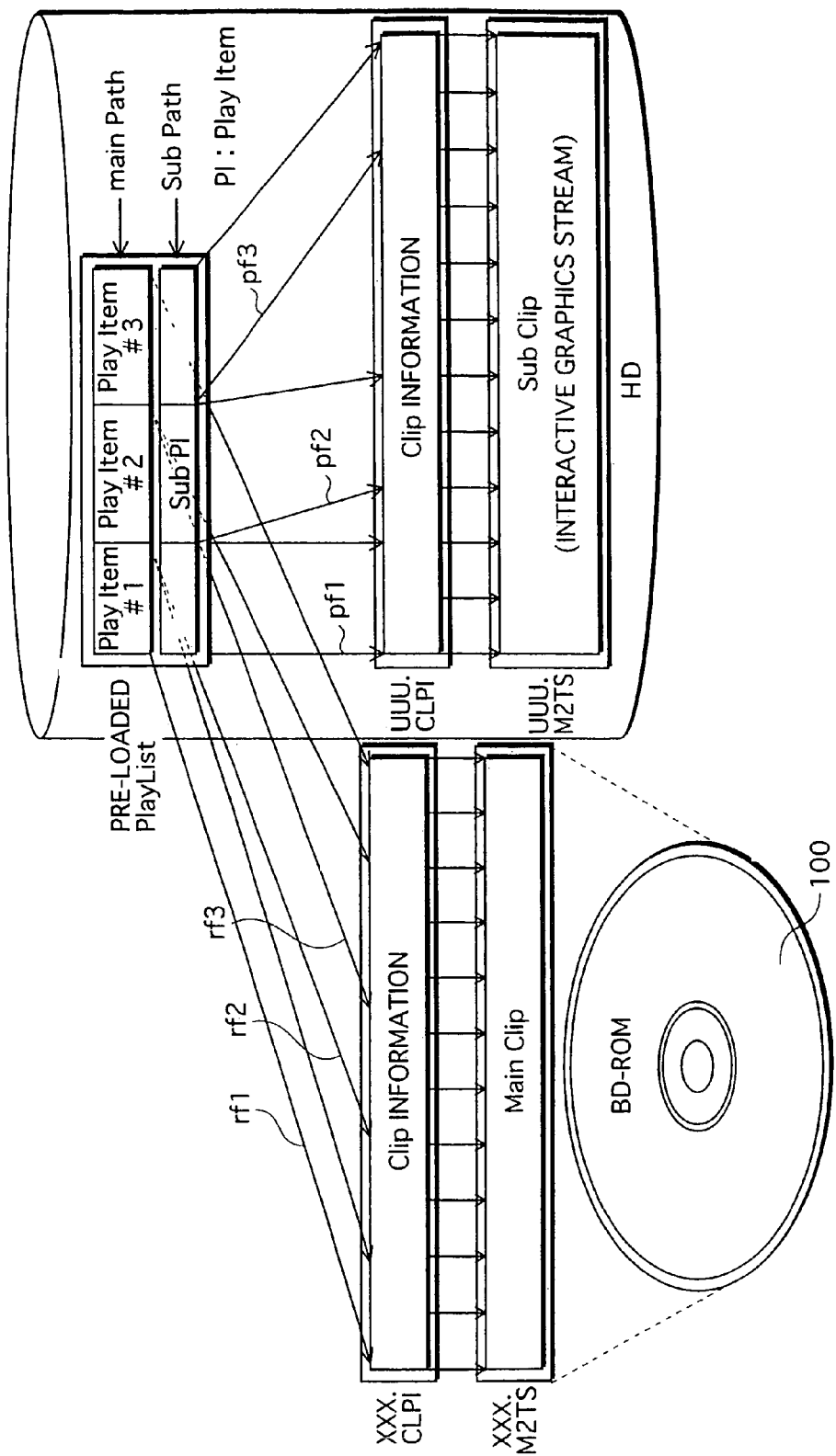
FIG. 54 is a diagram showing file identification by way of "Clip_Information_file_name" within the playlist information on an HD.

In addition, an interactive graphics stream, being a sub Clip, may be recorded in an HD included in the reproduction apparatus. In this case, if playlist information on the HD corresponds the AVClip on the BD-ROM and the sub Clip on the HD, then the AVClip and the sub Clip can be reproduced synchronously. FIG. 54 is a diagram showing file identification by way of "Clip_information_file_name" in the playlist information on the HD. The arrows rf1, rf2 rf3 show indications by Clip information_file_name of Play Items in the playlist information. The arrows pf1, pf2, pf3 show indications by Clip_information_file_name of sub Play Items in the playlist information. According to such indications by Clip_ Information_file_name, the sub path defined for the sub Clip on the HD is synchronously reproduced with the main path defined for the main Clip on the BD-ROM.

The following describes processing performed by the control unit 20, in the case where the sub PlayItem to be synchronized with the current PlayItem exists in the playlist information. The control unit 20 controls the sub Clip indicated by the sub PlayItem to be reproduced synchronously with the main Clip. This synchronous reproduction is performed as follows. The picture data corresponding to the Sync_Start_PTS_of_PlayItem of the sub PlayItem is read from the main Clip. Then, the data existing between the SubPlayItem_In_time to the SubPlayItem_Out_time of the sub PlayItem is reproduced.

(Note)

The description so far does not show all the embodiments of the present invention. Needless to say, the present invention is also executable by various modifications, including the following (A), (B), (C), (D), etc. Each invention relating to the claims of the present invention is either extended or generalized description of either the above-described embodiments or their modification examples. The degree of extension and generalization is based on the level of the state of art in this technological field, at the time of filing of the present invention. Please note that each invention in the claims reflects the means to solve the technological problems of the conventional technology, and therefore the scope thereof will not exceed the scope recognizable by a person in this technological field. Therefore each invention in the claims of the present invention is substantially associated with the description of the present invention.

(A) All the embodiments have assumed that the recording medium according to the present invention is a BD-ROM. However, the recording medium of the present invention is characterized by its graphics stream recorded therein, and this characteristic will not depend on the physical nature of the BD-ROM. Therefore the present invention is applicable to any recording medium as long as it can record an active scenario and a graphics stream. For example, the recording medium may be an optical disc such as a DVD-ROM, a DVD-RAM, a DVD-RW, a DVD-R, a DVD+RW, a DVD+R, a CD-R, a CD-RW. The recording medium may also be an optical magnetic disc such as a PD and an MO. The recording medium may further be a semiconductor memory card such as a compact flash card, smart media, a memory stick, a multimedia card, a PCM-CIA card. Furthermore, the recording medium may be (i) a magnetic recording disc such as a flexible disc, a SuperDisk, a Zip, and a Clik!, and (ii) a removable hard disc drive such as an ORB, Jaz, a SparQ, a SyJet, an EZFley, and a micro drive. Still further, the recording medium may be a hard disc being a constituting element of an apparatus.

(B) In all the embodiments, the reproduction apparatus first decodes an AV Clip recorded on a BD-ROM, before outputting it to a television. However, the reproduction apparatus may be designed as a BD-ROM drive, with the other elements provided for the television. In this case, the reproduction apparatus and the television can be incorporated into a home network connected through an IEEE1394. In addition, the reproduction apparatus according to the embodiments is a type which is used by being connected to a television. However, the reproduction apparatus may be an integral-type with a display. Furthermore, only the substantial part of the reproduction apparatus of each of the embodiments may be considered the reproduction apparatus of the present invention. Because all such reproduction apparatuses are described in the present invention's description, act of producing any of these reproduction apparatuses based on the internal structure of the reproduction apparatus of the first embodiment constitutes an act of practicing the present invention as described in the description. Any act of transfer whether with charge or not (sales if with charge, and gifts if not with charge), rent, and import relating to the reproduction apparatus of the first embodiment also constitute an embodiment of the present invention. In addition, any act of offering these transfer and rent, through storefront display, catalogue solicitation, and pamphlet distribution, also constitutes an act of practicing the present reproduction apparatus.

(C) The information processing according to the program shown in each of the flowcharts is executed using hardware resources. Accordingly, each program whose processing procedure is described by way of the flowcharts is an invention by itself. The above embodiments describe the cases where the programs are incorporated in the reproduction apparatus, but the programs can be used independently of the reproduction apparatus. Acts of executing the programs include (1) an act of producing, (2) an act of transferring with or without charge, (3) an act of renting, (4) an act of importing, (5) an act of providing for the public via a bi-directional electronic communications network, and (6) an act of offering for transfer or rent using storefront displays, catalogs, or pamphlets.

(D) Information processing using the programs shown in the flowcharts is actually realized using hardware resources. Accordingly, the programs which describe the operational procedures shown in the flowcharts are themselves an invention. The above embodiments describe the cases where the programs are incorporated in the reproduction apparatus, but the programs can be used independently of the reproduction apparatus. Acts of practicing the programs include (1) an act of manufacturing, (2) an act of transfer with or without charge, (3) an act of leasing, (4) an act of importing, (5) an act of providing to the public via a bi-directional electronic communications network, and (6) an act of offering the public for transfer or lease using storefront displays, catalogs, or brochures.

(E) When recording an AV Clip on the BD-ROM, an extension header may be added to each TS packet in the AV Clip. The extension header is called a TP_extra_header, includes an arrival_time_stamp and a copy_permission_indicator, and has a data length of 4 bytes. TS packets with TP_extra_headers (hereafter "EXTS packets") are grouped in units of 32 packets, and each set is written to three sectors. One set made up of 32 EX TS packets has 6,144 bytes (=32×192), which is equivalent to a size of three sectors that is 6,144 bytes (=2,048×3). The 32 EX TS packets contained in the three sectors are called an Aligned Unit.

In a home network connected with an IEEE 1394 connector, the reproduction apparatus 200 transmits an Aligned Unit in the following manner. The reproduction apparatus removes a TP_extra_header from each of the 32 EX TS packets in the Aligned Unit, encrypts the body of each TS packet according to the DTCP Specification, and outputs the encrypted TS packets. When outputting the TS packets, the reproduction apparatus inserts an isochronous packet between adjacent TS packets. A point where the isochronous packet is inserted is determined based on a time shown by an arrival_time_stamp of the TP_extra_header. The reproduction apparatus 200 outputs a DTCP_descriptor, as well as the TS packets. The DTCP_descriptor corresponds to a copy_permission_indicator in the TP_extra_header. With the provision of the DTCP_descriptor indicating "copy prohibited", it is possible to prevent, when using the TS packets in the home network connected with the IEEE 1394 connector, the TS packets from being recorded to other devices.

(F) The above embodiments describe the cases where an AV Clip of the BD-ROM Format is used as a digital stream, but the present invention can also be realized with a VOB (Video Object) of the DVD-Video Format or the DVD-Video Recording Format. The VOB is a program stream that complies with the ISO/IEC 13818-1 Standard and is obtained by multiplexing a video stream and an audio stream. Also, the video stream in the AV Clip may be an MPEG4 video stream or a WMV video stream. Further, the audio stream in the AV Clip may be a Linear PCM audio stream, a Dolby AC-3 audio stream, an MP3 audio stream, or an MPEG-AAC audio stream.

(G) The video editing described in the above embodiments may be obtained by encoding an analog image signal broadcast by analog broadcasting.

Alternatively, analog/digital image signals recorded on a videotape may be encoded to obtain contents. Also, analog/digital image signals directly captured by a video camera may be encoded to obtain contents. A digital work distributed by a distribution server is applicable too.

(H) Graphics objects described in the above embodiments is run-length encoded raster data. Run-length encoding is used for compression/encoding of graphics objects, because the run-length encoding is suitable for compression and decompression of subtitles. Subtitles have a property in that a continuous length of the same pixel value in a horizontal direction is relatively long. Therefore, by performing compression using run-length encoding, a high compression rate can be attained. In addition, run-length encoding reduces a load for decompression, and is therefore suitable for realizing decoding by software. Nevertheless, the use of run-length encoding for graphics objects is not essential to the present invention. For example, graphics objects may be PNG data. Also, graphics objects may be vector data instead of raster data. Further, graphics objects may be transparent patterns.

(I) In a case where plural reproduction paths joint to one another, and that the default selected button changes depending on which reproduction path is to be taken, the following arrangement is preferable. That is, reproduction control in the dynamic scenario is described so that at the time when each reproduction path is passed, the eigenvalue for the reproduction path is set at the register of the reproduction apparatus, and that the reproduction processes are described so that buttons will be set in a selected state according to the values set in the register. By this arrangement, the button to be in a selected state can be changed according to which reproduction path is to be passed.

(J) When the BD-ROM or the HD has a plurality of interactive graphics streams, which are each sub Clips, it is possible to provide STN_Table within the PlayItem information of the playlist information, the STN_Table showing which of the interactive graphics streams should be selected. Moreover, it is possible to use entries in the STN_table within the PlayItem information, for the purpose of prioritizing among the interactive graphics streams.

INDUSTRIAL APPLICABILITY

A recording medium and a reproduction apparatus according to the present invention realize interactive control on movie works, and so help provide the market with movie works of high added values, which helps invigorate the movie market and the consumer goods market. Accordingly, the recording medium and the reproduction apparatus according to the present invention are highly applicable in the movie industry and the consumer goods industry.

The invention claimed is:

1. A recording medium comprising:
a graphics stream which represents an interactive display including a plurality of graphical buttons to be overlayed with a motion picture wherein:
said graphics stream includes a plurality of object definition segment sets and control information which controls states of each of said graphical buttons, each having at least a normal state, a selected state and an active state; and
said plurality of object definition segment sets comprise a first object definition segment set forming a group of graphics data for rendering the normal state of each of said plurality of graphical buttons, a second object definition segment set forming a group of graphics data for rendering the selected state of each of said plurality of graphical buttons, and a third object definition segment set forming a group of graphics data for rendering the active state of each of said plurality of graphical buttons;
said first, second and third object definition segment sets are disposed in a sequential order of the first object definition segment set for rendering the normal state of each of said plurality of graphical buttons, the second object definition segment set for rendering the selected state of each of said plurality of graphical buttons, and the third object definition segment set for rendering the active state of each of said plurality of graphical buttons;
said control information includes information indicating one of said graphical buttons which is to be set in said selected state as a default can be changed dynamically; and
said one of said graphical buttons which is to be set in said selected state is dynamically changed when out of said plurality of graphical buttons included in the interactive display at the initial display, a button corresponding to a current button number stored in a register of a reproduction apparatus is selected as a default selected button.

2. The recording medium of claim 1, further comprising play list information, wherein:
said play list information includes main-path information and sub-path information;
said main-path information indicates a video stream as a main stream and defines a reproduction section of the main stream;
said sub-path information indicates said graphics stream as a sub stream which synchronizes with said main stream, defines a reproduction section of said sub stream and includes reproduction information;
said reproduction information indicates a synchronization point on a reproduction time axis of said main stream; and
said interactive display is represented to be overlayed with a picture of said video stream in said reproduction section of said main stream.

3. The recording medium of claim 1, wherein the graphics stream representing the interactive display comprises a plurality of packet elementary stream (PES) packets, the control information and the plurality of object definition segment sets are included in the plurality of PES packets.

4. The recording medium of claim 2, further comprising a read- only optical disk, wherein:
said video stream is recorded on a read-only optical disk; and
said graphics stream and said video stream are recorded on said recording medium which is a rewritable disk.

5. A reproduction apparatus for reproducing a video stream and a graphics stream, said apparatus comprising:
a graphics decoder operable to decode the graphics stream which represents an interactive display including a plurality of graphical buttons to be overlayed with a motion picture, and a graphics plane operable to store decompressed graphics data, wherein:

the graphics stream includes a plurality of object definition segment sets and a control information which controls states of each of the graphical buttons, each having at least a normal state, a selected state and an active state; and the plurality of object definition segment sets comprise a first object definition segment set forming a group of graphics data for rendering the normal state of each of the plurality of graphical buttons, a second object definition segment set forming a group of graphics data for rendering the selected state of each of the plurality of graphical buttons, and a third object definition segment set forming a group of graphics data for rendering the active state of each of the plurality of graphical buttons;

the first, second and third object definition segment sets are disposed in a sequential order of the first object definition segment set for rendering the normal state of each of the plurality of graphical buttons, the second object definition segment set for rendering the selected state of each of the plurality of graphical buttons, and the third object definition segment set for rendering the active state of each of the plurality of graphical buttons;

the control information includes information indicating one of the graphical buttons which is to be set in the selected state as a default can be changed dynamically;

the one of the graphical buttons which is to be set in said selected state is dynamically changed when out of the plurality of graphical buttons included in the interactive display at the initial display, a button corresponding to a current button number stored in a register of the reproduction apparatus is selected as a default selected button; and said graphics decoder includes:
a graphics processor operable to decode the graphics data;
an object buffer operable to store decompressed graphics data obtained by the decoding; and
a graphics controller operable to write the decompressed graphics data in the second object definition segment set to the graphics plane.

6. The reproduction apparatus of claim 5 further comprising a video decoder which decodes the video stream and reads play list information recorded on a recording medium, wherein:

the play list information includes main-path information and sub-path information;

the main information indicates the video stream as a main stream and defines a reproduction section of the main stream, the video stream includes pictures;

the sub-path information indicates the graphics stream as a sub stream which synchronizes with the main stream, defines a reproduction section of the sub stream and includes reproduction information;

the reproduction information indicates a synchronization point on a reproduction time axis of the main stream; and the interactive display is represented to be overlayed with a picture of the video stream in the reproduction section of a main stream.

7. The reproduction apparatus of claim 5, wherein the graphics stream representing the interactive display comprises a plurality of packet elementary stream (PES) packets, the control information and the plurality of object definition segment sets are included in the plurality of PES packets.

8. The reproduction apparatus of claim 6, wherein:
the video stream is recorded on a read-only optical disk; and
the graphics stream and the video stream are recorded on a recording medium which is a rewritable disk.

9. A recording method for recording to a recording medium, said method comprising:
creating application data; and
recording the created application data to the recording medium; wherein:

the application data includes a graphics stream;
the graphics stream represents an interactive display to be overlayed with a motion picture, the interactive display including a plurality of graphical buttons;
the graphics stream includes a plurality of object definition segment sets and a control information which controls states of each of the graphical buttons, each having at least a normal state, a selected state and an active state;

the plurality of object definition segment sets comprise a first object definition segment set forming a group of graphics data for rendering the normal state of each of the plurality of graphical buttons, a second object definition segment set forming a group of graphics data for rendering the selected state of each of the plurality of graphical buttons, and a third object definition segment set forming a group of graphics data for rendering the active state of each of the plurality of graphical buttons;

the first, second and third object definition segment sets are disposed in a sequential order of the first object definition segment set for rendering the normal state of each of the plurality of graphical buttons, the second object definition segment set for rendering the selected state of each of the plurality of graphical buttons, and the third object definition segment set for rendering the active state of each of the plurality of graphical buttons;

the control information includes information indicating one of the graphical buttons which is to be set in the selected state as a default can be changed dynamically; and the one of the graphical buttons which is to be set in said selected state is dynamically changed when out of the plurality of graphical buttons included in the interactive display at the initial display, a button corresponding to a current button number stored in a register of a reproduction apparatus is selected as a default selected button.

10. The recording method of claim 9, wherein the graphics stream representing the interactive display comprises a plurality of packet elementary stream (PES) packets, the control information and the plurality of object definition segment sets are included in the plurality of PES packets.

11. A program embodied on a computer readable medium for enabling a computer to reproduce a graphics stream, said program comprising code operable to cause the computer to perform:

a decoding of the graphics stream; and
a displaying of an interactive display to be overlayed with a motion picture, the interactive display including a plurality of graphical buttons;

wherein:
the graphics stream includes a plurality of object definition segment sets and control information which controls states of each of the graphical buttons, each having at least a normal state, a selected state and an active state;

the plurality of object definition segment sets comprise a first object definition segment set forming a group of graphics data for rendering the normal state, a second object definition segment set forming a group of graphics data for rendering the selected state, and a third object definition segment set forming a group of graphics data for rendering the active state;

the first, second and third object definition segment sets are disposed in a sequential order of the first object definition segment set for rendering the normal state of each of the plurality of graphical buttons, the second object definition segment set for rendering the selected state of each of the plurality of graphical buttons, and the third object definition segment set for rendering the active state of each of the plurality of graphical buttons;

the control information includes information indicating one of the graphical buttons which is to be set in the selected state as a default can be changed dynamically;

the one of the graphical buttons which is to be set in said selected state is dynamically changed when out of the plurality of graphical buttons included in the interactive display at the initial display, a button corresponding to a current button number stored in a register of the computer is selected as a default selected button; and the computer includes:
  a graphics processor operable to decode the graphics data;
  an object buffer operable to store decompressed graphics data obtained by the decoding; and
  a graphics plane operable to store at least some of the decompressed graphics data that are to be overlayed with the motion picture; and
  wherein the decompressed graphics data in the second object definition segment set is written to the graphics plane.

12. The program of claim 11, wherein the graphics stream representing the interactive display comprises a plurality of packet elementary stream (PES) packets, the control information and the plurality of object definition segment sets are included in the plurality of PES packets.

13. A method of reproducing a graphics stream which represents an interactive display including a plurality of graphical buttons to be overlayed with a motion picture, said reproduction method comprising:
  decoding the graphics stream, wherein:
  the graphics stream includes a plurality of object definition segment sets and control information which controls states of each of the graphical buttons, each having at least a normal state, a selected state and an active state; and the plurality of object definition segment sets comprise a first graphics data set forming a group of graphics data for rendering the normal state of each of the plurality of graphical buttons, a second object definition segment set forming a group of graphics data for rendering the selected state of each of the plurality of graphical buttons, and a third object definition segment set forming a group of graphics data for rendering the active state of each of the plurality of graphical buttons;

the first, second and third object definition segment sets are disposed in a sequential order of the first object definition segment set for rendering the normal state of each of the plurality of graphical buttons, the second object definition segment set for rendering the selected state of each of the plurality of graphical buttons, and the third object definition segment set for rendering the active state of each of the plurality of graphical buttons;

the control information includes information indicating one of the graphical buttons which is to be set in the selected state as a default can be changed dynamically;

the one of the graphical buttons which is to be set in said selected state is dynamically changed when out of the plurality of graphical buttons included in the interactive display at the initial display, a button corresponding to a current button number stored in a register of a reproduction apparatus is selected as a default selected button; and said decoding includes:
  decoding the graphics data;
  storing decompressed graphics data obtained by the decoding onto an object buffer;
  storing at least some of the decompressed graphics data that are to be overlayed with the motion picture onto a graphics plane; and
  writing the decompressed graphics data in the second object definition segment set to the graphics plane.

14. The method of claim 13, wherein the graphics stream representing the interactive display comprises a plurality of packet elementary stream (PES) packets, the control information and the plurality of object definition segment sets are included in the plurality of PES packets.

* * * * *